US005611038A

United States Patent [19]

Shaw et al.

[11] Patent Number: 5,611,038

[45] Date of Patent: Mar. 11, 1997

[54] AUDIO/VIDEO TRANSCEIVER PROVIDED WITH A DEVICE FOR RECONFIGURATION OF INCOMPATIBLY RECEIVED OR TRANSMITTED VIDEO AND AUDIO INFORMATION

[76] Inventors: Venson M. Shaw; Steven M. Shaw, both of 111 Reldyes Ave., Leonia, N.J. 07605

[21] Appl. No.: 297,409

[22] Filed: Aug. 29, 1994

Related U.S. Application Data

[63] Continuation of Ser. No. 686,773, Apr. 17, 1991, abandoned.

[51] Int. Cl.[6] ............ G06T 1/20

[52] U.S. Cl. ............ 395/806; 395/200.13; 348/390

[58] Field of Search ............ 395/153, 154, 395/500, 800, 200.13; 379/93, 96; 348/384, 387, 390, 423

[56] References Cited

U.S. PATENT DOCUMENTS

| | | | |
|---|---|---|---|
| 4,521,870 | 6/1985 | Babbel et al. | 395/325 |
| 4,743,958 | 5/1988 | Bannister et al. | 358/22 |
| 4,943,866 | 7/1990 | Barker et al. | 395/154 |
| 5,057,932 | 10/1991 | Lang | 358/133 |
| 5,062,104 | 10/1991 | Lubarsky et al. | 370/60 |

*Primary Examiner*—Richard L. Ellis
*Attorney, Agent, or Firm*—Hoffman, Wasson & Gitler, P.C.

[57] ABSTRACT

A general purpose architecture and process for multimedia communications in which a number of video and audio information production devices are connected to a telecommunications network. Each of these video and audio information production devices is provided with an input/output device for receiving and transmitting information from the telecommunications network on a real time basis. The input/output device continuously monitors the run-time status and condition changes of the telecommunications network and would dynamically control and adjust, on a real time basis, the corresponding network bandwidth prior to immediately transmitting all of the video and audio information to the telecommunications network.

18 Claims, 66 Drawing Sheets

CONTINUED FROM FIG.13A (INTERNAL CIF FORMAT 288H x 192V)

| | INTERNAL CIF | STANDARD CIF |
|---|---|---|
| MACRO BLOCK | SAME | 16x16 PELS |
| GROUP OF BLOCK | 9x2=18 UB'S | 11x3=33 UB'S |
| CIF FRAME | SAME | 2x6=12 GOB'S |
| QCIF FRAME | SAME | 1x3=3 GOB'S |

CONTINUED FROM FIG.17A

AUDIO/VIDEO TRANSCEIVER PROVIDED WITH A DEVICE FOR RECONFIGURATION OF INCOMPATIBLY RECEIVED OR TRANSMITTED VIDEO AND AUDIO INFORMATION

This is a continuation of U.S. patent application Ser. No. 07/686,773 filed on Apr. 17, 1991, now abandoned.

FIELD OF THE INVENTION

The present invention relates to a general purpose system architectural method for multimedia communications. The object of this invention is to improve the quality and efficiency for human communications. Our architectural method allow for the access of a plurality of computing, consumer, and communication equipment, e.g., PC and workstations, camera, television, VCR, telephone, etc, and allow for conveying multiple types of media information, e.g., sound, image, animated graphics, and live video. Despite of the real-time constraints and resource limitation to store, retrieve, and exchange these massive media data information, an efficient architectural method was invented to make multimedia communications system a final reality.

This invention is dedicated to the specific application of teleconferencing. However, orientation of the system to different class of tasks involves no significant redesign, but primarily involves changes on the host computer programs, system hardware, and communications subsystems.

BACKGROUND OF THE INVENTION

This invention relates to a general purpose architectural method suitable for most conceivable combinations for multimedia communications. PC workstations are widely available at most offices and homes today, yet due to their processing and storage limitations, they were never considered for complex image/live video applications. Alternatively, existing methods employee single media communications. Namely, telephone for human voice communications, fax for text communications, or PC workstations for data communications. Noticeably all of these single-media communications use existing analog telephone lines connecting through the central office (CO) switch, only one of the media types can be selected at a time, and the fax and F20 use dial-up modem for analog transmission of the digital data. Meanwhile, various coding techniques are available today so that source media (image, live video, sound, and animated graphics) can be reduced (coded or compressed) into lesser quantity to ease the storage and transmission constraint, and the destination media can be restored (decoded or decompressed) and playback without quality degradation, then such digital coded media information can find wide applications for remote database retrieval, teleconferencing, messaging, distance education and other applications to complement traditional single media (voice, data, and text) communications.

We now turn to the reviewing of existing product and patent. Various single-media codec (compression and decompression) techniques has matured in recent years to allow the high reduction (compression) of the source media and the quality playback (decompression) of the destination media. Individual international standards (CCITT and ISO) will soon be established to facilitate the worldwide communications of still image, quality sound, live video, and animated graphics. However the multimedia products we have searched to-date are either video conferencing systems (i.e. CLI, PictureTel) using dedicated systems and complex algorithms for quality video and audio only, or incorporate desktop PC workstation for a one-way, decode only (playback and display) mixed media presentation (DVI, CDI et.al). Videophones (Sony, Panasonic, et.al.) have been the only communications product which utilize real-time coder and decoder for image and voice transmission through traditional analog or digital transmission, However, their quality are poor, and effects are limited. In conclusion, the prior arts involve either real-time playback of the precoded compressed data (live video, sound, and graphics) for a multimedia presentation, or the real time coding and decoding of live video and voice for a live conferencing applications.

Accordingly, we feel it is superior to provide digital media communications in conjunction with the traditional voice and data communications because it combines the use of live video, graphics, and audio media, therefore make up a much more effective means for human to communicate with each other. Since "single picture worths a thousand words", it is conceivable that pictorial information such as image and live video can definitely enhance and complement the traditional communications.

OBJECTS OF THE INVENTION

An object of the present invention is to allow for PC/WS (PC or workstation) as a single platform technology and to define an integrated architectural method which accommodate communications (remote transmission and retrieval) for all types of digital coded (compressed) multiple-media information.

Another object of the present invention is to provide a flexible architecture which allow for management and control of the variable communications bandwidth and address the flexible combinations of the digital coded mutiple-media information for a wide variety of application requirements. Some of the applications examples are distance education (teaching and learning), teleconferencing, messaging, videophone, video games, cable TV decoders, and HDTV.

Still another object of the present invention is the application of digital coding techniques for reducing the storage and transmission requirements for multiple media information, we also suggest the conversion of digital compressed media to analog form for convenient interface with the traditional analog storage or transmission techniques.

Still another object of the present invention is the combinatorial use of animated graphics and motion estimation/compensation for regeneration of the live video. Namely, animated graphics techniques will be applied for the playback of estimated motion effects.

Still another object of the present invention is the interactive use of multiple media types. Namely, the user has the control to program and select the appropriate media combination for specific application needs either before or during the communications session. For examples, the user can decide to select the live video with voice quality audio before the session starts, but during the session, he can choose instead to use the high quality audio with slow motion and still freeze pictures for more effective communications.

Still another object of the present invention is to leverage with all of the available international standard codec technologies, and evolve into a human interactive communications model, and conclude with a low cost, high quality, highly secured, interactive, yet flexible, and user friendly method for desktop, handheld, or embedded media communications.

Still another object of the present invention is to provide cost effective method for transmission bandwidth and local storage. Coding techniques have been used to conserve storage and transmission bandwidth since the media information data can be greatly reduced. These coded information still preserve the original quality and allow for presentation at selective quality levels at users request. Since these information are coded according to selective algorithms, without the corresponding decoder, information can not be properly decoded and used, this allow for high degree of security for special applications.

Still another object of the present invention is to provide implementation for selecting one of a plurality of multiple quality levels for live video, graphics, audio, and voice. Depending on the application requirement, user can select the appropriate media quality as desired. For example, high quality audio and high quality image and graphics may be suitable for collage education, voice combine with live video will be suitable for K-12 education, face to face video and voice will be effective for business negotiations.

Still another object of the present invention is to conserve transmission bandwidth, still image can be blended with locally generated live background video or animated graphics. User can instaneously adjust the quality levels during the sessions to make the meeting or presentation more effective.

SUMMARY OF THE INVENTION

The significant difference between our process and the traditional video conferencing is that only photo images of the conferees (talking heads) have been shown on a traditional video conferencing/videophone setup. In our method, the conferees are allowed to substitute the conferee photo images with other important pictorial information retrievable form the database and present (broadcast) to others for better illustrations. The conferees also have the control to select the appropriate quality level that he or she wants in order to conserve bandwidth. As an example, for a product presentation, it is better to provide coarse quality live video with high fidelity audio as a introduction. Once specific interests are generated, fine quality video without audio can be presented to facilitate further discussions. The other example is an international meeting while different languages are used, live video can always make ease the verbal explanation, and quality audio can harmonize the atmosphere during tense moments. To further conserve the bandwidth, live coarse video can overlay with locally generated fine quality still background image to provide acceptable video presentation (Notice that the fine quality video will be locally generated therefore doesn't consume any communications bandwidth). Finally since all coded multimedia information will require proper decoder to expand back to the original presentable forms, therefore it is highly secured, furthermore, different security level can be assigned to each conferee, therefore appropriate information will only be shown to various audience without any concerns on security.

Finally, television only facilitate an traditional analog video and audio session, since it is one-way non-interactive communication, receiver can only observe and listen, they can not make comments or edit (remark) a media message, not to mention the ability to control (select and edit) the appropriate media massage and return to the sender. These interactive capabilities will be extremely beneficial for distance learning, or remote classroom applications.

In summary, we have initially provided some basic background information from FIG. 1 through FIG. 5. We have then shown some of oar architectural design techniques in FIG. 6, and FIG. 7. Our bandwidth control methods and techniques can be found at FIGS. 9–11, and FIG. 27. Our Universal Interface Design and SMART Memory design techniques are illustrated from FIGS. 12–16. The key structure and component of our system is shown at FIG. 8. The integrated circuit and motion compensation design techniques are illustrated in FIGS. 17–18 and FIGS. 43–44. Finally, in order to thoroughly provide the initial circuit design methods of our invention, we have employed FIG. 21 through FIG. 42, in order to illustrate the detailed design aspects of various blocks and subsystems employing commercially available integrated circuit

DETAILED DESCRIPTION OF THE PREFERRED EMBODIMENT

1. GENERAL DISCUSSION

Figure 1:
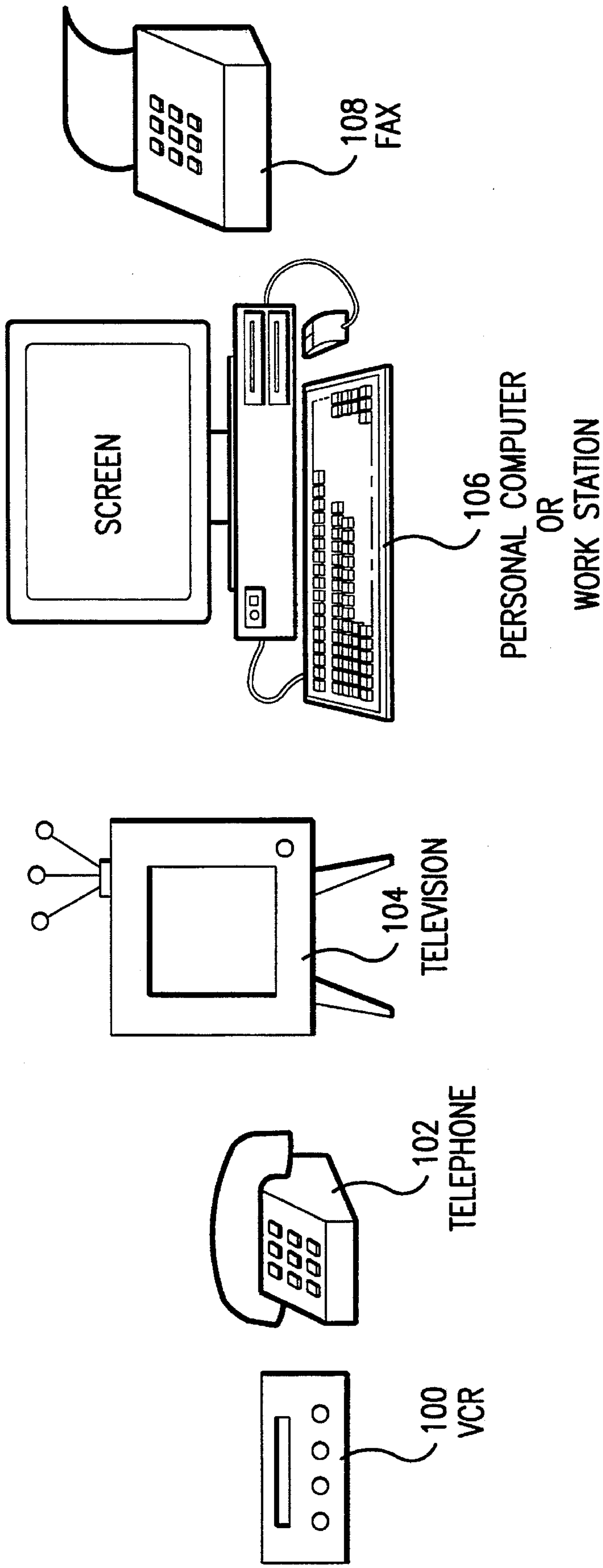
FIG. 1 illustrates a pictorial drawing of all the related prior art devices.

Referring now to the drawings wherein like reference numerals refers to similar or identical parts throughout the several views, and more specifically to FIG. 1 thereof, FIG. 1 illustrates all the prior arts which are available at home or office today. Namely, there are television 104, VCR 100, telephone 102, personal computer 106, and FAX machine 108. Each of them has distinctive function. For example, telephone 102 is used to reach out and touch someone only through voice. A fax machine 108 can transmit and receive black and white document. A television 104 can receive video broadcast program, a personal computer 106 obviously is used for many data processing applications. However, there has been no prior art which can physically interconnect all of them, and integrate all the functions together.

Figure 2:
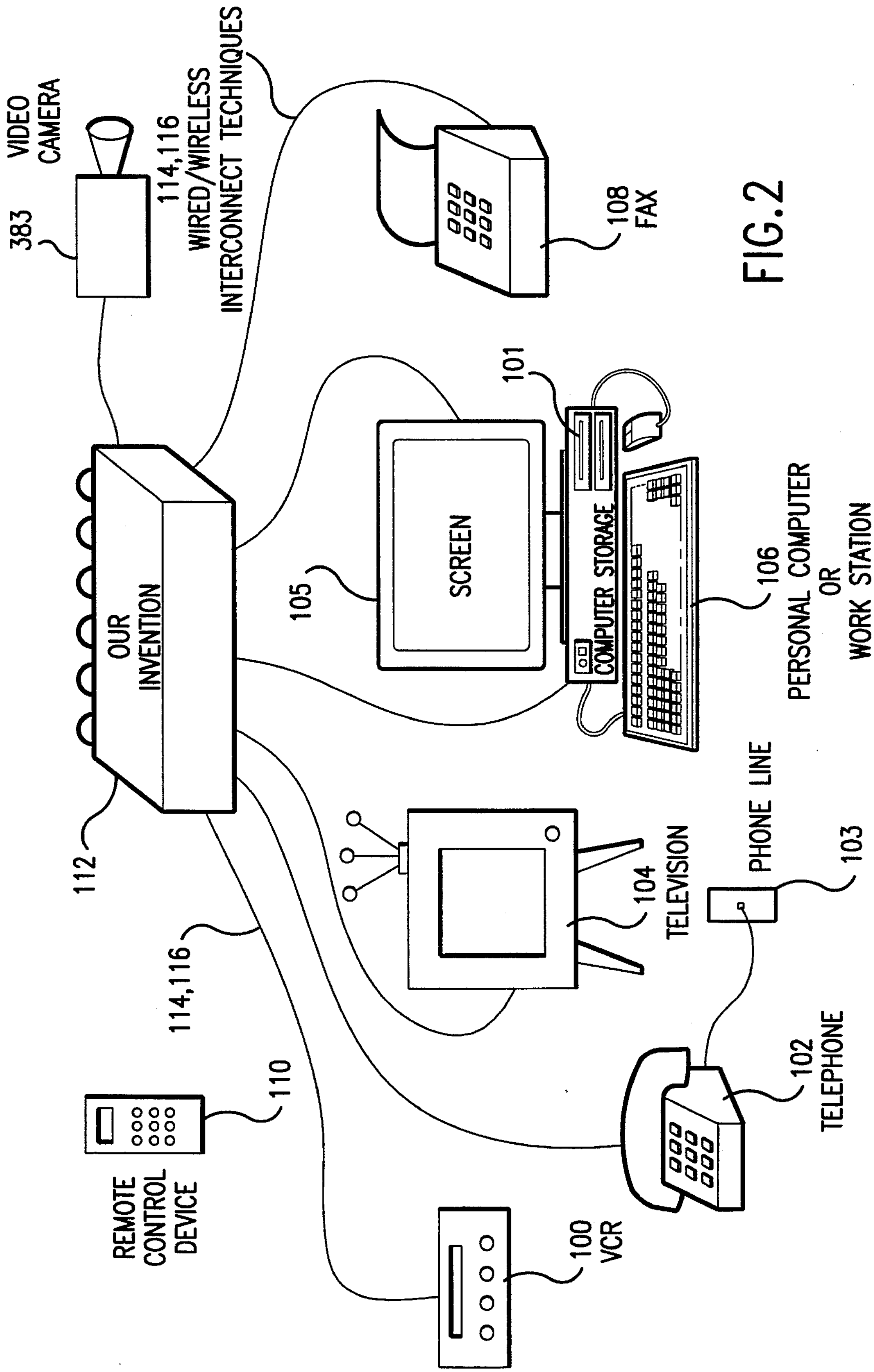
FIG. 2 illustrates a pictorial drawing of the concept of our invention, which allow for the interface and control of all the prior art devices.

It is the applicants' intention to illustrate our invention in FIG. 2, which allows for telephone 102, television 104, and personal computer 106 to becoming an single functional entity. Our invention 112 physically interconnect all prior art devices together either through electrical wires 114 or wireless interconnection techniques 116. Our invention 112 then allow people to see each other face to face through television 104 or computer screen 105 when they are making voice phone calls. Our invention 112 also allow people to retrieve and review document in real time from computer storage 101, send over the phone line 103 and display at the other end. Our invention further allows TV studios to broadcast as many as 200,000 channels programs instead of 200 channels today. Therefore every household member can have sufficient private channels for his/her dedicated usage. Children can select the appropriate education and entertainment programs. Parents can receive news, investment, or business programs. Our invention further allow people to work at home. Teacher can provide quality education programs to the remote rural area, and expert doctors can conduct remote operation by giving instruction to junior doctors while reviewing vital patient data and physical operation over the computer or television screen. Most importantly, our invention apply remote control techniques 110 to receive request from user and provide instruction to the computer 106 for execution. As a result, our invention 112 becomes extremely friendly to use, there is no requirement of any programming skill to operate.

2. GENERAL INTRODUCTION

Figure 3:
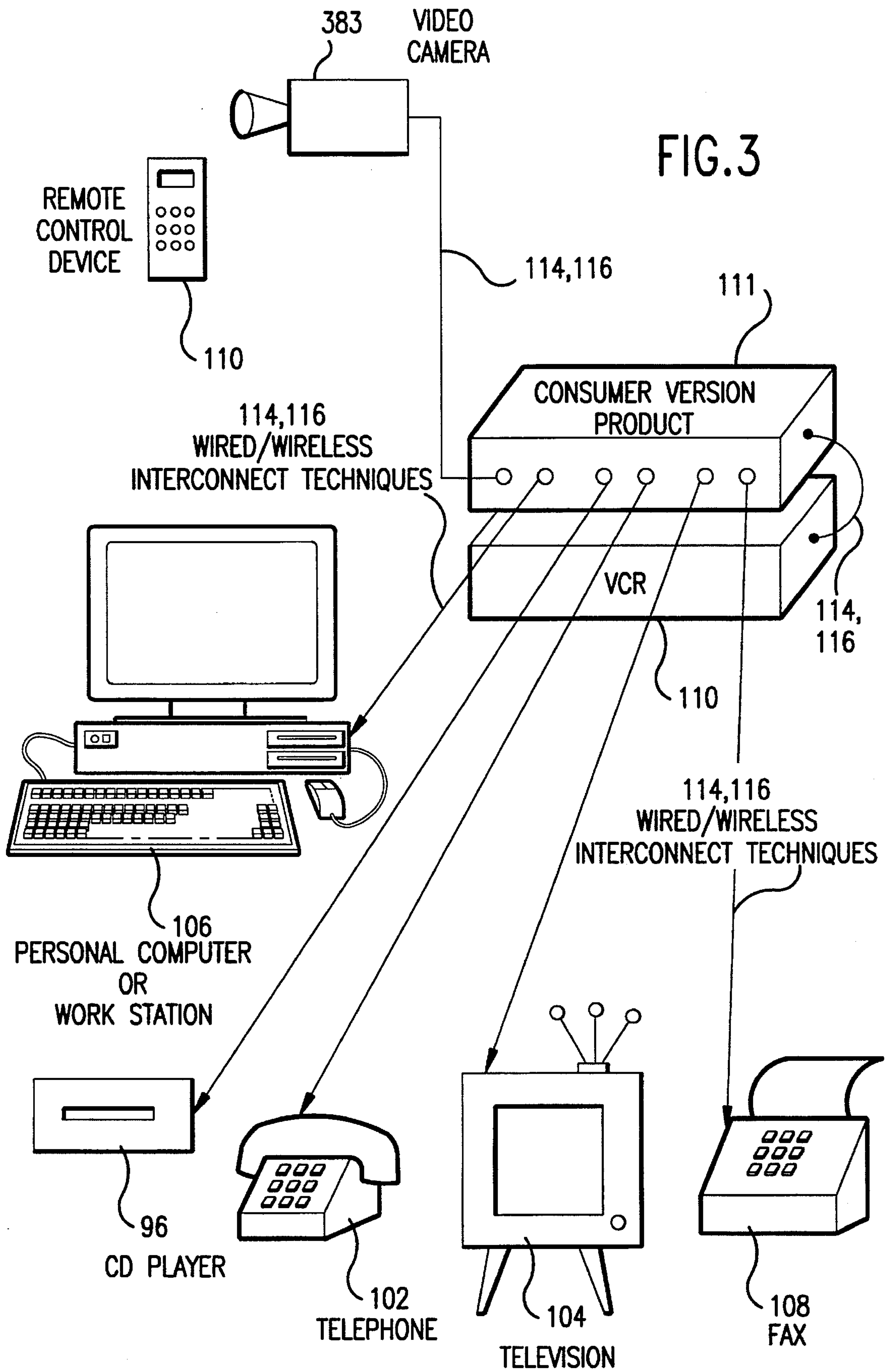
FIG. 3 illustrates a version of the product implementation; specifically designed for the consumer and entertainment market.

As shown in FIG. 3, we illustrate a product version of our invention 112 specifically designed for the consumer market. The product is a sleek black box 111 with approximately the size and dimension of a VCR. The back of the device has various connectors to interconnect 114, 116 computer 106, television 104, telephone 102, and fax machine 108. For convenience. The front panel of the device 111 will provide a small black and white display for preview purpose. Otherwise, it will be similar to a VCR 100 panel, and yet the control knobs for the volume control, video quality level, communication speed, media priority, program selection, mode indicator will be provided. The remote control device 110 is accompanied to provide the screen programming capabilities which would allow user to select and program the computer 106 through point and select toward the TV 104 screen.

Figure 4:
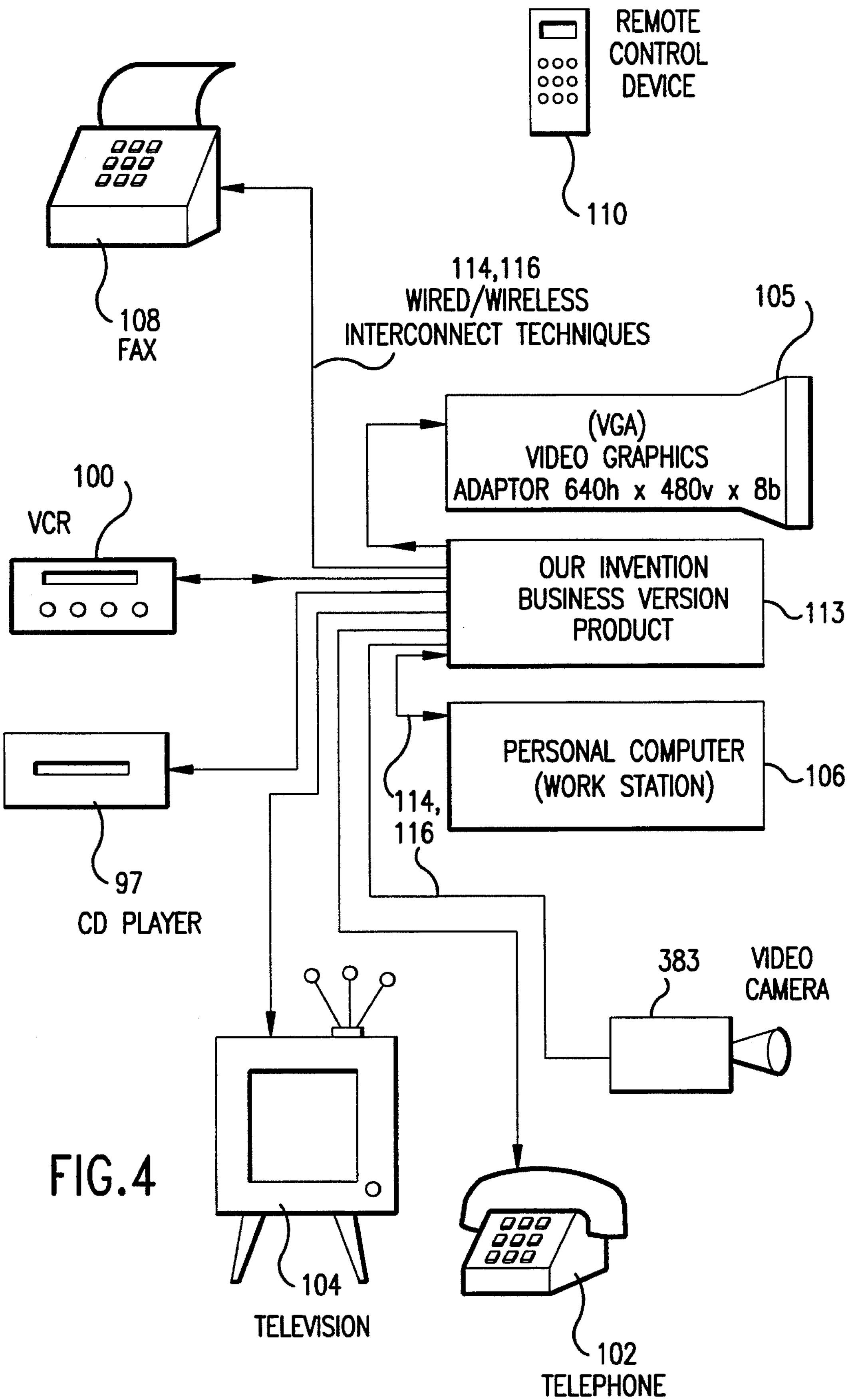
FIG. 4 illustrates a version of the product implementation; specifically designed for the business computing market.

As shown in FIG. 4, we illustrates our invention which employes the similar internal design. However, with a different external packaging, now we are able to address the Fortune 500 business market. The design 113 is now a standard PC 106 chassis with slightly smaller vertical dimension. The box 113 will be colored in beige or off white to match with the PC 106. The back of the box 113 will have connectors so we can conveniently connect to the VCR 100, television 104, monitors 105, or fax machine 108. A remote control device 110, which can be a modified cordless telephone 117. The remote control device 110 is colored in the same color like the mainframe 106. The television 104, VGA monitor 105, or RGB monitor 105 are used as the viewing device for conducting conferencing. The VCR 100 is further used as the analog video/audio storage. The fax machine 108 is used to conduct document transmission. The remote control device 110 is used to provide the user friendly screen programming features. It is the applicants' intention that in general business environment, there may be large or mini computers, disks, CD-ROM's or tape back-ups which can further be interconnected through our invention 113.

Figure 5:
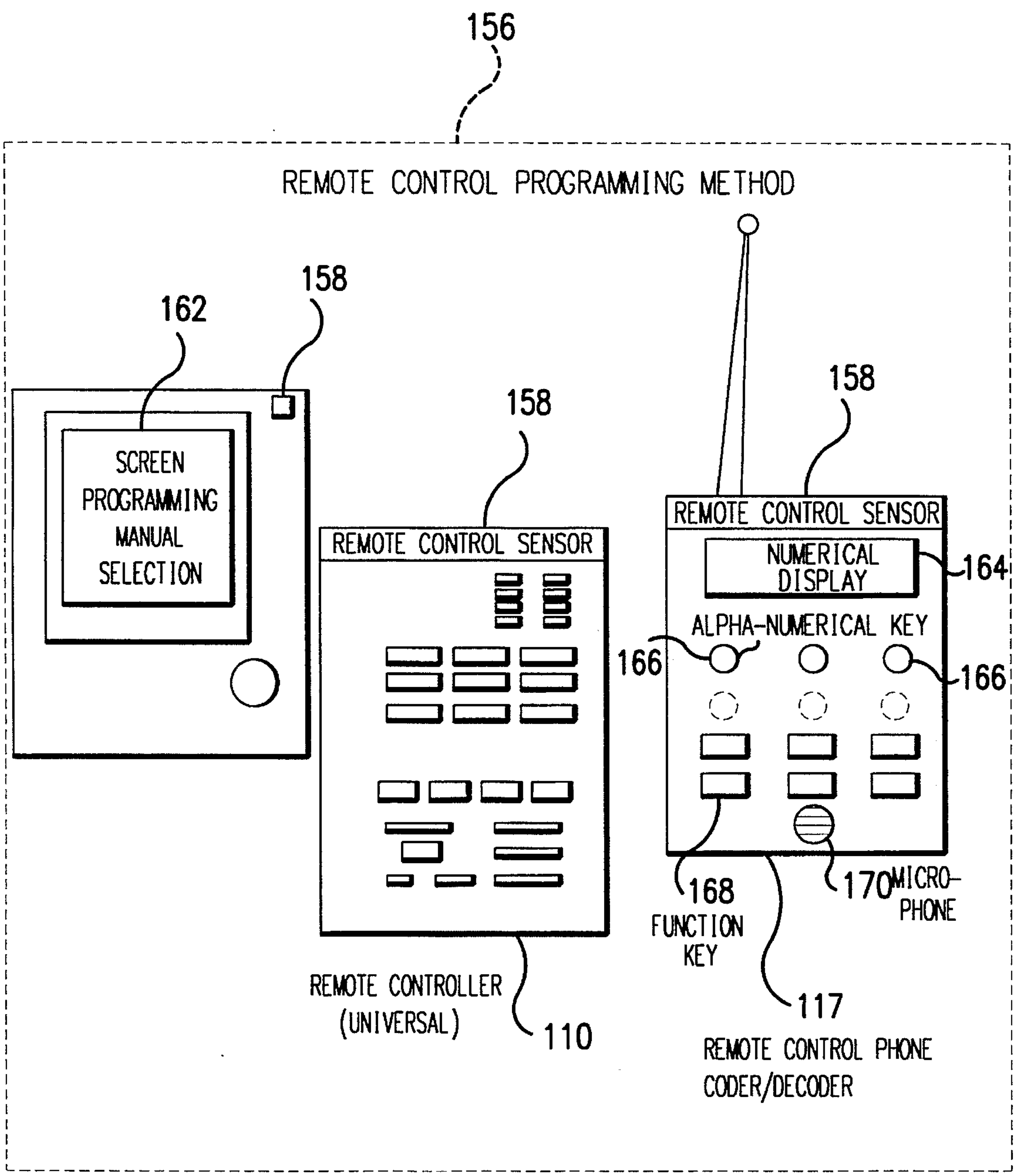
FIG. 5 illustrates a remote control programming decoder; specifically designed to make ease of operating our invention.

As shown in FIG. 5, we illustrate the remote control programming method 156 that we employed to make our invention 111–113 more user friendly and easy to use. The right hand side device 117 is a combination of cordless phone 102 and remote control 110. The middle device is a universal remote control 110. The advantage of remote control programming 156 is that people who haven't learned computer 106 can rely on the simple screen programming 162 and manual selection 162 to make the programming transparent to users. The implementation of the remote control 110 can be generic, and apply to many other implementations as well. Once the user provide the desired command to the host 106 by pointing at our invention box 112, the appropriate command message will be further decoded and send to the host 106 for execution.

3. OPERATION

SYSTEM OPERATION METHODOLOGY

Figure 16A:
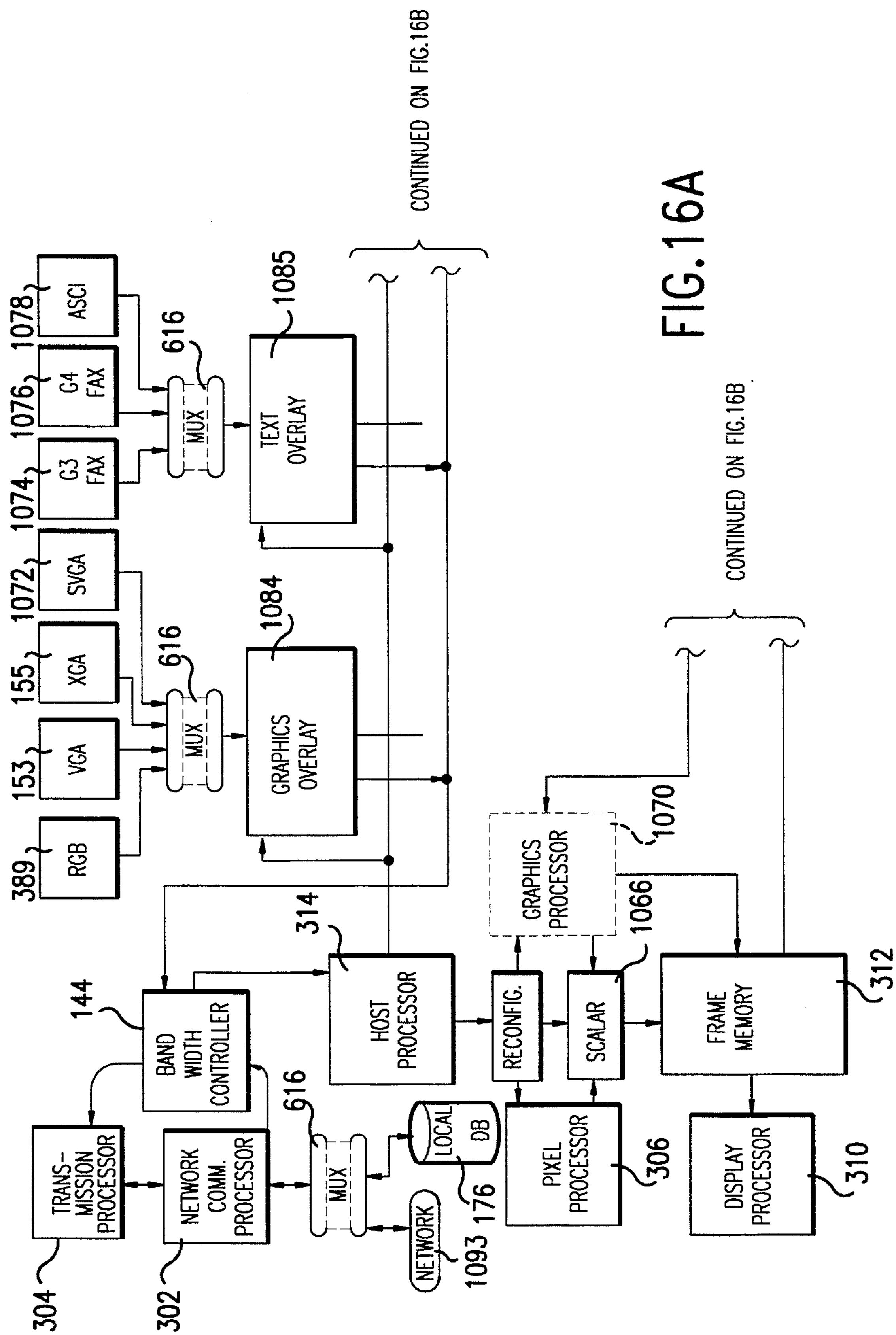
FIG. 16 illustrates how to design a scalable frame memory architecture and how to accelerate and interchange CIF, QCIF and MPEG Formats.
Figure 16B:
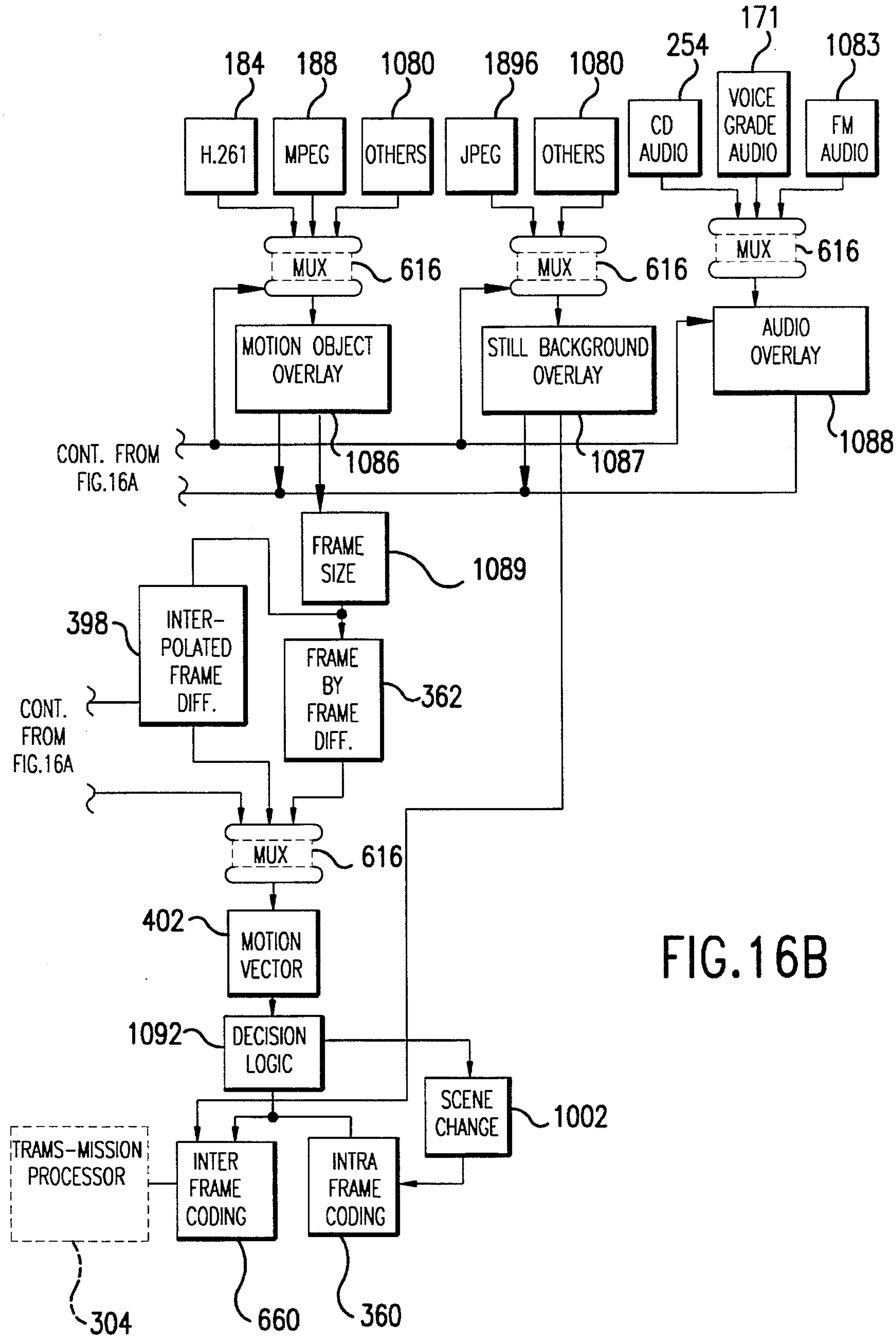
Figure 17A:
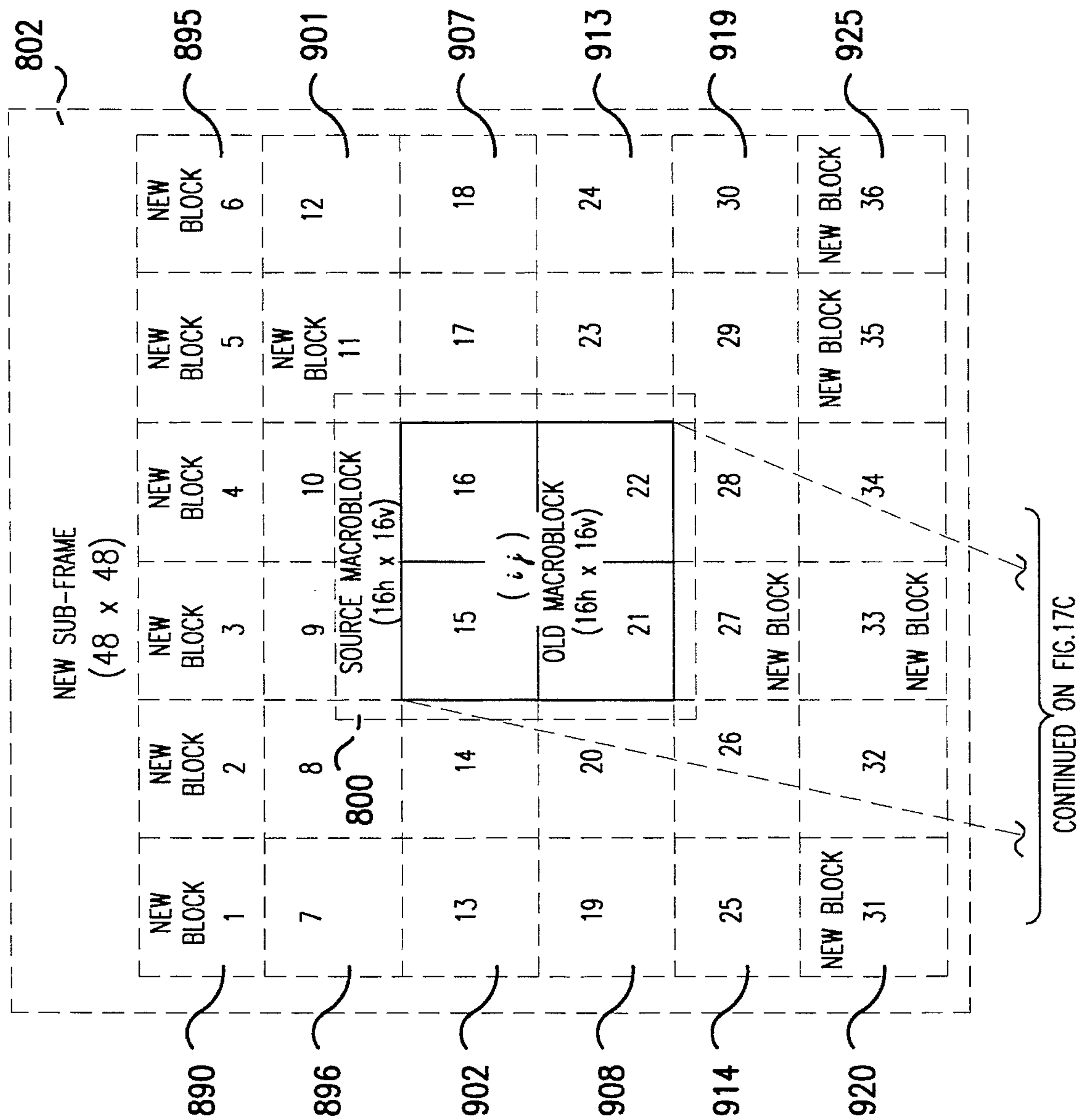
FIG. 17 illustrates the motion estimation techniques and how to design a reconfigurable array parallel processor for motion processing.
Figure 17B:
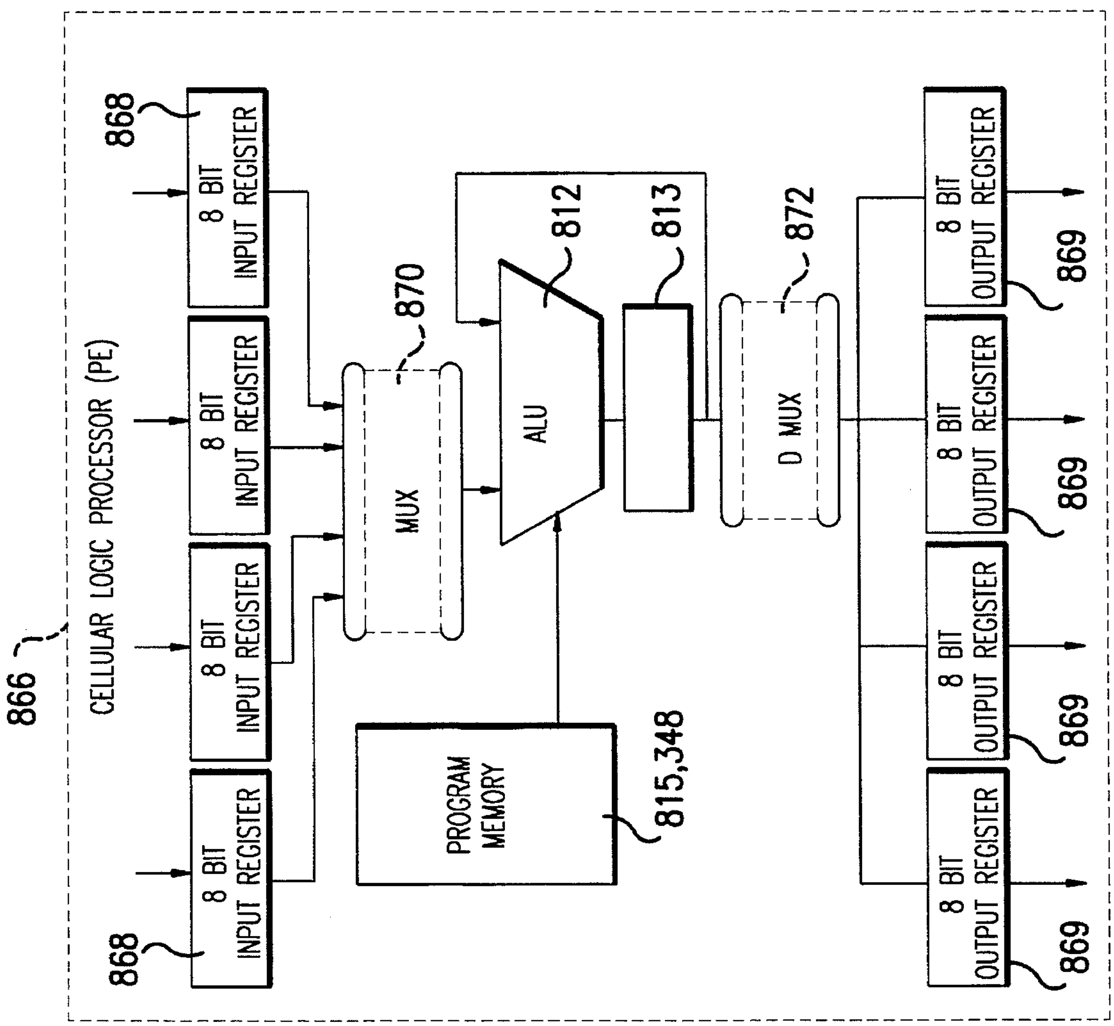
Figure 17C:
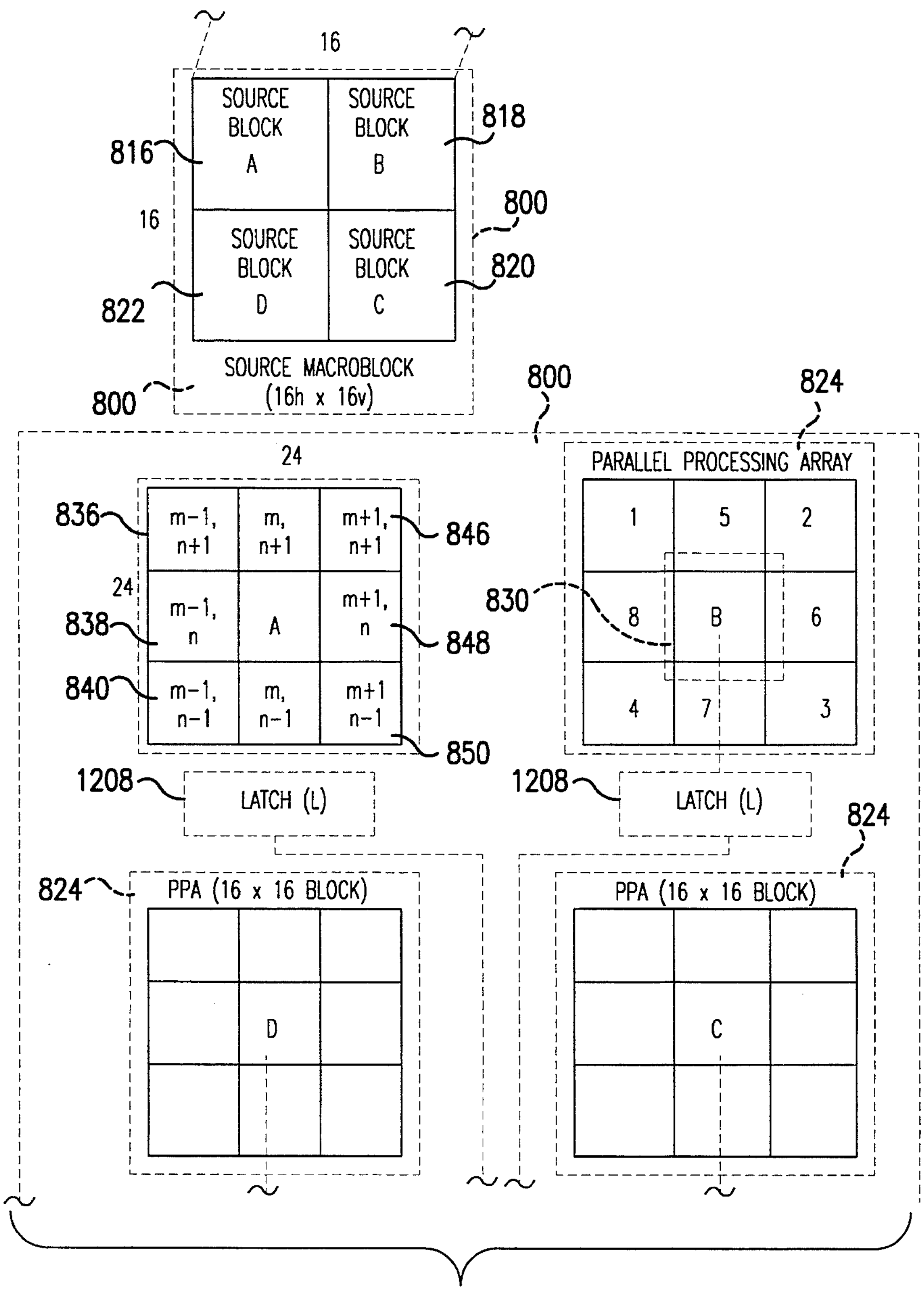
Figure 17D:
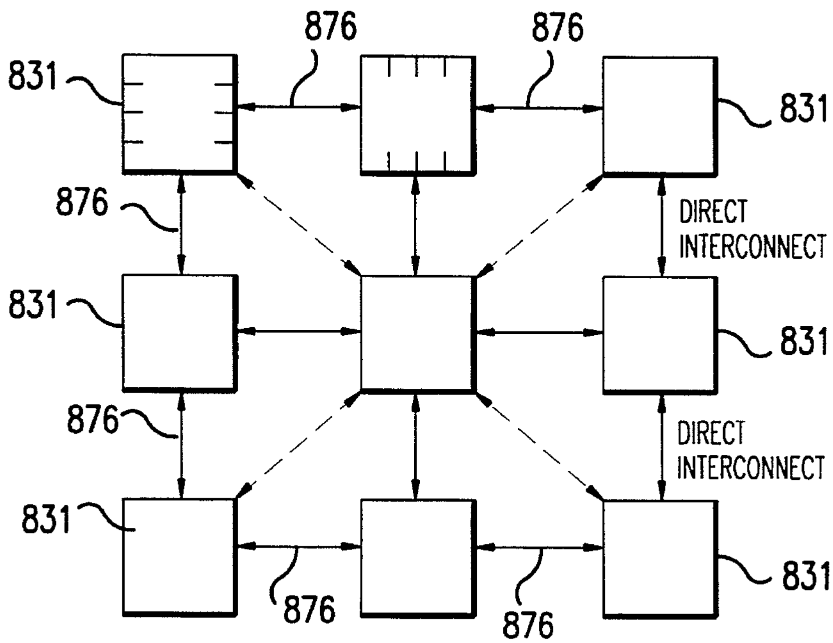
Figure 17D:
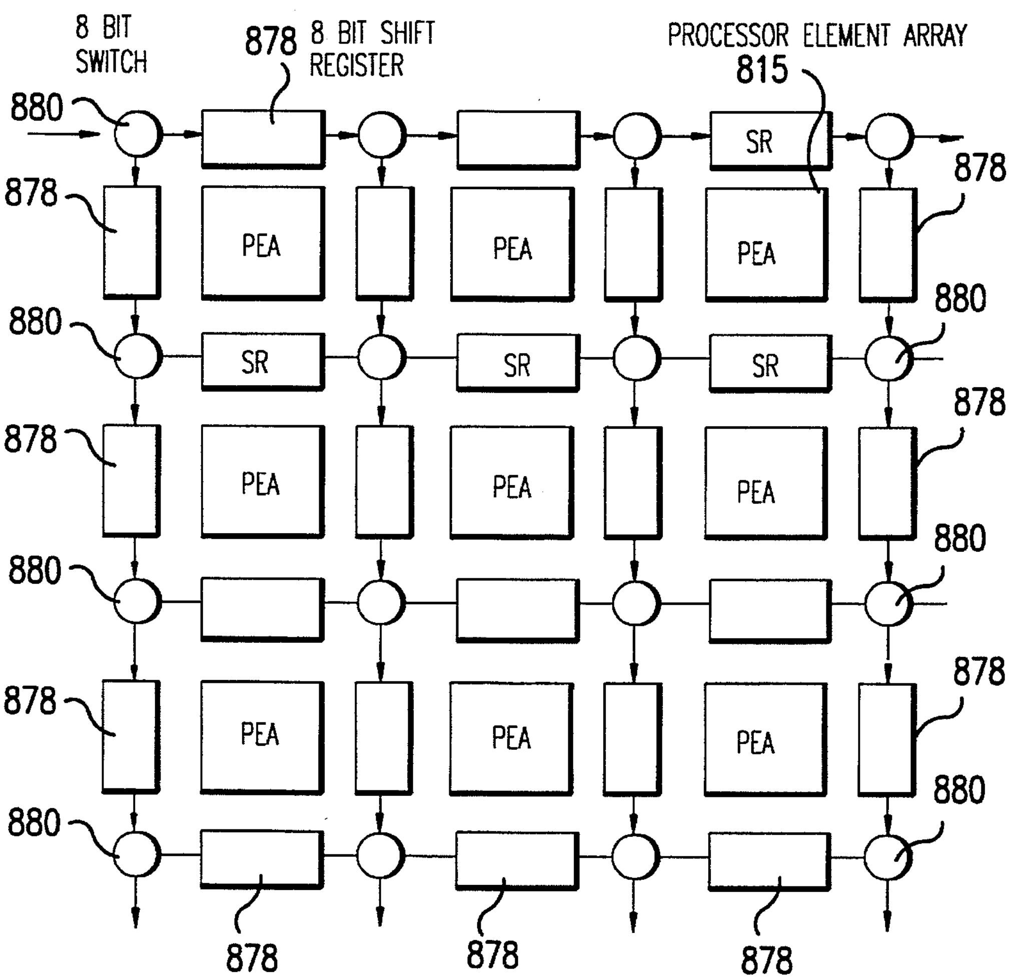
Figure 17E:
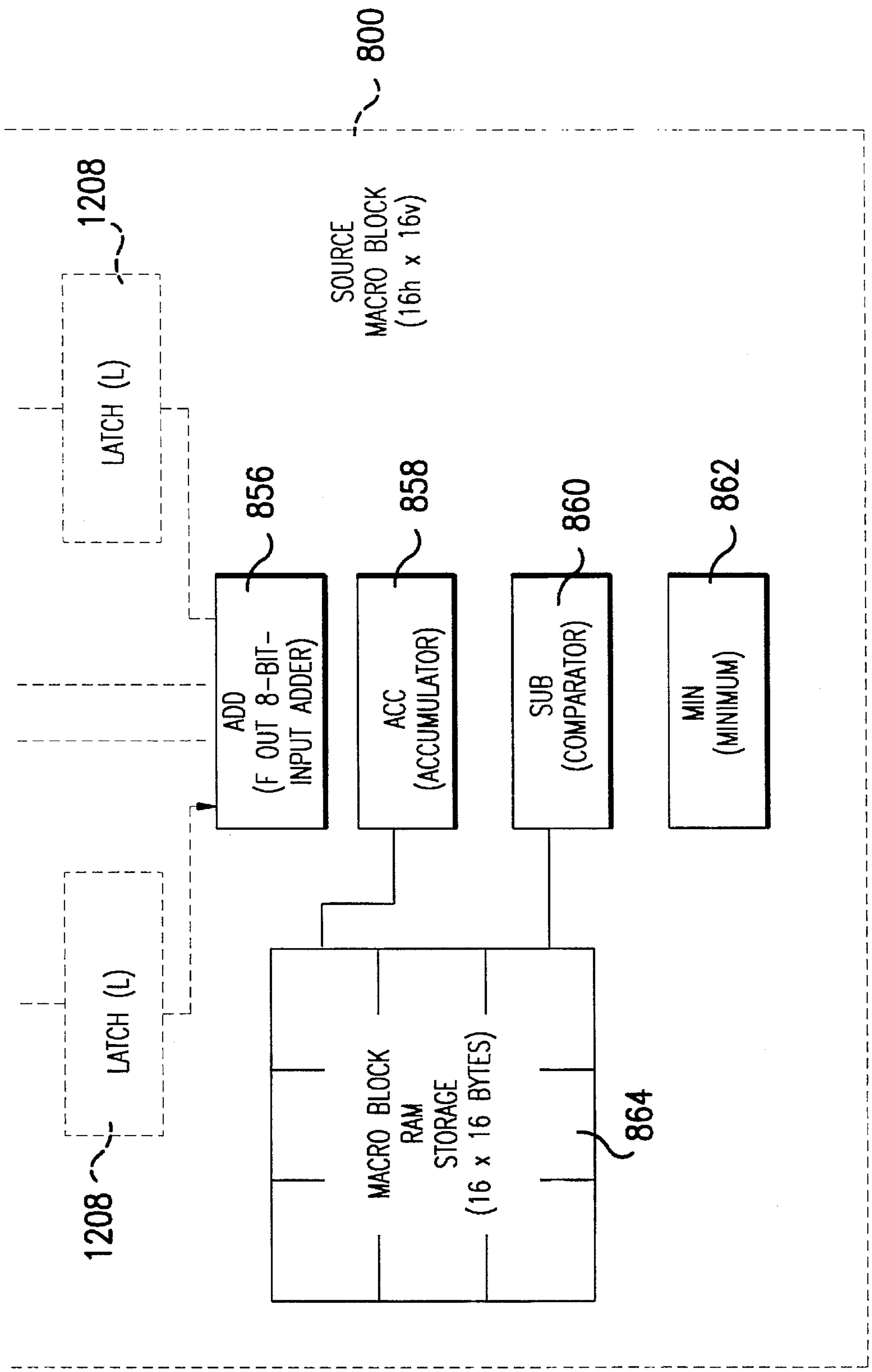
Figure 17F:
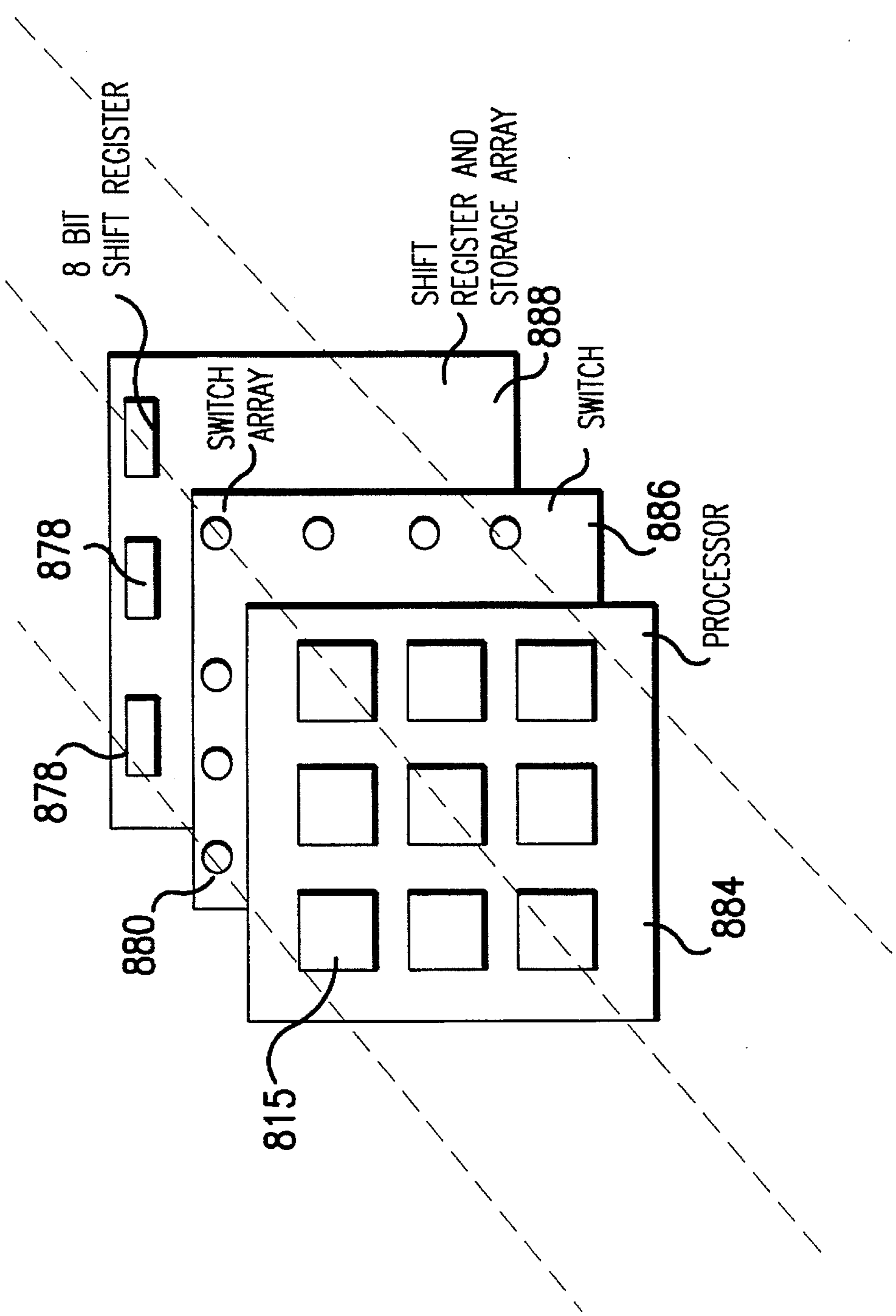

As shown in FIG. 16, we illustrate the overall system operation methodology for our invention 112. The inception of our invention imposes multiple fundamental challenges to design a consumer-oriented desktop controller which allows for exchanging a multitude forms of media articles over a wide range of communications networks.

Prior arts have shown plenty of methods and apparatus to improve the compression and decompression techniques for individual media types. We have no intent to design yet another video codec. However, since video coding algorithms are intrinsically incompatible with each other. Therefore, many incompatible system equipment will become available while each based on its specific coding algorithm. We conceive it is critical to provide a "universal joint (interface) platform", whereby incompatible equipment can freely exchange media articles through interfacing with our invention.

The first fundamental challenge of our invention is the design of a universal joint (interface) platform, which will enable the interface with multiple incompatible video coding equipment employing different video coding algorithm. Our invention employes the design of a scalable frame memory architecture reconfigurable techniques (SMART) described in FIG. 15. The basic principle of SMART allows the host processor 314 to identify types of input video image articles during the media import stage, the host processor will instruct the reconfiguration circuit 1064, and the scaler circuit 1066 to provide the required downsampling ratio. The media article can then conform (reduce) to our internal file format during the importing stage. As appropriate, it will also readjust (enlarge) to another adequate external format during the exporting stage.

The intrinsic advantage of our approach is that it can not only make incompatible system equipment interoperate together, yet more importantly, because of the smaller file size of the internal format, the real time performance requirement for our system hardware, i.s., pixel processor 306, graphics processor 1070, transform processor 308, motion processor 307, is much reduced. The size of the frame memory 312 is proportionally reduced. Since dedicated high speed hardware are no longer necessary, various coding algorithms is internally microcoded at the pixel processor 306.

The second fundamental challenge of our system is the versatility to interface with wide range of communication networks. Prior arts have shown dedicated communication interface such as integrated service digital network (ISDN), since it is to interface with single network, transmission bandwidth are deterministic (i.e., 64 kilo bits per second), therefore it is easier to design a video codec optimized for specific compression ratio to meet with said bandwidth requirement. In order to adjust bandwidth to meet with various communication network requirement, Our invention employees a bandwidth controller 144 in order to receive bandwidth requirement from the network communication processor 302, the bandwidth controller 144 will then instruct the host processor 314 to develop the appropriate compression ratio in order to meet the real time performance requirement. Bandwidth controller 144 will also interface with the transmission processor 304 in order to import and export the media article at the appropriate bandwidth.

Figure 10:
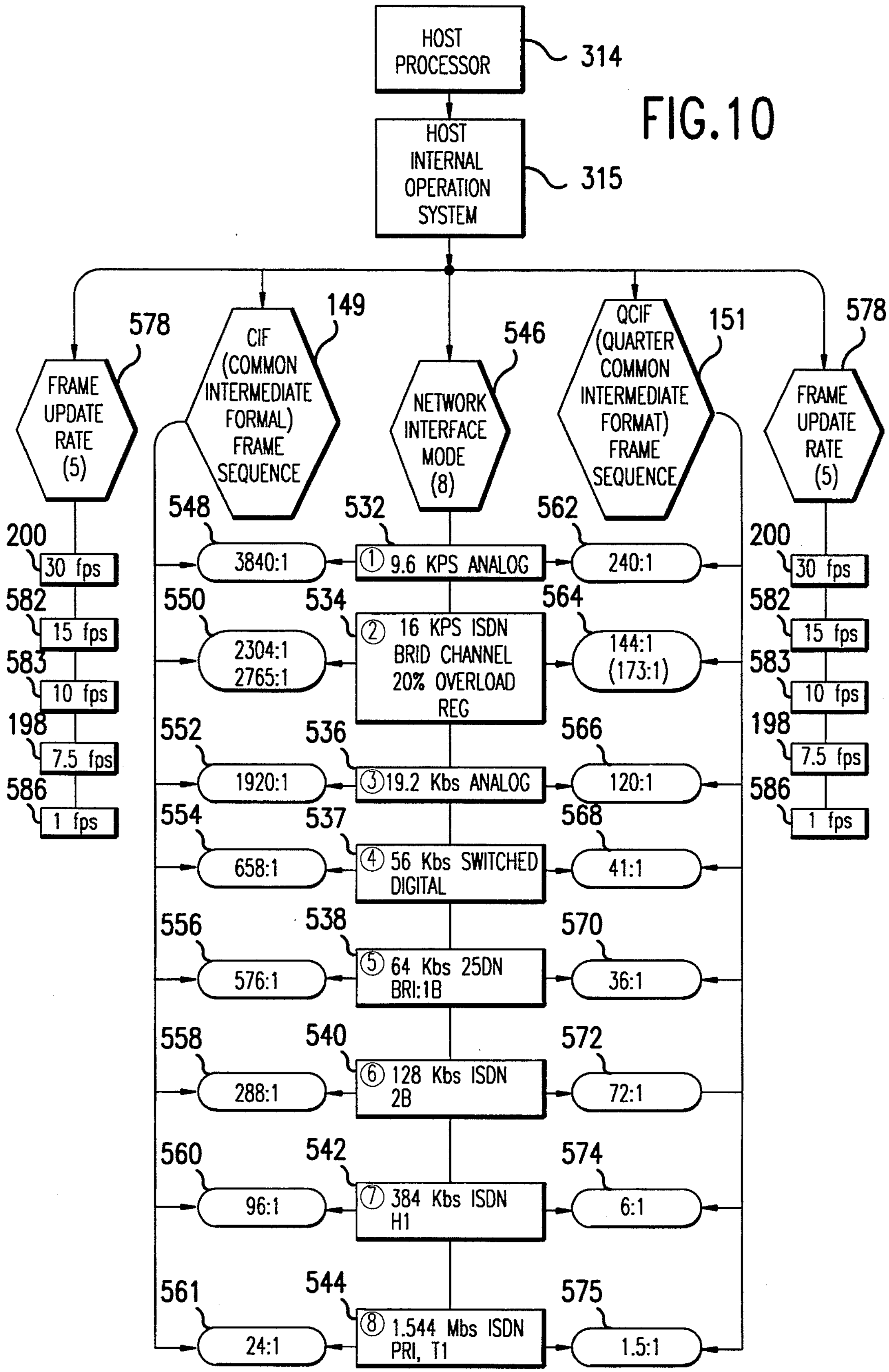
FIG. 10 illustrates the performance requirements of compression for various video standards.

As shown in FIG. 8, our invention can program the network communication processor 302, transmission processor 304, and the display processor 310 to provide the various types of communication interface. In FIG. 10, we further show the internal operation modes 315 for the host processor 314 to adapt different compression ratio in order to accommodate various network bandwidth requirement.

As an example, we have listed the following bandwidth requirements for some of the popular network interface:

a. Communicating over a analog phone line 532, whereby 9,600 bit per second bandwidth is required, a quarter common intermediate frame (QCIF) 151 format is displayed at 7.5 frame per second;

b. Communicating over a ISDN D channel 534 at 16 Kilo bits per second (Kps), The user has two options, either two quarter common intermediate frame (QCIF) 151 format is displayed at 7.5 frame per second (fps), or one QCIF frame 151 is displayed at 15 fps;

c. Communicating over a analog phone line, whereby a 19,200 bit per second bandwidth is required. The user has two options, either two quarter common intermediate frame (QCIF) 151 format is displayed at 7.5 frame per second (fps), or one QCIF 151 frame is displayed at 15 fps;

d. Communicating over switched 56 kilo bits per second (kps) digital network (PSDN) 537, QCIF 151 frames with 3 quality level options will be updated at 15 fps 582;

e. Communicating over a single ISDN basic rate interface (BRI) B channels 538 over a ISDN network, four QCIF 151 frames will be concurrently updated at 15 fps 582;

f. Communicating over a dual ISDN B channels 540 in a ISDN BRI network, QCIF 151 frames will be transmitted at 30 fps 200;

g. Communicating over a 384 kps ISDN H1 542 network, CIF 149 frames will be transmitted at 15 fps 582;

h. Communicating over a 1.544 kps T1 544 network, CIF 149 frames will be transmitted at 30 fps 200.

The third fundamental challenge of our invention is how to interface with multiple types of media articles. Namely, there are audio, still image, motion video, text, and graphics. We treat each media article as a object. A multimedia composite become overlay of various media objects. Furthermore a graphics object 1084 is as either RGB 389, VGA 153 or XGA 155 format, a text object 1085 can be either a group 3 1074, group 4 1076, or ASCI 1078 format, a motion object 1086 can be conforming to either H.261 184, MPEG 188, or others, still background object 1087 can be either conforming to JPEG 186 or others, the audio object 1088 can be either from CD audio 254, voice grade audio 171, or FM audio 1083.

Each incoming media article will be received first, and the appropriate frame size 1089 will be decided, and frame by frame difference 362 will be calculated first. For consecutive frame processing, motion vector 402 is derived, and for selective frame processing, due to the difficulty to derive motion vector 402, interpolation 398 techniques is employed to simulate frame difference signal. Decision Logic 1092 is employed to analyze situation and make final decision. In the case of scene changes 1002, system will be reset to intraframe coding 360 mode for further processing.

INTERNAL OPERATION SYSTEM CONTROL

As shown in FIG. 10, we illustrates the performance specification required for the common intermediate format (CIF) 149 and quarter common intermediate format (QCIF). Based upon the CCITT H.261 184 specification, Each single CIF frame 149 consists of 12 GOB's 1182 (group of blocks), and each GOB 1182 consists of 33 MB's 404 (macroblocks). Each MB 404 consists of 6 blocks (4 Y's and 2 U/V's). Each block consists of 8×8 pixels, and each pixel consists of 8 bit value. The QCIF 151 frame consists of 3 GOB's 1182 and these GOB's 1182 are identical to the CIF's 149.

Provided the CIF 149 frames running at 30 fps (frames per second) updates 200. The system throughput would require: 12GOB×33MB×6B×8×8×8×30 fps=36,495,360 bps (bits per second). On the other hand, the QCIF 151 frames running at 7.5 fps updates 198 will require the throughput of 3GOB×33MB×6B×8×8×8×7.5 fps=2,280,960 bps, which is one sixteenth of the required CIF 149 throughput. Provided the interface circuits (i.e. modems, switch 56-DSU, T1-CSU, or ISDN TA's) for a specific network is set up. Then we need to transmit the CIF 149 or QCIF 151 frames across this network in real time. The real time performance for a slower network requires larger compression ratio, and the coder has a significant burden on the algorithm to reduce the bit rate requirement in order to meet with the communication throughput. On the other hand, the decoder can be quite simple and low cost because the incoming compressed bit stream 511 are much reduced (compressed) and they are entering at a fairly low speed. For high speed networks, i.e., 384 kbs (kilo bits per second) or 1.544 Mbs (Mega bits per second). The compression ratio becomes much smaller, however, the system throughput is much faster. Consequently, the burden is on the hardware processing to increase the system throughput. The decoder are more expensive since they require faster circuits because the incoming bit stream 511 are less reduced (compressed), and the system throughput becomes much more demanding.

Base upon the specific communications network the system is interfaced with, the frame updating rate (fps) 578, the HP 314 (host processor) can determine the proper compression ratio requirement for the coder and determine the system throughput requirement and processing strategy for both coder 120 and decoder 122.

In our invention, HP 314 has eight (8) different network interface modes. Mode 1 is for 9.6 Kps analog modems 532, Mode 2 is for 16 Kps ISDN D channel 534, Mode 3 is for 19.2 Kbs high speed analog modems 536. Mode 4 is for switched 56 Kbs digital network. Mode 5 is for 64 Kps ISDN B channels 538, Mode 6 is for dual ISDN B channel 540 transmission, Mode 7 is for ISDN H1 384 Kbs network 542, and mode 8 is for 1.544 Mbs ISDN PRI or T1 network 544.

The frame updating rate 578 can have five (5) option, They can be at either 30 fps 200, 15 fps 582, 10 fps 583, 7.5 fps 198, or 1 fps 586. In our invention, we set 30 fps 200 as the default update rate for CIF 149 transmission, and 7.5 fps 198 as the default update rate for the QCIF 151 frame. in FIG. 10, we only illustrates the compression ratio at various networking modes under default update rates.

The CIF 149 system throughput requires 4.6 MBs (mega bytes per second), and the QCIF 151 system throughput requires 288 KBs (kilo byte per second). if we use 8 KBs as the measuring base of one (1), then for real time video transmission over an BRI (basic rate interface) ISDN (integrated service digital network), if we employ single B channel (8 KBs) as transmission channel (mode 5) 538, the CIF 149 system will require 576:1 compression, and QCIF 151 transmission will require 36:1 compression. Both B channels can be used for transmission (mode 6), then a CIF 149 system will require 288:1 compression, and the QCIF 151 system will require 72:1 compression. In the case of using D channel (2 KBs) for transmission (mode 2), since D channel required in packet forms, 20% overhead is assumed for the packetization overhead. Consequently the CIF 149 system will require 2,765:1 compression, and the QCIF 151 system will require 173:1 compression.

For a PRI (primary rate interface) ISDN or T1 network 544 (mode 8), the network throughput is 1.544 Mbs, therefore the CIF 149 system will require compression ratio of 24:1 and QCIF 151 system will require 1.5:1.

For the H1 384 Kbs switched or private network 542 (mode 7), the compression ratio of CIF 149 system will be 96:1, and a QCIF 151 system will be 6:1.

For the switched 56 kbs network (mode 4) 537, the compression ratio for a CIF 149 system will be 658:1 and a QCIF 151 system will require 41:1.

In the 19.2 Kbs analog private line or POT (plain old telephone) network (mode 3) 536, the CIF 149 system will require a compression ratio of 1920:1 and a QCIF 151 system will require 120:1.

In the 9.6 Kbs private network or POT line using analog modems (mode 1), the CIF 149 system will require a compression ratio of 3840:1, and a QCIF 151 system will require 240:1.

As a standard operation, single QCIF frame sequence 151 will be employed for mode 1 532 through mode 5 538, double QCIF 151 frame sequence will be employed for mode 6 540, and single CIF 149, single JPEG 186, or quadruple QCIF 151 frame sequences will be presented for mode 7 542 through mode 8 544.

The standard frame update rate 578 are: 1 fps 586 for mode 1 532, 1.5 fps for mode 2 534, 2 fps for mode 3 536, 6.5 fps for mode 4 537, 7.5 fps 198 for mode 5 538, 15 fps 582 for mode 6 540 and mode 7 542, and 30 fps 200 for mode 8 544.

CIF/QCIF FRAME CONFIGURATION

Figure 15:
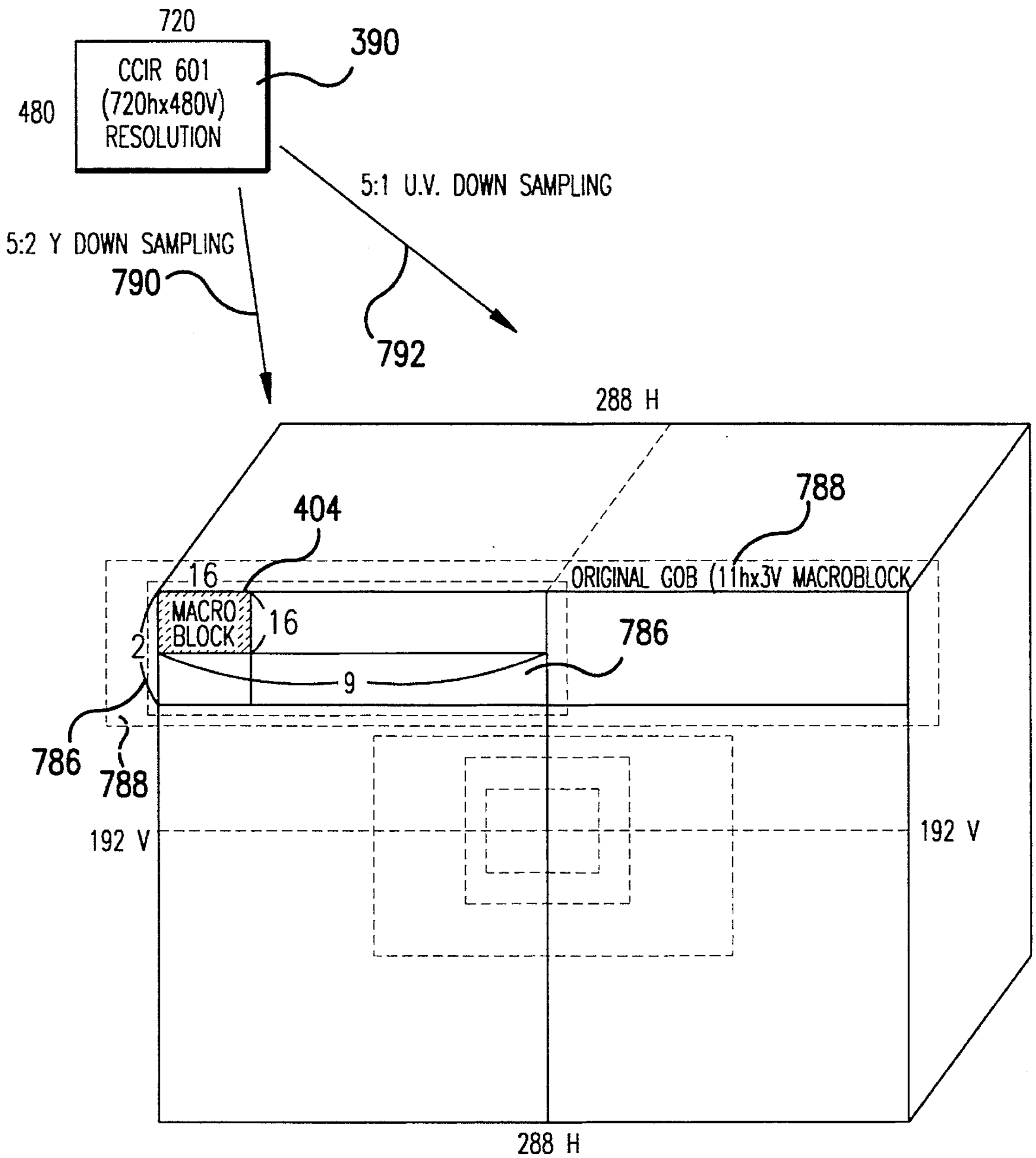
FIG. 15 illustrates the frame configurations for CCITT H.261 CIF and QCIF formats.

As shown in FIG. 15, the Common Intermediate Format (CIF) 149 and Quarter Common Intermediate Format (CIF) 151 is designed to facilitate the transportation of video information over the telecommunication network. CIF 149 and QCIF 151 are commonly applied by international coding algorithms such as CCITT H.261 184 and MPEG 188 (motion picture expert group) standards.

The CIF 149 format consists of 352 pixels for each horizontal scan line, and 288 scan line on the vertical dimension. The CIF 149 format is further partitioned into 12 group of block (GOB) 1182. Each GOB 1182 then consists of 33 macroblocks (MB) 404, and each MB 404 consists of four Y 391 blocks, one U 393 block, and one V 393 block, and each block consists of sixty four (8×8) 8 bit pixels.

The QCIF 151 format consists of 176 pixels for each horizontal scan line, and 144 scan lines on the vertical dimension. The QCIF 151 format is further partitioned into 3 GOB's 1182, and each GOB 1182 consists of 33 MB's, each MB 404 consists of 4 Y blocks 391, 1 U 393 blocks, and 1 V 393 blocks.

Each MB 404 represents 384B (bytes) of YUV 392 data, since the frame rate for CIF 149 is 30 fps 200 (frames per second), and each CIF frame 149 consists of 400 MB's, the bandwidth required to send uncompressed CIF 149 frames per second will be 4.6 Mega Bytes, which equivalent to total of 576 channels of 64 Kbs B channels. Meanwhile, since each QCIF 151 has 100 MB's, and frame updates are 7.5 fps 198, the bandwidth requires will be 288K bytes. which equivalent to total of 36 channels of 64 Kbs B channels.

To code the incoming CIF 149 and QCIF 151 frames in real time, for a 30 fps 200 updates, the time required to process each CIF MB 404 (macroblock) will be 75 us (microseconds). For a 7.5 fps 198 updates, the maximum time required to process a QCIF 151 block will be 1.2 ms (millsecond).

8×8 block DCT 418 operation will require 128 cycles. At 20 Mhz clock rate, the total time required is 50 ns×128=6.4 us.

The H.261 standard 184 demands that every 132 frames of transmission, the mode will be switched from inter to intra mode to avoid IDCT 420 accumulative error. This represents that for a 30 fps 200 updates, approximately every 4.4 second, intra CIF frame coding will be re-engaged, and every QCIF frame with 7.5 fps 198 updates, every 17.6 seconds intraframe coding 360 will be restarted.

The maximum frame size for a CIF 149 coded frame is 32 KB, and 8 KB for a QCIF 151 frame.

The Y 391 represents the luminance signal, and the U,V 393 represent the color difference signal. Both CIF 149 and QCIF 151 employes a 4:1:1 YUV 392 format, which requires downsampling of the U,V signal from the original 4:2:2 CCIR601 format 390.

4. ARCHITECTURE AND ORGANIZATION

NETWORKING ARCHITECTURE

Figure 6A:
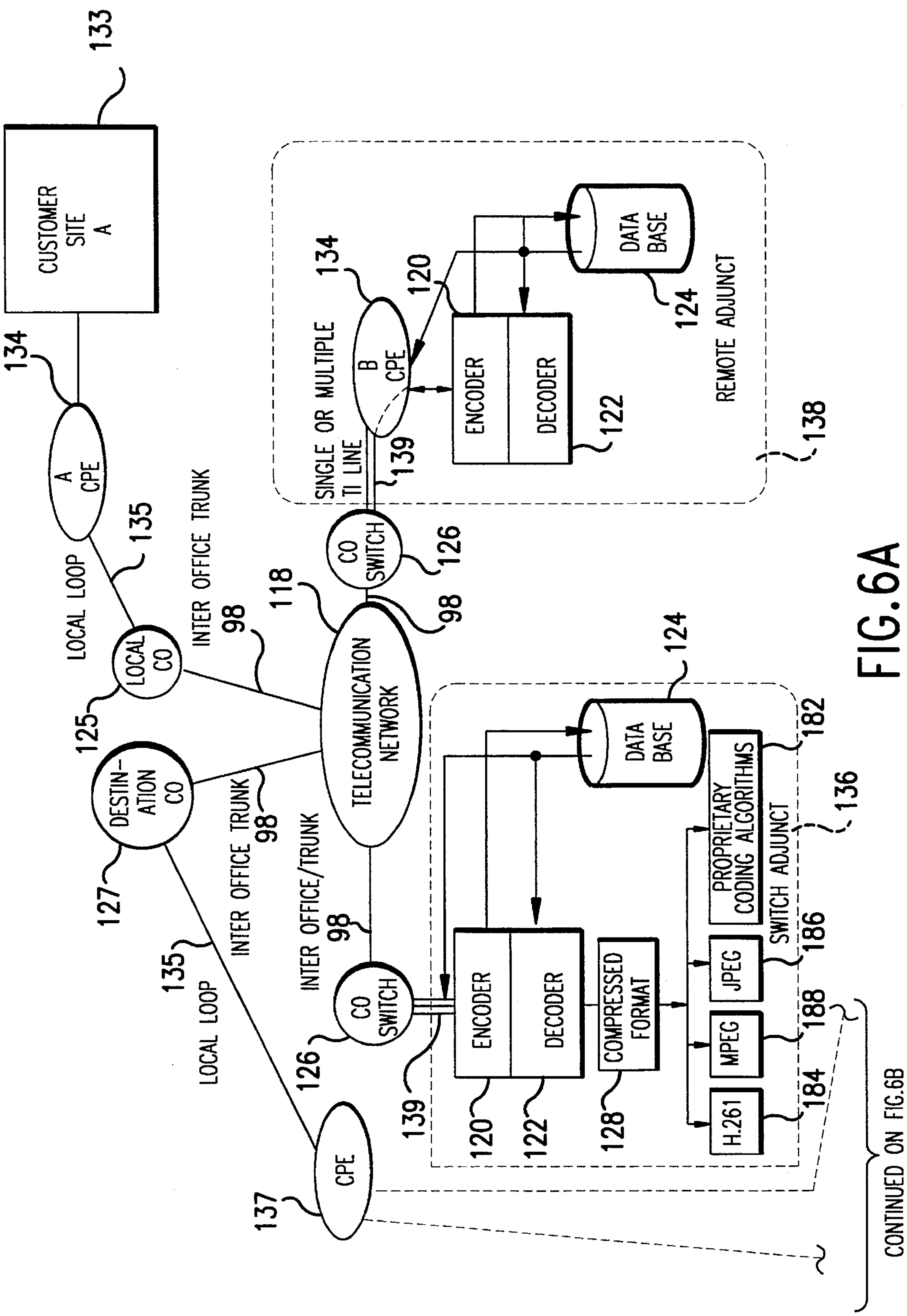
FIG. 6 illustrates a block diagram of how our invention can be operated in the distant networking 2.
Figure 6B:
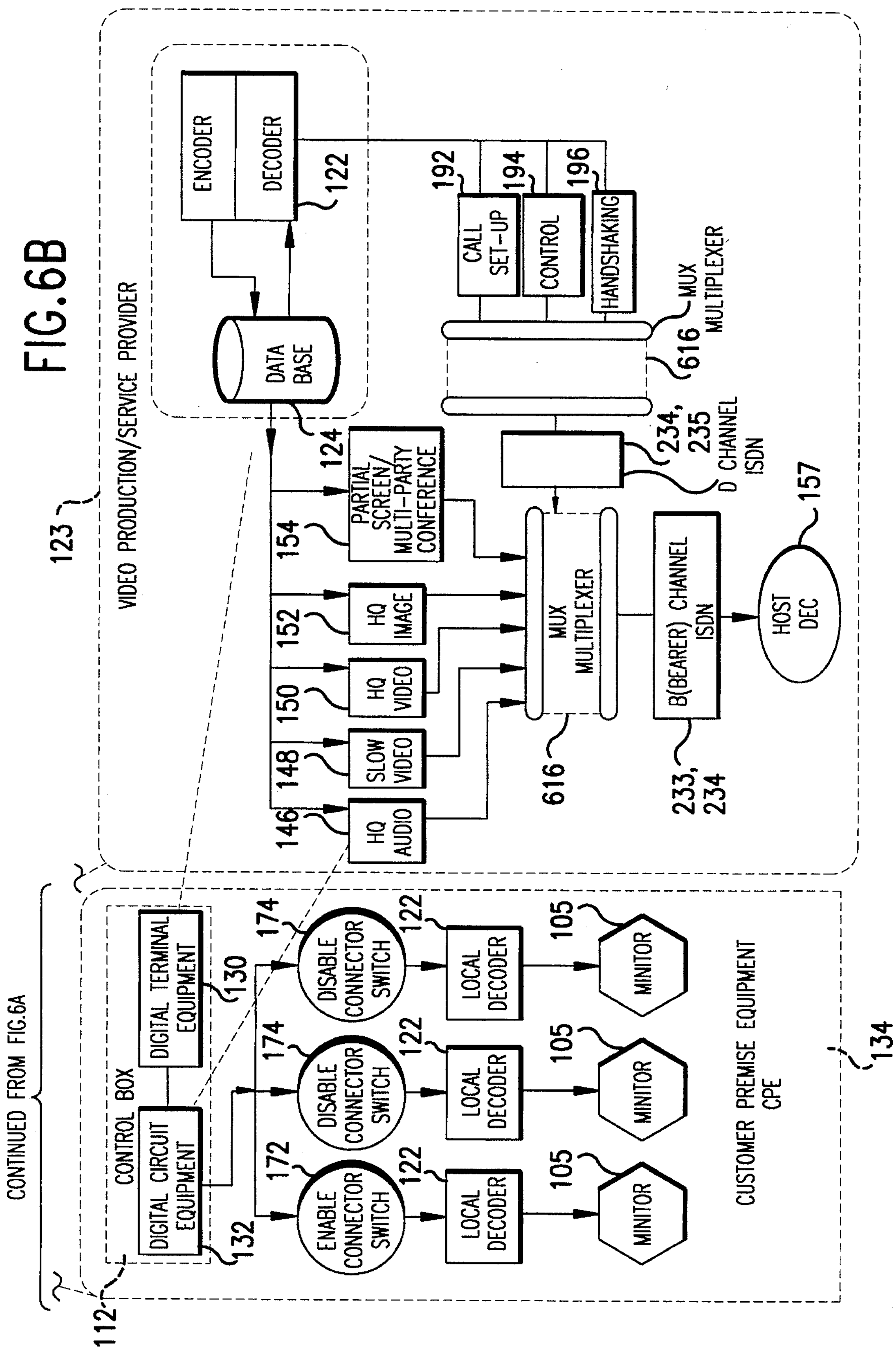

As shown in FIG. 6, we illustrates that our invention can be conveniently apply to a networking environment. A network consist of central office switches (CO) 126 located at various geographical areas. the CO's 126 are interconnected together through a telecommunication network 118 provided by long distance carrier, e.g., AT&T, Sprint, or MCI. The CO's 126 also interconnect to the customer premises equipment (CPE) 134 through local loops 135. As a example, phone call can be originated at a customer site A 133, directed by the local CO 125 and route through the network 118 and deliver to the destination CO 127. The call will then be forward to the destination CPE 137 and establish the call. The network 118 can be a traditional plain old telephone (POT) 222 network, a private line/network 224, a local 226 or wide 228 wide area network, cable TV network 119, or more advanced digital packet 230 or circuit 232 network such as Integrate Service Digital Network (ISDN) 234 or Broadband ISDN 236.

Our invention 112 consists of different implementations which may include either the encoders (E) 120 and decoders (D) 122 pair, or just the E (encoder) 120 or D (decoder) 122 itself. Typically a E (encoder) 120 can capture and compress the image or video information for ease of storage and transmission, and the D (decoder) 122 can be used at the receiving end to resemble video/image for viewing purpose. The E (encoder) 120 and D (decoder) 122 pair will be only be needed to facilitate the video production and create the image/video data base (DB) 124. For average subscriber, a low cost D (decoder) 122 will be sufficient to allow viewing purpose.

As a CO switch adjunct 136, a video production facility can be set up next to the CO 126 site using E (encoder) 120 to capture and edit image/video sequences. The image and video programs can then be stored at the DB (data base) 124 resided next to the CO switches 126. Based upon the request from the local CPE's 134 (customer premise equipment), the video facility will provide the adequate programs and send to the customers' CPE 134 through local loops 135. The image/video data stored at the DB (data base) 124 will be in the compressed format 511, which can be in the proprietary format 182 for security purpose, or conform to international standard format (H.261 184, Motion Picture Expert Group (MPEG) 188, or Joint Photograph Expert Group (JPEG) 186 for ease of interface. The link between the CO 126 and the video production/data base facility requires high speed link 139 which is implemented in single or multiple T1 lines. Provided the video production/data base facility is adjacent to the CO switch 126, any of the high speed interconnect schemes 139 such as LAN (Local Area Network), single or multiple mode fiber optics or coax cable can be employed. Alternatively, a remote adjunct 138 approach is recommended for video studio production facility 123 to be conveniently set up at any of the local CPE 134 site. Instead of connecting through local loops 135, the video codec/database 123 directly employ high speed dedicated communication link 139 to the CO switch 126. Such high speed communication link is implemented using a single or multiple T1 leased lines 139. Therefore, through such readily available CO 126 and telecommunications network 118 resources, the local video production 138 has the appearance of residing next to the CO 126 and it also have the ability to provide many of the flexible video or image based Centrex applications and service to the remote subscribers through telecommunication network 118.

At the CPE 134 site, the Digital Terminal Equipment (DTE) 130 are various types of analog or digital modems 190 which interconnect the Digital Circuit Equipment (DCE) 132 with the local loops 135. The DCE's 132 are the host computer 314 which can conduct bandwidth management 144, namely to monitor and control the local distribution of video programs. The DCE host 132 interconnect the DTE's 130 with the local decoders (D) 122 and monitors 105. Depending upon the local loop 135 conditions, the DTE 130 transmission rate may vary from time to time, Consequently, the DTE 130 must notify the DCE 132 to select the appropriate image/video types accordingly. The DCE host 132 has a choice to select between high quality audio 146, slow video 148, high quality video 150, still image 152, or provide multi-party partial-sreen conference 154 call. For example, a four party conference can be displayed using four quarter-screens. Naturally, the high quality video 150 requires the highest bandwidth, and the still image 152 requires the least bandwidth. At the local CPE 137, only the low cost decoders 132 are required to attach with the DCE host 132 for receive only purpose. Control signals will be provided from the remote CPE 134 or switched 126 based video service provider 123. Consequently, DCE 132 will enable 172 or disable 174 the connector switch to allow qualified subscriber for viewing specific programs. Provided the network 118, the CO switch 126, the local DCE 132 and DTE 130, and remote video service provider 123 all have ISDN 234 capability, the bandwidth management 144 function can be conveniently implemented using D channel 235 to provide the call set-up 192, control 194 and handshake 196 signals between the local DCE 132 and the remote video provider 123. After the call is set up 192, The single and multiple B channels 233 can then be used to transmitted video and image program information form the database 124.

CONFERENCE CONTROL, STORE AND FORWARD, AND BANDWIDTH MANAGEMENT

Figure 7A:
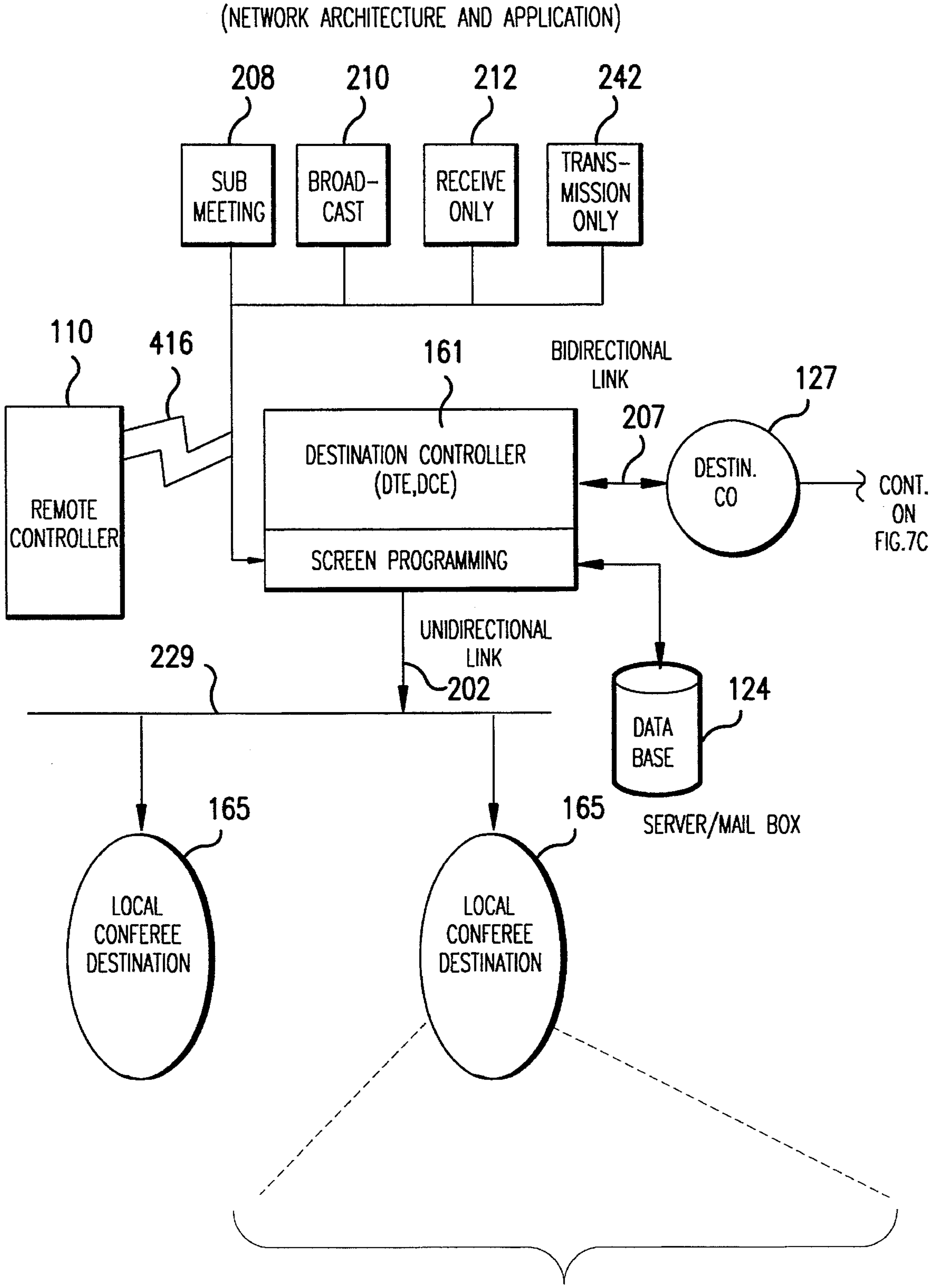
FIG. 7 illustrates the methods of how our invention is used to control teleconference, make ease of the communication bandwidth, and provide store and forward services.
Figure 7B:
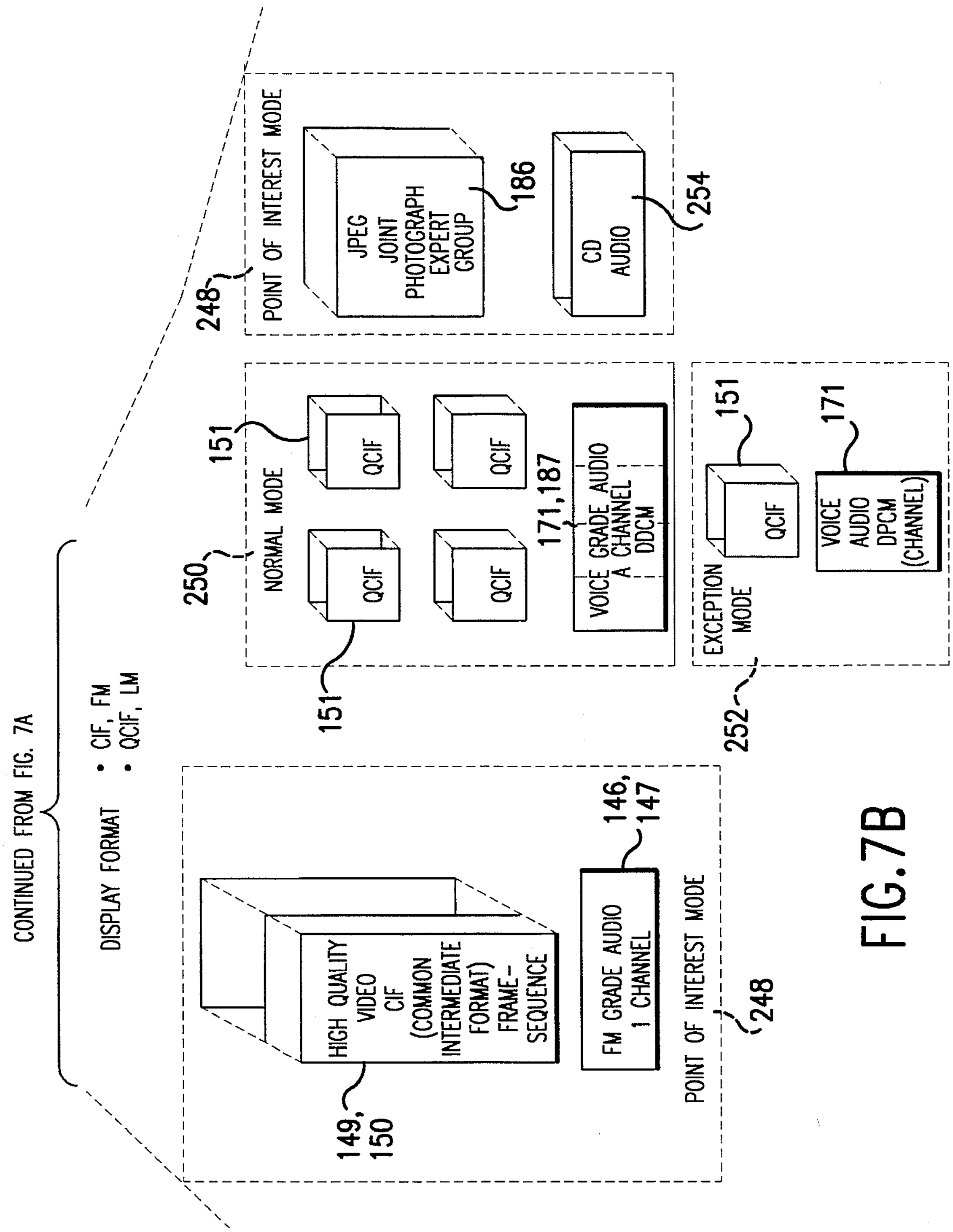
Figure 7C:
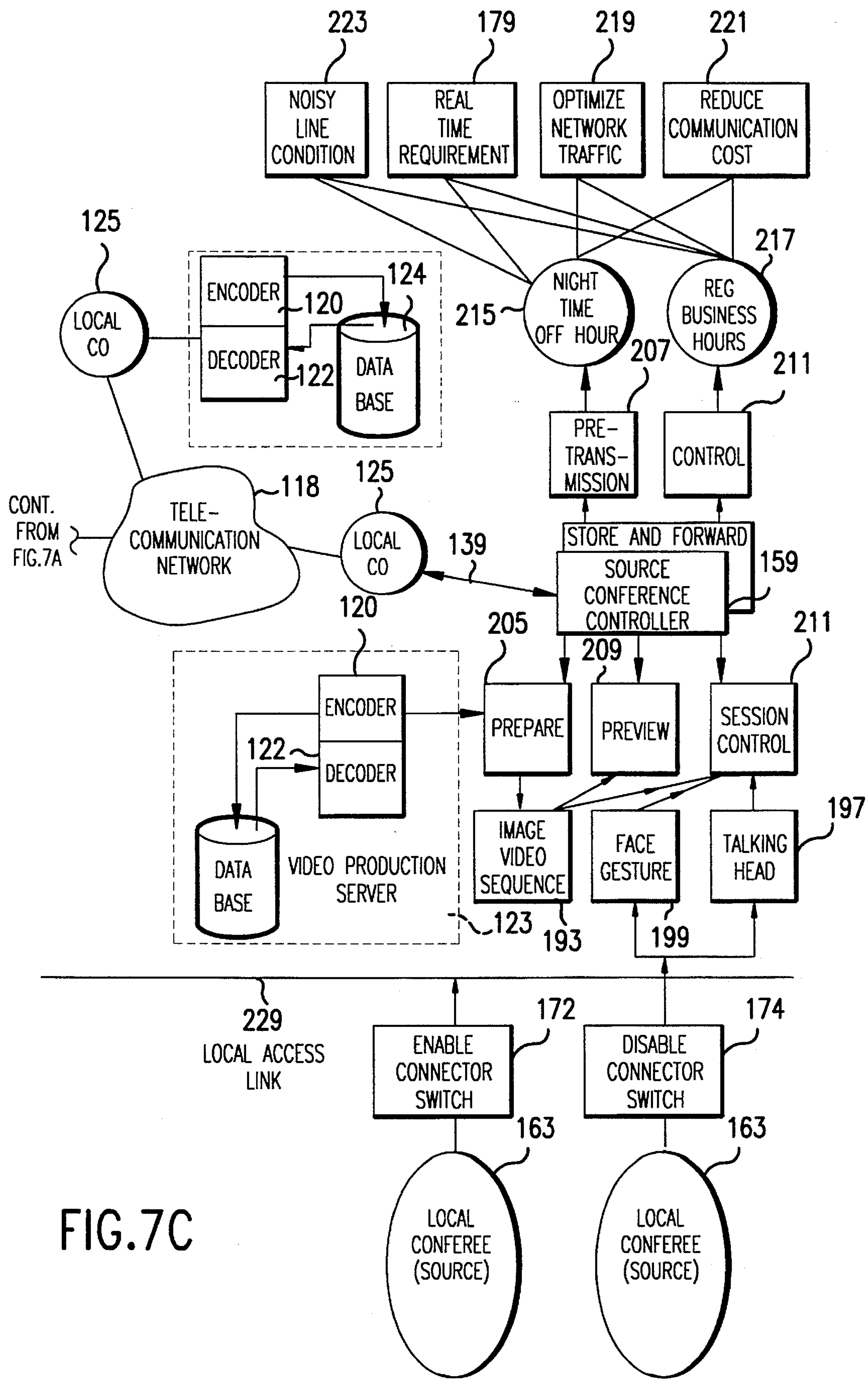
Figure 8A:
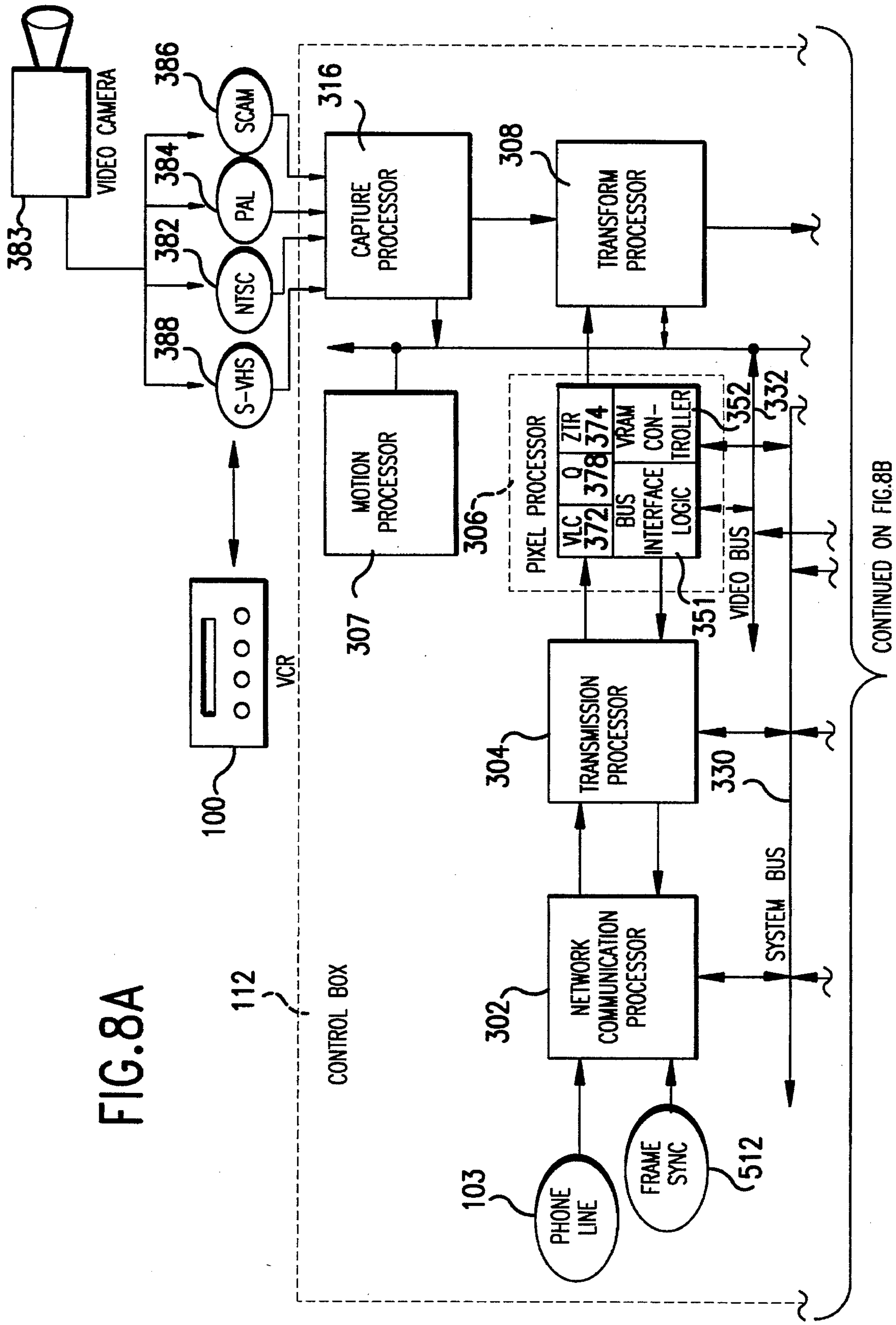
FIG. 8 illustrates a block diagram of all major critical system components required for the design of our invention.
Figure 8B:
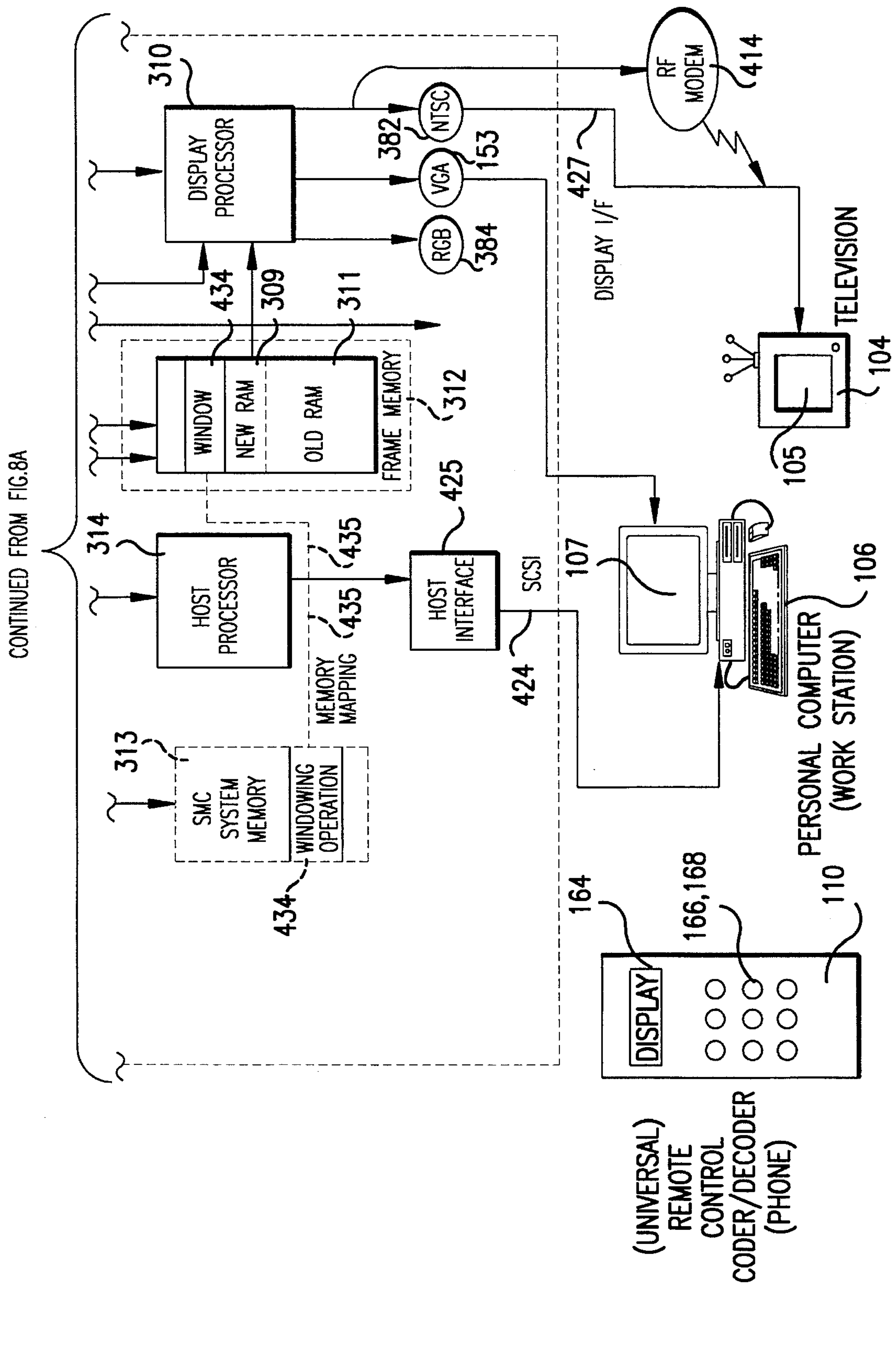

As shown in FIG. 7, we illustrate that our invention 112, in conjunction with the DTE 130 and DCE 132 pair can be interconnected with the network 118 through local loops 135 to perform as teleconference controller 157. The source teleconference controller 159 first prepare 205 video presentation material for the meeting employing switched adjunct based 136 or remote CPE based 138 video service provider facilities. Preview materials 209 can be pre-transmitted 207 to the destination conference controller 161 prior to the meeting for previewing 209 purpose. The destination controller 161 stores these meeting material at local database storage 124 until the session 211 starts. Since the pre-transmission 207 can be completed during off-hours or night-time 215, while conference sessions 211 often require to conduct during regular business hours 217. This allows significant advantage to optimize the network traffic 219 and to reduce telecommunication cost 221. since image/video sequence 193 demands tremendous bandwidth. During meeting sessions 211, the bandwidth will be totally dedicated to the transmission of conferee's talking heads 197, face gestures 199 for a face to face appearance. The correct presentation sequence 193 can be directed by simply sending the short session control 211 message from the source controller 159 to the destination site 161.

The source controller 159 is interconnected with the local conferees 163 via LAN (local area network) 226, COAX cable 227 or any acceptable local interconnection schemes 229. The source conference controller 159 also have the control capability to select the qualified meeting participant 163 through the enable 172 and disable 174 switches. The local access link 229 between the conference controller 159 and conferees 163 are unidirectional links which can be either a transmitting or receiving link. The network access link 207 between the conference controllers 159, 161 and the network 118 are bi-directional link 207 which allows simultaneous transmitting 242 and receiving data. The network access link 139 allows the real time communication to manage bandwidth 144 between the conference controllers 159, 161, the CO switches 125, 127, the network 118, and the video service provider 123. The local access link 229 allows the meeting session to be either in the broadcast mode 210, or selective transmission mode 208. receive only, 212, or transmit only 242. Typically, the source controller 159 will first consult with the local CO switch 125 regarding the network traffic 219 and line (local loop) condition 223 to determine the bandwidth allowance. The conference controller 159, 161 can then consult with the conferees 163, 165 to determine a preferred image/video display format which can be either high quality video 150, slow motion video 148, still image 152, or high quality audio 146. For example, the high quality video 150 format can be a CCITT Common Intermediate Format (CIF) 149 which consist of 352×288 (352 horizontal pixels per line, and 288 vertical lines) of resolution. A typically CIF frame 149 need to be updated at thirty frames a second 200. On the other hand, medium to low quality video sequence can be provided using Quarter Common Intermediate Format (QCIF) 151. A QCIF 151 format will consist of 176×144 resolution, and only require updating 7.5 frames every second 198. The significance is that during the normal mode 250, the conference controllers 159, 161 can show four QCIF 151 slow video sequence 148 simultaneously until the point of interest (POI) sequence 248 is identified. Then the user can make request to the controllers 159. Once the request is granted, The display screen can then be zoomed, single high quality CIF 149 full motion 150 sequence will be shown. The audio channel 1088 can also have the options of single channel high quality (Compact Disk) audio 254 or multi-channel voice grade 171 quality. Whenever the network becomes congested 219 or line condition becomes noisy 223, the conference controller 159 will switch to the exception mode 252, and automatically drop from four QCIF video 151 and normal voice quality audio 171 sequence to a single QCIF video 151 with regular voice grade audio sequence 171 in order to conserve bandwidth 144. Once the line 223 or network traffic 219 condition improves, the conference controller 159, 161 will return to the normal mode 250 of operation. During the POI 248 (Point of Interest) mode, The controller 159 either provide extremely high quality still image sequence 152 conforming to Joint Photography Expert Group (JPEG) 186 standard with multi-channel CD quality audio 254, or high quality CIF 149 full motion video sequence 150 with multi-channel voice grade audio 171. The voice sequence is typically compressed into Differential Pulse Code Modulation (DPCM) 187 standard format.

During, or outside the conference session 211, the conference controller 159 can be operated in a local distribution mode. Namely, the conference controller 157 will perform as a video server 123, which can store and access the local database 124, and broadcast 210 video programs to the surrounding local users 163 through LAN, WAN, ISDN, or FDDI network. The video programs 511 will be stored and transmitted in the compressed format conforming to Motion Picture Expert Group (MPEG) 188 standard. Since MPEG 188 typically operates at the bandwidth of 1M bits per second or higher. Until the telecommunication network becomes capable of operating at such high bandwidth. The physical distance of MPEG 188 video distribution will be limited by the transmission technology.

The other significant feature of a conference controller 159 is that it can be used in the video store and forward applications. Namely, instead of real time conferencing, whenever the callee 165 is not available, the caller 163 can forward and store the compressed CIF 159 video/DPCM 187 audio message at the video mailbox 124 provided by the destination conference controller 161. When the callee 165 returns, he will be alerted by the conference controller 176 with a blinking message light, he then can access and retrieve a copy of the video massage form his mailbox 124, decompress and playback through his local video decoder 122 and display 105, remark with annotation and comment, re-compress 120 into the CIF 149 and DPCM 187 format, and forward and store back the return message to the original caller's 163 conference controller 159. The remarks can be either in audio, video, or combination of both. The extension of this is that a video service provider 123 can replace both the source controller 159 and destination controller 161, and to provide video store and forward service to anyone who is accessible by the telecommunication network 118, and equip with a low cost video decoder (receiver) 122. The video service provider 123 can be either switched adjunct based 136 or remote CPE based 138. The remote control device 110, which can be implemented by either a universal coder, or a modified cordless phone 117. The device is designed to provide a friendly interface between the conference human host 163, 165 and the conference controller device 159, 161. The screen programming techniques 156 are employed so that a designated screen area is allocated to show the current mode of operation 248, 250, 252, the bandwidth management functions 144, and the available user specific options. Through point and select, the user (conference host) 163, 165 manage and program the conference controller 159, 161 without any traditional programming. The typical user (host) specific options are that the conducting of a local submeeting 208, choosing universal 210 or selective 208 broadcasting, or selecting the transmission 242 or receiving 212 mode for the local access link 229.

MODIFIED CIF PROCESSING and SCALABLE FRAME MEMORY DESIGN TECHNIQUES

As shown In FIG. 16, we illustrate a technique in order to optimize the performance constraint for encoding a CIF 149 frame. To achieve a 30 fps 200 screen updates, the time required to encode a macroblock (MB) 404 is only 75 microsecond (us). a single 8×8 DCT 418 operation itself, running at 20 Mhz clock rate, will consume 6.4 us (128 cycles). Since it takes six DCT 418 operations to complete each 4Y, 1U, and 1V blocks within each MB 404. The total time required for a single DCT hardware device to execute DCT 418 transform coding will take 38.4 us. which means there are only 36.6 us left for the other time demanding tasks such as motion estimation 403, variable length coding 372 and quantization 378.

Although pipeline and parallel processing techniques can be applied to improve the system performance. For example, six DCT 418 pipeline processor can be cascaded in parallel to directly execute the 4Y, 1U, 1V blocks in parallel. Although this may be adequate for business computing market, where price barrier can be much higher, we strongly feel other low cost solution must be developed for the consumer based mass market.

Our strategy is to reduce the standard CIF 149 format to a modified CIF format with slightly coarser resolution and yet the integrity of the standard CIF 149 and QCIF 151 format can still be maintained. The capability of run-time switch to a standard QCIF 151 format is mandatory, since as part of the standard and exception modes. the system has a option to choose QCIF 151 instead of CIF 149.

Our computer simulation illustrates that if we modify the internal CIF 149 frame to a 288h×192v resolution, and modify the internal QCIF 151 frame to a 144h×96v resolution, we are still able to achieve close to original CIF 149, QCIF 151 quality at the output display. We are also able to maintain the 4:1:1 integrity for the Y 391, U 393, and V 393 signal. Each CIF 149 frame will still retain 12 group of blocks (GOB) 1182, and each QCIF 151 frame will still maintain 3 GOB's. Each MB 404 will still consist of four blocks (16h×16v pixels), each block is still 8h×8v, and each pixel is still 8 bit deep. Consequently, each MB 404 will still maintain four luminance 391 (Y) blocks, and two chrominance 393 (one Y, and one V) blocks. The only difference is that each GOB 1182 will now consist of 18 (9 horizontal <h>, 2 vertical <v>) MBs 404 while the original CIF GOB consists of 33 (11h, 2v) MB's 404.

In the actual implementation, We conveniently accomplish this during the input and output color conversion process. That is, the CCIR601 image 390 input which consists of 720h×480v resolution can be downsampled 5:2 to the 288h×192v Y resolution, and further downsampled 5:1 to the 144h×98v U,V resolution. At the output display, the Y, U, V 392 can perform 2:5 upsampling for the Y 391, and 1:5 upsampling for the U, V 393.

The significance of this modified CIF 149 design approach is that, first of all, the internal processing performance requirement is reduced by 46%, which means we are now allow to use slower and more economical hardware for encoder 120 processing. Meanwhile, memory subsystem which includes the frame memory 312, FIFO's 344 dual port SRAMs 348 has always been the determining factor for our system, we can now reduce such cost by at least 46% through reducing the quantity of the memory devices, and employ slower memory devices.

The second significance of our approach is that it is totally scalable. That means we can further scale down our modified CIF format to meet with our application requirement, production cost, or simply drop from one finer format to a coarser format to meet with the real time encoding requirement. As an example, we can also implement a CIF frame 149 in 144h×96v resolution, and a QCIF frame 151 in 72h×48v resolution.

Consequently, our invention propose to employ standard CIF 149 and QCIF 151 format when cost performance is acceptable. Otherwise, we propose to employ a scalable frame memory architecture so that various frame format can be adapted for the modified CIF 149 and QCIF 151 frames. As an example, the following frames can be elected.

| CIF | QCIF | Mode |
|---|---|---|
| 352 h × 288 v | 176 h × 144 v | standard |
| 288 h × 192 v | 144 h × 98 v | modified |
| 144 h × 98 v | 72 h × 48 v | modified |
| 72 h × 48 v | 48 h × 24 v | modified |
| 48 h × 24 v | 24 h × 12 v | modified |

This scalable frame memory architecture also allow our invention to partition the frame memory 312 into sections of modified frames and to allow multiple processes running for each frame section. As a example, a frame memory of 352h×288v size will allow to scale down to a single 288h×192 v section, four 144h×98v sections, sixteen 72h×48v sections, sixty-four 48h×24v sections or any of the mixed combinations. all of the sections can be operating in parallel using high speed hardware, pipeline, multiprocessing, or any other practical methods.

We have also apply our scalable memory architectural techniques (SMART) to provide remote MPEG 188 (motion expert picture group) motion video playback. Standard MPEG 188 provides four times of the resolution improvement over the existing CCIR601 standard 390. Namely, the standard MPEG 188 can provide 1440h×960v resolution. The significance is now that we are not only able to run each memory section as a concurrent process, we are also able to offer total compatibility between the two standards, MPEG 188 and H.261 184. Although MPEG 188 standard was designed originally only to provide high resolution motion video playback, We are now able to offer the total compatibility between the two standards, and to further allow use of H.261 184 transmission codec facility to transmit compressed MPEG 188 programs across the network. We are also able to manage and provide the remote access of MPEG 188 video programs employing our proprietary inventions such as conference controller 159, 161, store and forward, and video distribution 123.

We can either down-sample a MPEG 188 frame into one of the modified CIF 149 frame formats or we can simply send the compressed MPEG 188 frame by partition it into multiple modified CIF 149 frames. For example, a 1440h×960v MPEG 188 frame can downsample 5:1 into a 288h×192v modified CIF 149 frame for transmission, and decode at the other CPE 134 end using a standard CIF 149 decoder, and then upsample 1:5 to display at the standard MPEG 188 resolution. The alternative would be to send this standard MPEG compressed frame in twenty-five modified CIF 149 frames (each equipped with 288h×192v resolution). The MPEG 188 decoder is required to decode the MPEG 188 sequence once it is assembled at the customer site CPE 137.

As an example, the following frame formats are recommended to interchange between the H.261 and MPEG standards.

| MPEG | Q-MPEG | Type |
|---|---|---|
| 1440 h × 960 v | 720 h × 480 v | standard MPEG |
| 1152 h × 768 v | 576 h × 384 v | modified MPEG |
| 576 h × 384 v | 288 h × 192 v | modified MPEG |
| 352 h × 288 v | 176 h × 144 v | standard CIF/MPEG |
| 288 h × 192 v | 144 h × 98 v | modified CIF/MPEG |
| 144 h × 98 v | 72 h × 48 v | modified CIF/MPEG |
| 72 h × 48 v | 48 h × 24 v | modified CIF/MPEG |
| 48 h × 24 v | 24 h × 12 v | modified CIF/MPEG |

It is envisioned that such SMART (scalable memory architecture techniques) can eventually encompass the emerging high definition TV (HDTV) standard and to allow totally compatibility and interoperabiity among various international video and television coding standards.

These modified formats have the significance that, because of their compact size, they become very handy to represent the moving objects 1086 (foreground). Namely, the background (still) information 1087 will be pre-transmitted during the intra frame 360 coding mode, only the different moving objects 1086, accompany with their associated motion vectors 402 (described at the next figures) will be transmitted during the inter frame 660 coding mode. Depending upon the size of the moving object, the appropriate size of the modified format will be employed. At the decoder 122 end, the moving objects 1086 will be overlaid with the still background 1087 context to provide motion sequence. This is particularly useful for "talking head" teleconferencing applications, while large background information are typically stationary and unchanged. Only lips, eye, or facial expression changes from time to time.

SMART is also particularly applicable to progressive encoding of images when bandwidth need to be conserved. SMART will choose the coarsely modified CIF 149 format to transmit the first frame, then use the slightly larger modified CIF 149 to send the next frame. Within one or two seconds, the complete image sequence will be gradually upgraded to the original CIF 149 quality.

It is also worthy mentioning that the unused CIF MB's can still be used to facilitate remote control 110 based screen programming 156. Such area will be made available for manual selection or text display when the remote control device is point at our invention. Such area can also be used to playback preloaded video programs from the local host or server storage.

It is worth mentioning that most of these real time performance constraint are mostly resided at the encoder 120. During the mostly common interframe mode 660, since the decoder 122 only requires to process the compressed blocks, i.s., those blocks retaining frame difference 362 information, the processing constraint is much less except when the system is forced updating to a intraframe 360 mode after every other 132 frames of transmission.

On the other hand, the real time constraint for QCIF 151 is much less strenuous. The real time requirement to process a QCIF 151 macroblock (MB) 404, at a 7.5 fps 198 updates, is 1.2 ms (millseconds).

MOTION ESTIMATION PROCESSOR

As shown in FIG. 17, we illustrate the improved method of motion estimation 403 and the design of a motion processor (MP). Conforming as one of the H.261 coding 184 option, MP 307 is designed to identify and specify a motion vector (MV) 402 for each of the macroblock (MB) 404 within the old (existing) luminance (Y) frame 391. The MV's 402 for the U, V 393 frames can then be figured as either 50% or truncated integer value of these Y frame MV's 402. The principle is that for each of these 16h×16v source MB's 404, the surrounding 48h×48v area of the new (updated) frame will be searched and compared. The one MB 404 results in the least distortion (best match) will be identified as the destination MB. The distance between the source and destination MB will be specified as the MV 402. H.261 184 specifies the range of the MV 402 limit as 15.

The direct implementation of a MP require that, for each of the source MB (i*, j*). The corresponding 48h×48v area in the new frame 309 must be searched and compared to identify the destination MB (i, j) 404, namely the one with the least distortion. This approach will require a total of 48×48×16×16=589,824 cycles of search and compare operations for each of the MB 404 within the old frame 311. Provided the search and compared operation can be fully pipeline, a instruction cycle time of 0.13 ns (nanosecond) is still required, this is much too time consuming for the 75 us (microsecond) per MB 404 real time requirement at 30 fps updates.

In order to design a MP 307 to meet such real time performance requirement, parallel processing and multiprocessing techniques must be employed. Besides, the basic operation of MP 307 reveals that only byte wide pixel level simple ALU (arithmetic and logic unit) operations are required, e.g., a 8 bit search and compare operation for each of the luminance (Y) pixels. Therefore, we strongly felt a design of fine grained, tightly coupled, parallel pixel processor architecture may yield the best results.

Our design is centered around the realization that each old MB 404 can first be partitioned into four 8×8 blocks: A, B, C, and D. We then designed a architecture based on four corresponding parallel processing arrays (PPA) 824. Each PPA 824 array consists of 24×24 processor elements (PE's). Such PPA's 824 array can each further be configured into nine (9) regions of macro processor elements (MPE's) 830. These nine region of MPE's 830 are tightly coupled together. Namely, region (m*, n*) of the old frame can have direct interconnection and simultaneous access of region (m, n) and its eight nearest neighboring regions from the corresponding new frame. They are: (m−1, n+1), (m−1, n), (m−1, n−1), (m, n+1), (m, n−1), (m+1, n+1), (m+1, n), and (m+1, n−1). Each region of MPE's 830 is designated to perform various types of pixel domain processing ALU 812 (arithmetic and logic unit) functions for the 8×8 block extracted from the old 311 MB.

We have developed a parallel search method for the 8×8 blocks A, B, C, D resided within the source MB 404. Each of them can conduct simultaneous match (compare) operation with all of their nine nearest neighboring blocks. Namely, A block can simultaneously match with block's 1, 3, 5, 13, 15, 17, 25, 27, 29. B block can simultaneously match with blocks 2, 4, 6, 14, 16, 18, 26, 28, 30. C block can simultaneously match with blocks 8, 10, 12, 20, 22, 24, 32, 34, 36. and D block can simultaneously match with blocks 7, 9, 11, 19, 21, 23, 31, 33, 35.

The outputs of the nine matching operations are first locally stored at the corresponding A, B, C, D regional PPA 824 arrays. They are then shifted out and summed at the output accumulator 858 and adder 856 circuits. The results are then compared using the comparator circuit 860 to get the best match. The physical distance between the new MB (m, n) 404, which result the best match, and the old reference MB (m*, n*) is (m—m*, n—n*). (m—m*, n—n*) will be applied as the MV 402 (motion vector for the old luminance MB.)

Regional PPA array 824 is designed to be reconfigurable. The PPA is designed based upon nine banks of processor element array (PEA) 815. Each PEA 815 consists of sixty four (8×8) processor elements (PE) 866. The nine banks of PEA's 815 are interconnected through shift registers (SR) 878 and switches 880. In a three dimension implementation, a vertically cascaded (connected) processor array 884, crossbar switch array 886, and SR's (shift register) array 888 can be implemented. Additional layers, such as storage array can be added to provide additional functions. This becomes extremely powerful when multi-layer packaging technologies become available for the chip level modules and integrated circuits.

A one dimensional PPA 824 can also be designed using nine banks of PEA's 815, each equipped with peripheral switches 880, and shift registers (SR's) 878. The switches (data selectors) 880 can be reconfigured to guide direction about the data flow, where the shift registers 878 can transfer data from any PEA 815 or input to any other PEA 815 or output. Both switches 880 and SR's 878 are byte wide to facilitate parallel data flow. The PEA's 815 are designed based upon a 8×8 array of simple PE's 866 (processor elements).

The PEA's 815 are designed based upon the concept of cellular automata. Namely, the interconnection among the PE's 866 can be reconfigured to meet with the different application needs. The PE's 866 are also designed so that they can be programed to execute simple instruction sets. Each PE consists of a simple ALU 812 which can execute simple instruction such as add, subtract, load, store, compare, et.al. the instruction should be no more than 16 which contains 4 bits of operand and 4 bits of destination address. The input section of the PE 866 contains four 8 bit registers, a four-to-one 8 bit data selector (MUX) 870, and the output section contains a 8 bit ALU output register, a one to four 8 bit DEMUX 872 and four 8 bit output registers 869. The instructions for the PE's can be downloadable 348, 815, namely different program instruction can be loaded based on the specific application needs.

It is worthy mentioning that it is particularly suitable to use the FPGA (field programmable gate array) devices or FPLD (field programmable logic devices) in the design\ of a PEA 815. The FPLD contained complex macrocells with reconfigurable inputs and outputs are extremely useful for PE 866 designs. The FGA, on the other hand, allow run time reconfigurability, make it extremely to reconfigure the interconnection patterns. Particularly, the Xilinx FGA provide run time reconfigurability makes our design to reconfigure on the fly so PEA 815 becomes multi purpose programmable array device

SYSTEM DESIGN ARCHITECTURE

As shown in FIG. 8, we illustrate our invention 112 consists of the following major system components. They are Network Communication Processor (NCP) 302, Transmission processor (XP) 304, Pixel Processor (PP) 306, Motion Processor 307 (MP), Transform Processor (TP) 308, Display Processor (DP) 310, Capture Processor (CP) 316, Frame Memory (FM) 312 and Host Processor (HP) 314. These system components can be implemented either using custom integrated circuit 318 devices, programmable integrated circuit device, microprocessor, micro-controller, digital signal processor, or software. Depend upon the specific performance requirement, the appropriate implementation method may be applied.

These system components can be interconnected through the system (host) bus (SBus) 330 and a high speed video bus (VBus) 332. The SBus 330 (System Bus) allows the HP (Host Processor) 314 to control, access, and communicate with the system components such as NCP 302 (Network Communication Processor), XP 304 (Transmission Processor), PP 306 (Pixel Processor), and FM 312 (Frame Memory). The VBus 332 (Video Bus) interconnect the FM (Frame Memory) 312 with system components such as CP 316 (Capture Processor), DP 310 (Display Processor), TP 308 (Transform Processor), PP 306 (Pixel Processor), and MP 307 (Motion Processor) to perform high speed video signal processing functions. Both SBus 330 and VBus 332 are word wide, bidirectional, parallel bus. When situations requires, additional bus can be added to enhance information transfer within the system components.

Because of the real time performance requirement for high speed video frame processing (30 frames per second 200 for CIF 149, 7.5 frames per second 198 for QCIF 151), and real time frame/packet transmission for the communication network. Two system pipelines are implemented. The first system pipeline is the video pipeline consist of direct interconnection in between the CP 316, PP 306, MP 307, TP 308, and DP 310 blocks. The second system pipeline is the communication pipeline consists of direct interconnection in between the NCP 302, XP 304, and PP 306. In order to facilitate pipeline operations, pipeline registers 344 and/or First-In-First-Out (FIFO) 344 memory devices must be inserted when necessary.

The FM 312 (Frame Memory) is implemented either in Static Random Access Memory (SRAM) 348 or Video Random Access Memory (VRAM) 350. The SRAM's 348 are easier to implement with better performance and higher price. The VRAM's 350 are less expensive, slower memory devices which require VRAM controller 352 function to frequent update and refresh the RAM memory array. Besides the conventional parallel RAM access port 609, VRAM also provide a second serial access port 611 for convenient access of the RAM array 358. Since many of the video coding algorithms employes frequent use of the interframe coding 660 to reduce bandwidth. Namely, only the frame difference signal 362 will be transmitted. Therefore, twin memory sections are required to store both the new frame 309 and old frame 311, and to facilitate frame differencing operations 362. We specifically designate the PP 306 (Pixel Processor) as the bus master for the VBus 332. Consequently, we suggest to have VRAM controller 352 function built into the PP 306 core. This allow PP 306 the ability to control Vbus 332, and to access VRAM pixel storage for pixel level operations. PP 306 also equip with the bit level manipulation functions such as Variable Length Coder and Decoder 372 (VLC/D), Zig-Zag to Raster Scan Format Converter 374, and Quantization 378. These are often required by the international video coding algorithms such as JPEG 186, MPEG 188, and H.261 184 standards. Besides, the PP 306 also has special operators for bitmap graphics manipulation.

The CP 316 (Capture Processor) can decode various types of analog video input formats such as NTSC 382, PAL 384, SCAM 386, or SVHS 388 and convert them into CCIR601 390 YUV 392 4:2::2 format. The CCIR601 390 format can further perform 2:1 linear interpolation 398 of the U, V color difference signal 393 and convert to the standard CIF 149 YUV 392 4:1:1 format. Typically, the TV 104 broadcast system transmit analog video signal in NTSC 382 format in the U.S., and as PAL 384 format in Europe. Many VCR's 100 now may provide SVHS 388 input. The video camera 383 can provide NTSC 382 input as well. Therefore, CP 316 provides a convenient interface between our invention and traditional video inputs such as TV 104, VCR 100, and video camera 383.

The CIF 149 YUV 392 signals will first transfer out of the CP 316 block, and store into the FM 312 (Frame Memory). The Y (luminance) 391 signal will be loaded into the MP 307 (Motion Processor) to perform motion estimation 403. A motion vector (X,Y) 402 will be developed for each MB (macroblock) 404 (2×2 Y's) and store at the associated FM 312 location. The difference 362 between the new 309 and old 311 macroblocks 404 will also be coded in DCT 418 coefficients using TP 308 (Transform Processor). The PP 306 (Pixel Processor) will perform raster-to-zigzag conversion 374 and VLC coding 372 of the DCT 418 coefficients for each macroblock 404 of Y 391, U, and V differences 393. The XP 304 (Transmission Processor) will format the CIF 149 frames into the CCITT H.261 184 format, and attach the appropriate header 596 information., namely a CIF frame 149 will partition into 12 Group of Blocks 410 (GOB's), and each GOB 410 consist of 33 MB 404 (macroblocks), and each MB 404 consist of 4Y, 1U, and 1V block 412 (8×8) of pixels. The NCP 302 (Network Communication Processor) will provide the DCE 132, DTE 130 control interface to the telecommunication network 118. The RF modem 414 can also be provided to interface with the microwave links.

On the receiving side, the serial compressed 511 video bit stream are received from the NCP 302 first. The bit stream will be converted from serial-to-parallel 508, and decode the appropriate header message 596 using XP 304. The information will then be send to the FM 312 through PP 306. PP 306 will then perform VLD 372 (Variable Length Decoder), Zigzag-to-Raster conversion 374, and dequantization 378 The difference YUV 392 macroblock 404 of DCT 418 coefficients will be send to the FM 312 through PP 306. PP 306 will then send YUV 392 macroblocks 404, one at a time, to the TP 308 to perform Inverse DCT operation 420. The YUV 392 difference 362 will then be added to the old signal to conform a new pixel for each macroblock 404, The DP 310 will then perform YUV to RGB 384 conversion, and generate NTSC 382 analog signal from the RGB 389, and generate a 8 bit VGA 153 color image through 24 to 8 color mapping 422. The DP 310 will provide a convenient interface to various display 105 such as television 104, PC 106 VGA monitor 153, or interface to the RF modem 414 externally.

For ease of interface. Our HP 314 also provide a high speed Small Computer System Interface (SCSI) 424 with the external host such as a PC or workstation 106. The advantage of SCSI 424 interface is that it provides system independent interface between the external host 106 and our invention. Since only simple control massages 426 are required to pass between the two hosts. Modification to various operation system formats such as DOS, UNIX, or MAC can easily be accomplished. The high speed SCSI 424 interface also allow the transmission of video sequence 511 between the two hosts which are often found necessary.

The Remote Control Coder 110 serves as convenient programming tool to send control messages 426 to the HP 314 through manual selection and screen programming 162. The HP 314 can either use software or a dedicated 8 bit micro-controller to decode these control messages 426.

In the case of high speed digital network communication, i.e., T1 544 speed or higher, the communication pipeline is employed to facilitate real time frame formatting 444, protocol controlling 446, transmission, and decoding. The HP 314 is the bus master for the SBus 330. Consequently, HP 314 will be able to access to the FM 312 and/or system memory 313, and monitor progress through window operation 434. The window operation 434 essentially allow portion of the system memory 313 to be memory-mapped 435 to the FM 312 so that system memory 313 can use as a window to view FM 312 status and operations in real time.

END-TO-END COMMUNICATION FRONT END PROCESSOR

Figure 27A:
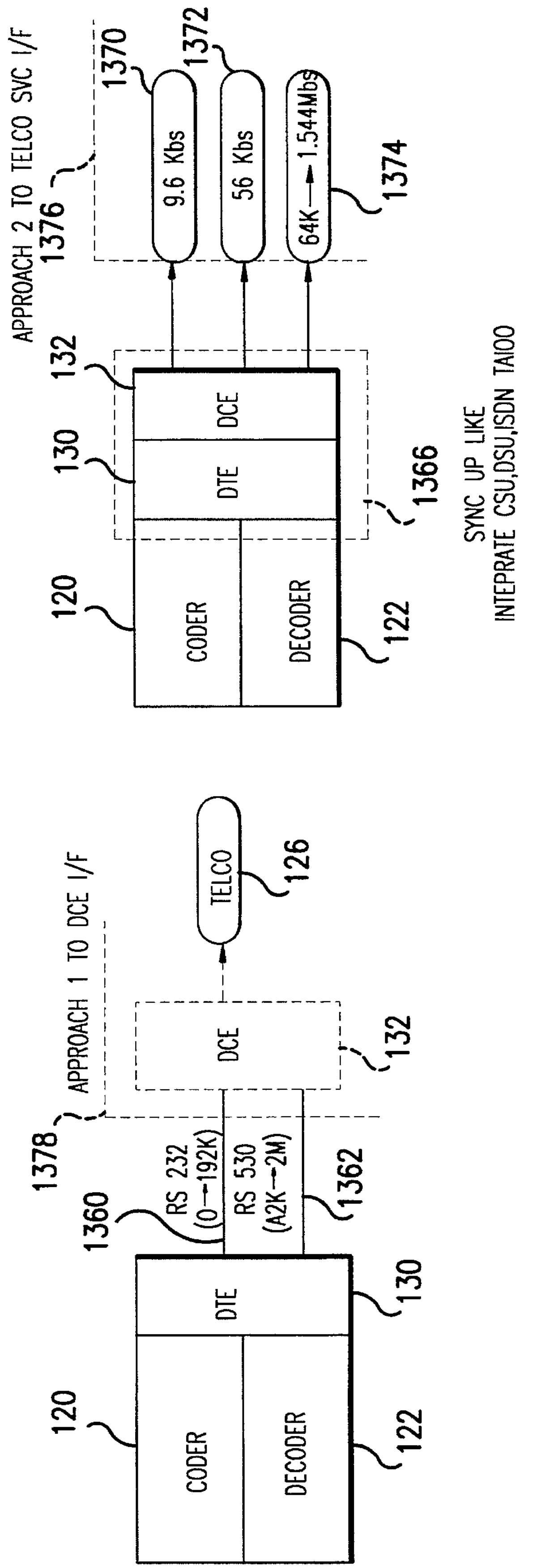
FIG. 27 illustrates the practical design of an end-to-end communication front end processor, which can transceive information employing either analog or digital networking techniques. Bandwidth control techniques to interface and adjust with a variety of networks such as 9.6 Kbs, 16 Kbs, 19.2 Kbs, 56 Kbs, 64 Kbs, 128 Kbs, 384 Kbs, and 1.544 Kbs are also demonstrated.
Figure 27B:
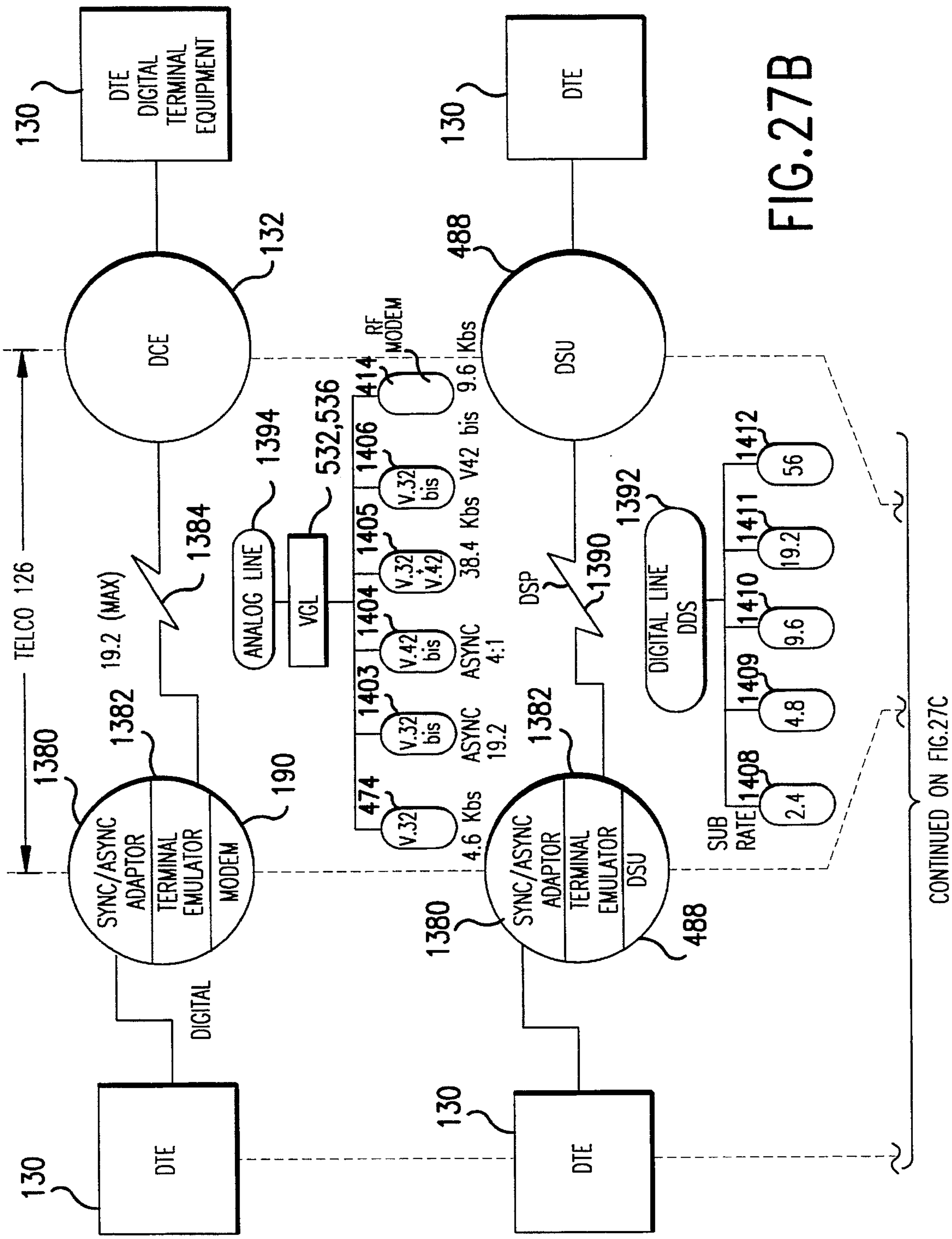
Figure 27C:
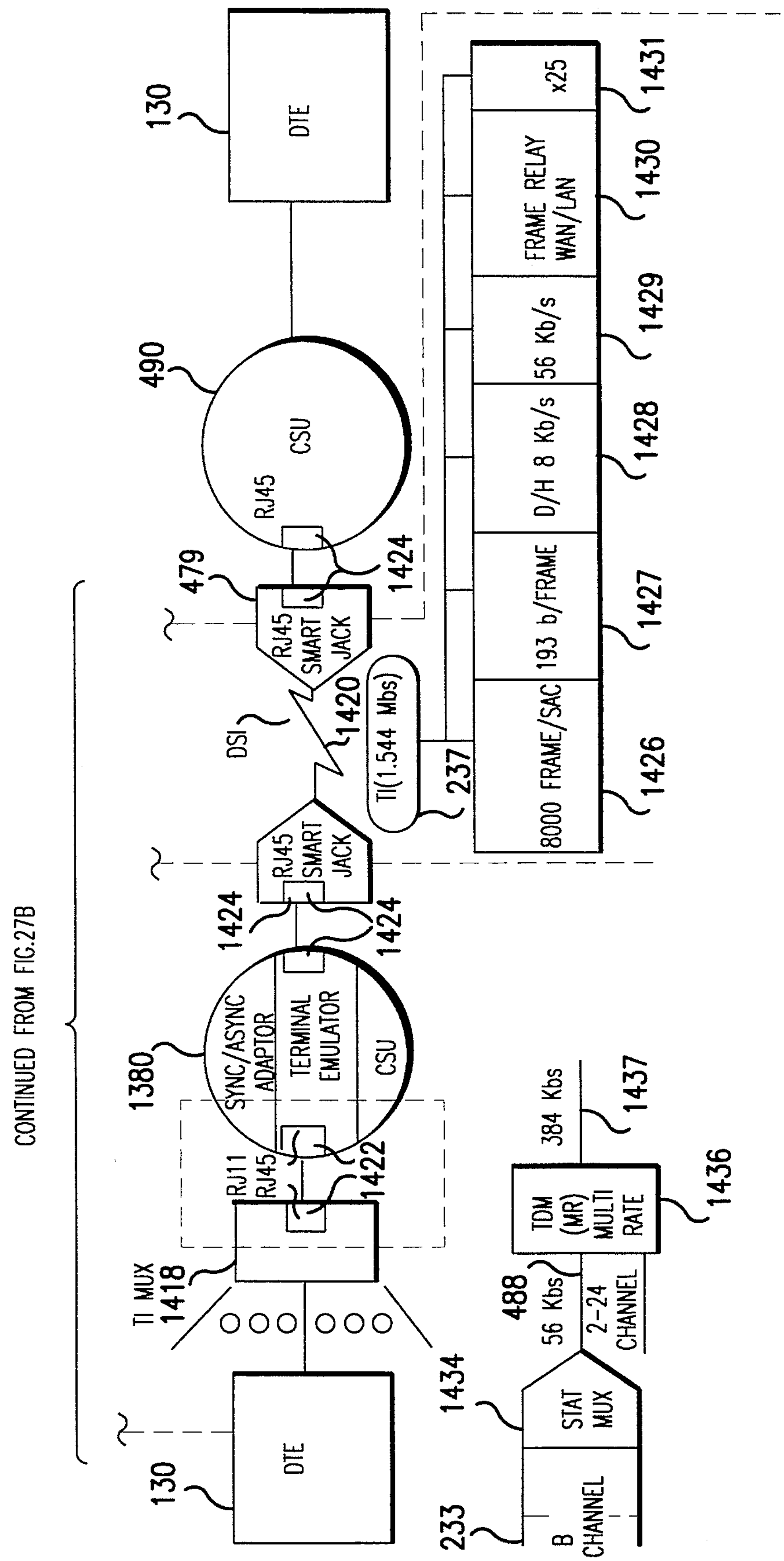

As shown in FIG. 27, we illustrate the practical design of an end-to-end communication front end processor 436 which allow for transceiving information employing either analog or digital networking techniques. Bandwidth control 144 techniques to interface and adjust with a variety of networks such as 9.6 Kbs, 16 Kbs, 19.2 Kbs, 56 Kbs, 64 Kbs, 128 Kbs, 384 Kbs, and 1.544 Kbs are also demonstrated.

At the customer premise 134, 137, Digital Terminal Equipment (DTE's) 130 and Digital Circuit Equipment (DCE's) 132 can either be integrated together, or set apart and connect via RS-232 1360 or RS-530 1362 digital links. A RS-232 digital link 1360 can support transmission bit rate up to 19.2 Kilo bits per second (Kbs), and a RS-530 link 1362 can support bit rate range from 19.2 Kbs up to 2 Mega bits per second (Mbs). DTE's 130 provides the interface to the host 120, 122, and DCE's 132 provides the interface to the Telephone companies (TELCO's) 126.

The DCE's 132 comprise a synchronous/asychronous mode adaptor 1380, a terminal emulator 1382, and a network transceiver 190. Since DCE's can be interconnected by a wide range of analog or digital transmission technologies supported by TELCO's 126. The design of network transceiver 190 can be varied.

In the case of a analog voice grade line (VGL) 532, 536, the synchronous and asynchronous transmission bit rate may vary dependent upon the modem types being selected. Both V.32 modem and a RF modem 414 can directly support 9.6 Kbs synchronous transmission. Data compression coding can be augmented to further enhance the asynchronous transmission speed, i.e., a V.32 bis 1403 and V.42 bis 1404 can provide 2:1 and 4:1 data reduction respectively. Consequently, the effective asynchronous transmission rate can go up to 38.4 Kbs for a V.32+V.42 bis modem, and a V.32+V.42 bis modem can perform 19.2 Kbs effective asynchronous transmission.

In the case of a digital private network employing Digital Data Service (DDS) 1392, Digital Service Units (DSU's) 488 can be served as the DCE's 132 transceiver to provide synchronous/asynchronous transmission from 2.4 Kbs up to 56 Kbs. Namely, five modes can be selected such as 2.4 Kbs 1408, 4.8 Kbs 1409, 9.6 Kbs 1410, 19.2 Kbs 1411, and 56 Kbs 1412.

For a high speed digital transmission, T1 network 544 can support 1.544 Mbs synchronous transmission. In a T1 network 544, Frames containing 193 bits length are transmitted at 8,000 frame per second. Circuit Switch Unit (CSU's) 490 are used to provide the necessary DCE 132 transceiving functions. The CSU 490 provides a easy interface to the T1 network 544 through a wall mounted RJ45 smart jack 1424, it also provides a RJ11 481 or RJ45 1424 jack to interface from a T1 multiplexer (T1 MUX) 1418. T1 MUX is a time division multiplexer (TDM), i.e., the input of a T1 MUX 1418 comprises multiple (2 to 24) subrate channels, while each subrate channel provides 56 Kbs circuit transmission. Statistical Multiplexer (STAT MUX) 1434 can further be provided to optimize input channels for the T1 MUX. The inputs to a STAT MUX 1434 are in packet forms, and the output are converted into the circuit (TDM) form 1436.

SIMPLIFIED VIDEO ENCODER FUNCTIONAL MODEL

Figure 28:
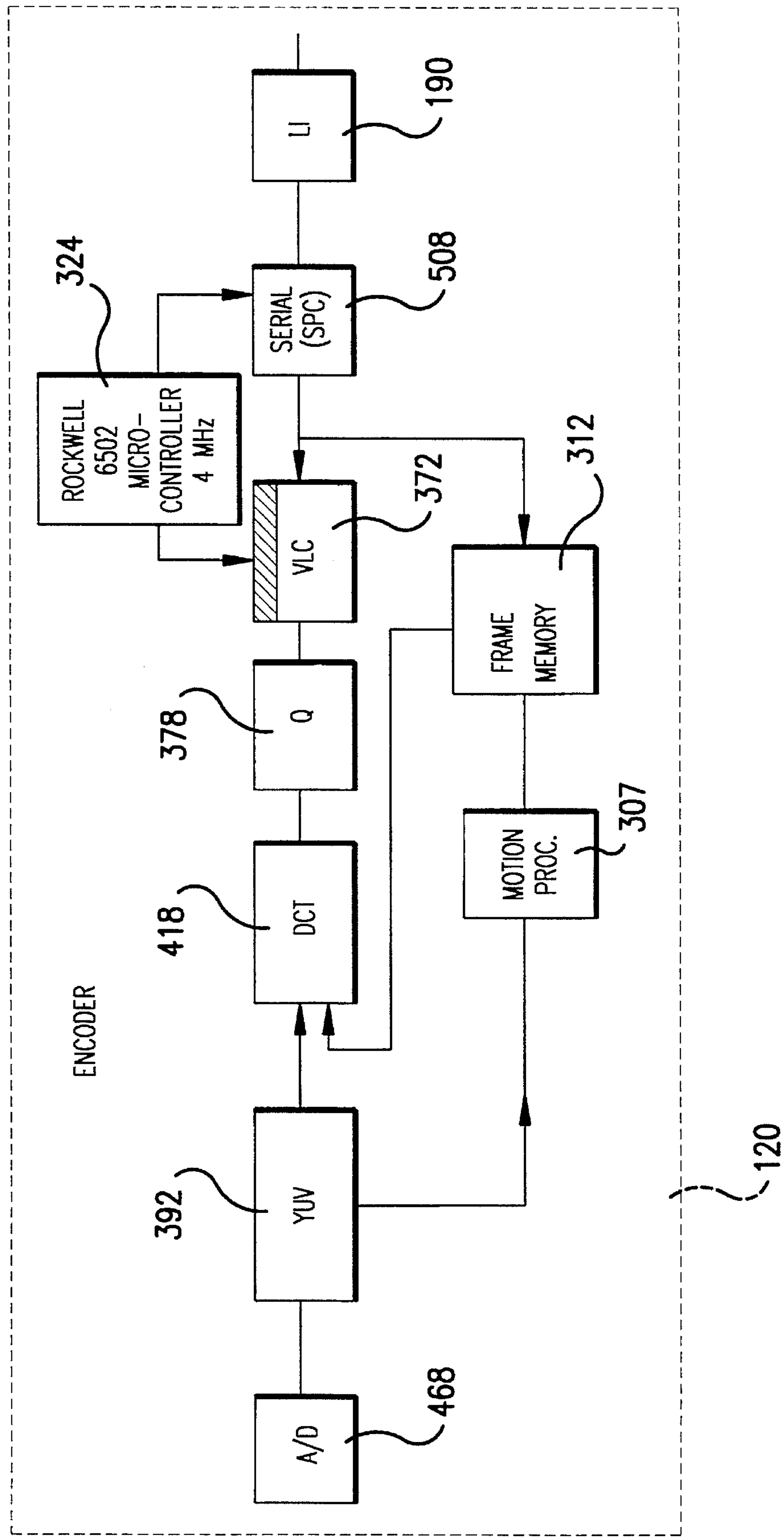
FIG. 28 illustrates a simplified block diagram for a general purpose video encoder subsystem.

As shown in FIG. 28, we illustrate a simplified block diagram for a general purpose video encoder 120 subsystem.

The analog video input is first received and converted to a digital RGB format using a video ADC 468 (Analog to Digital Converter). The digital RGB 389 signals can be further converted into a digital YUV 392 format employing a color space converter device. Forward DCT operation 418 can then be performed to translate pixel data into the frequency domain coefficients. Since the coefficient at variable frequency range retain different level of significance. Typically, the low frequency components retain significant edge and structure information. Therefore a programmable quantizer (Q) 378 can be performed for different frequency components. For the ease of dividing a 8×8 block of DCT coefficient into different frequency range, a raster to zigzag conversion 374 is taken place prior to quantization 378. Once the coefficients are quantized at different resolution, the final bit stream can further be compacted using variable length coding (VLC) 372. VLC 372 is commonly applied to apply shorter length code for more frequent occurred bit streams. The final compacted bit stream is first converted from bit parallel into bit serial form using a parallel-to-serial converter 508. A line interface 190 can further convert the video form digital into a analog TTL signal compatible for telephone line 103 interface. A 8 or 16 bit micro controller 324 can be used to provide the needed control functions 426, and frame buffer memory 312 is used to store both the present 309 and previous 311 frame of DCT 418 coefficients. The pixel domain YUV 392 information can also be used to perform motion compensation 403.

SIMPLIFIED VIDEO DECODER FUNCTIONAL MODEL

Figure 29:
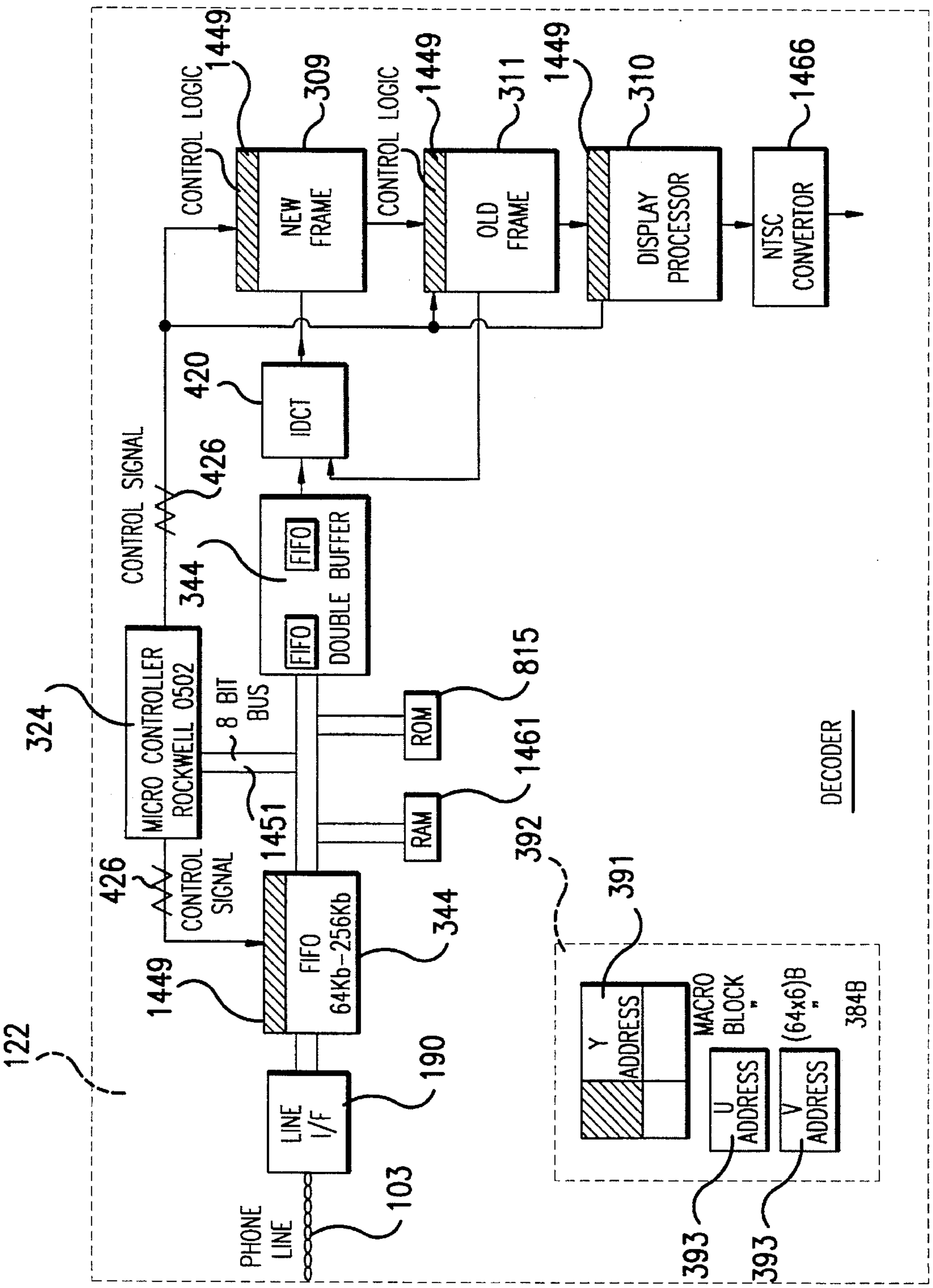
FIG. 29 illustrates a simplified block diagram to illustrate how to receive a video frame, perform the appropriate decoding operation, and store at the frame memory.
Figure 30:
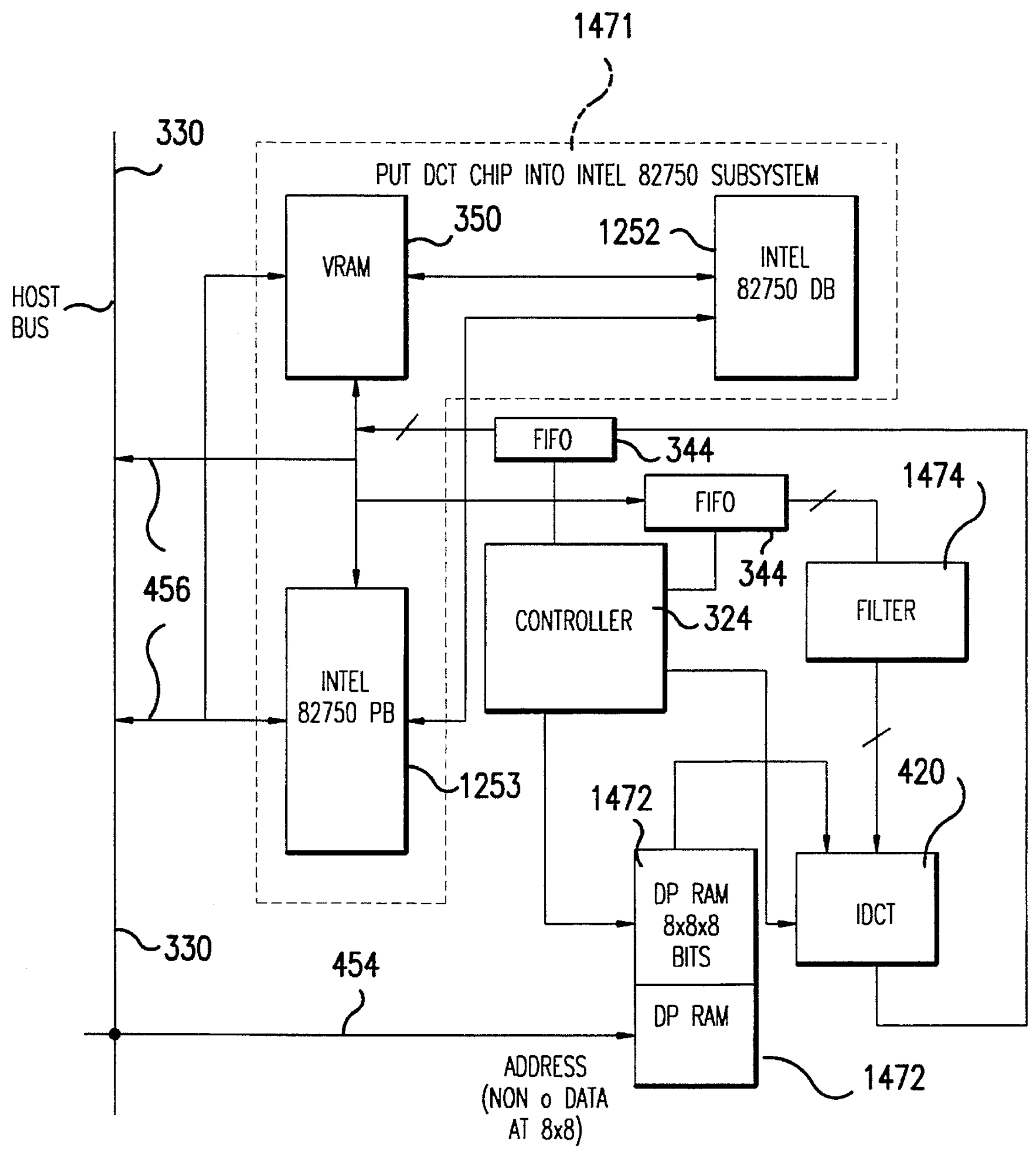
FIG. 30 illustrates how to design a DCT transform processing subsystem, which can properly interface with the INTEL DVI 82750 subsystem, in order to perform video decoding functions.
Figure 31:
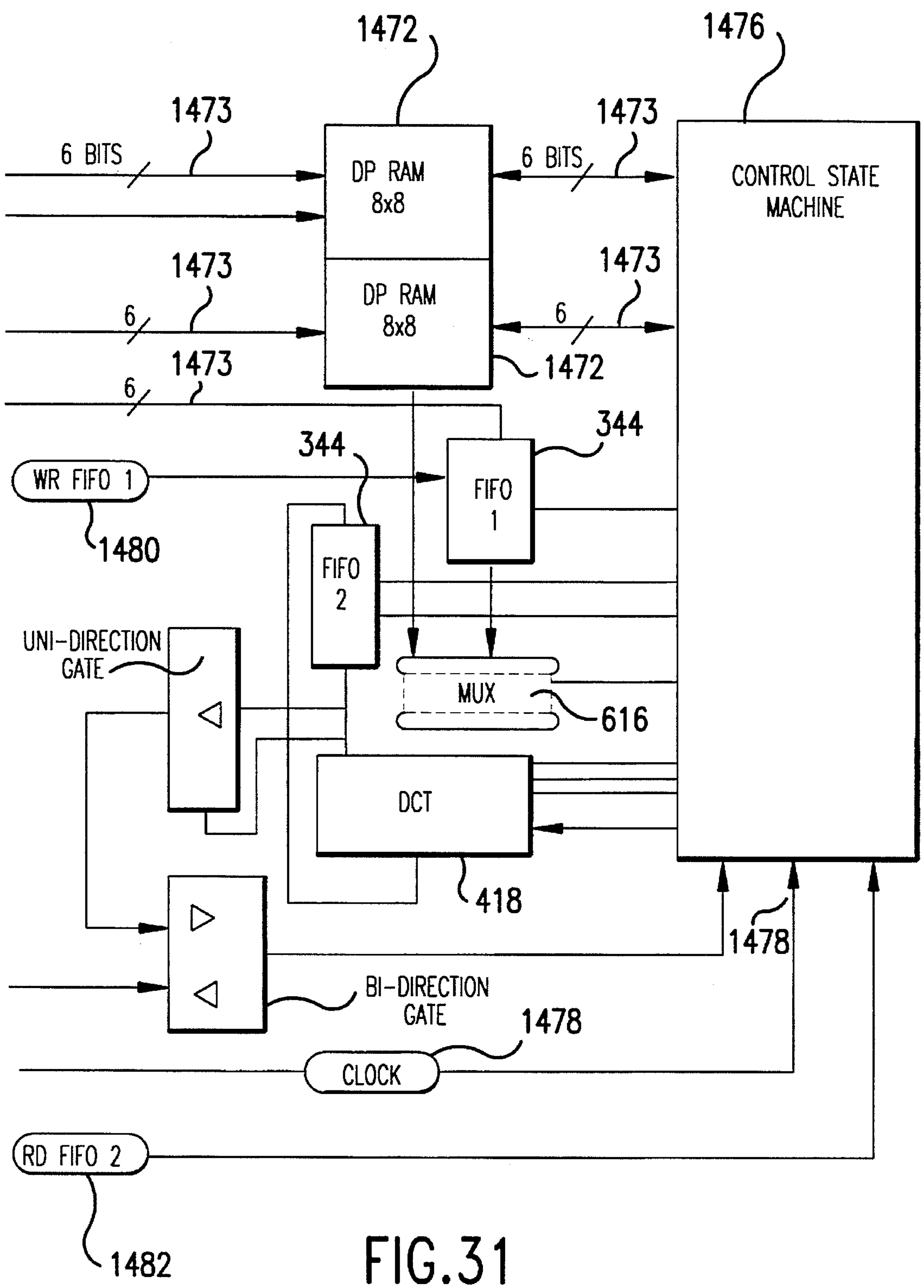
FIG. 31 illustrates our initial system pipeline design of a DCT processor, its control state machine, and the associated register and memory devices.
Figure 32:
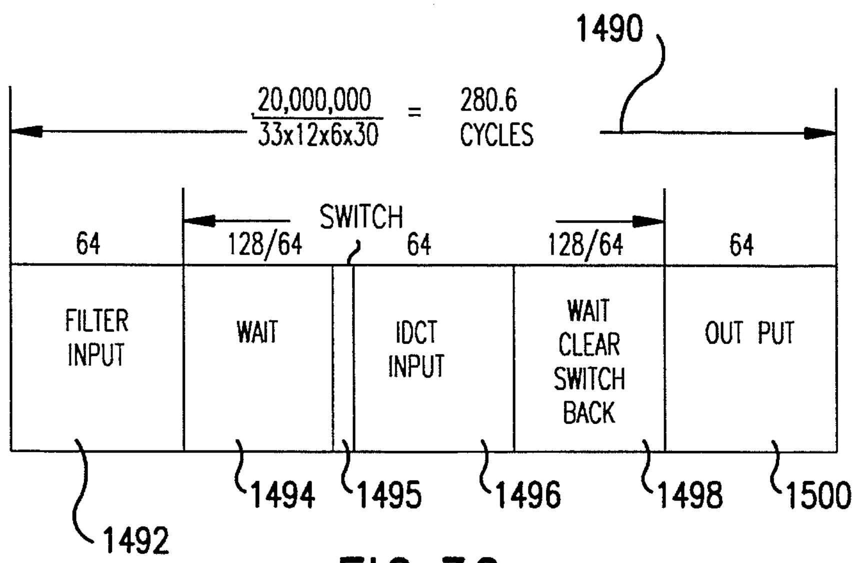
FIG. 32 illustrates the initial analysis for the pipeline stages in the design of a DCT based system.
Figure 33:
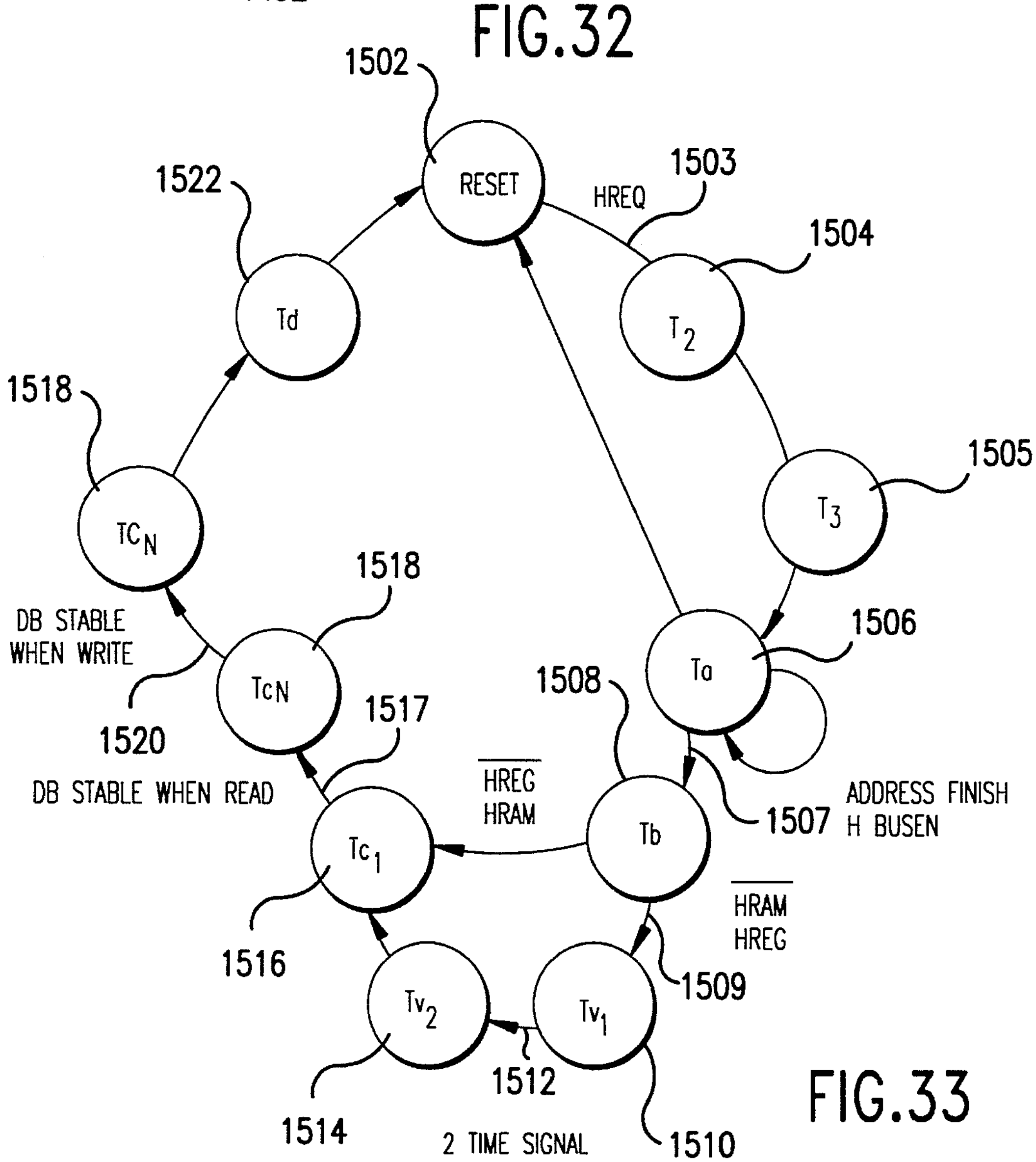
FIG. 33 illustrates the initial design of a state diagram for a DCT based pipeline subsystem.
Figure 34:
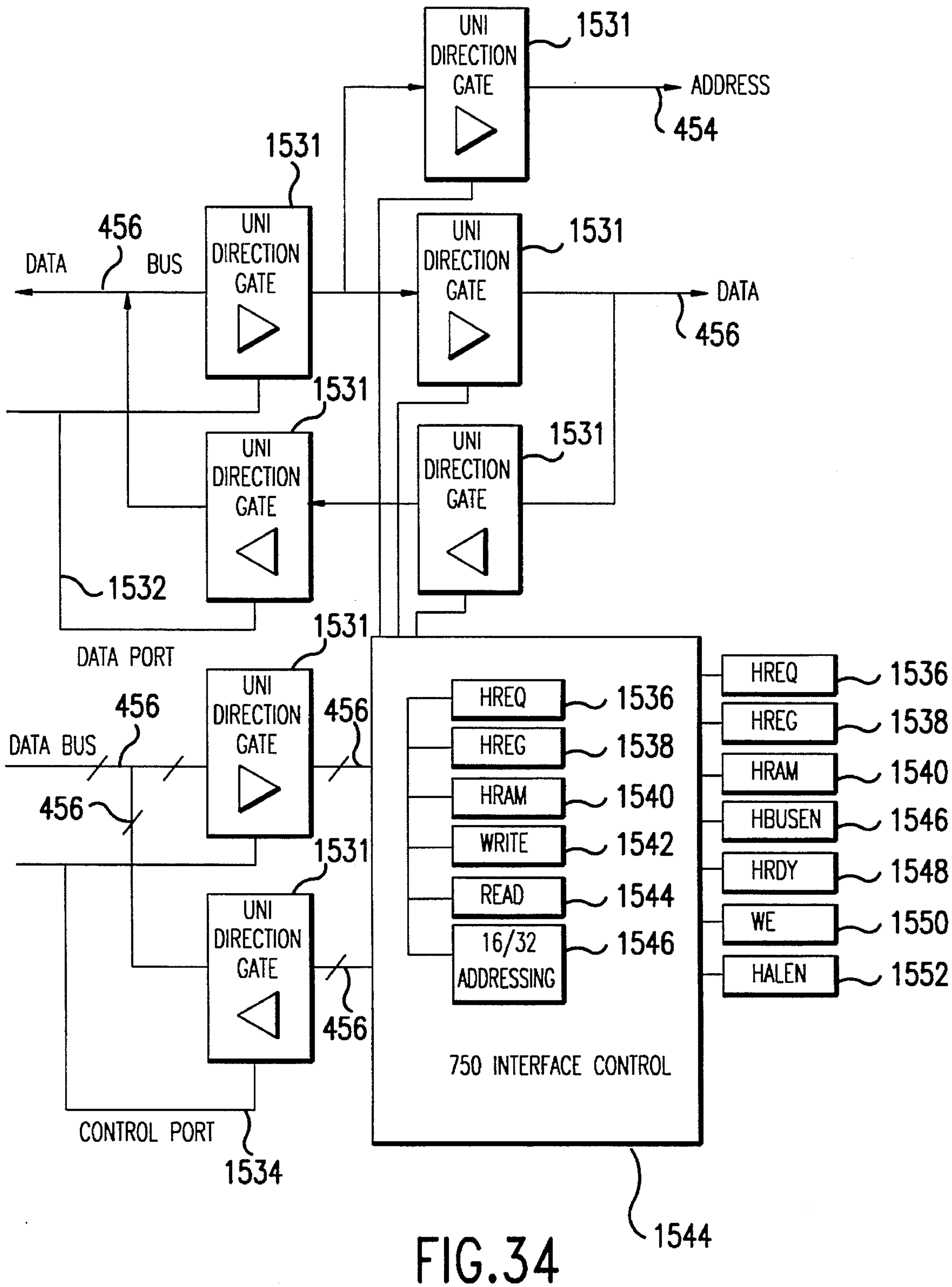
FIG. 34 illustrates how to design the control and interface circuit between the INTEL 82750 decoder system and the aforementioned DCT pipeline subsystem.
Figure 35:
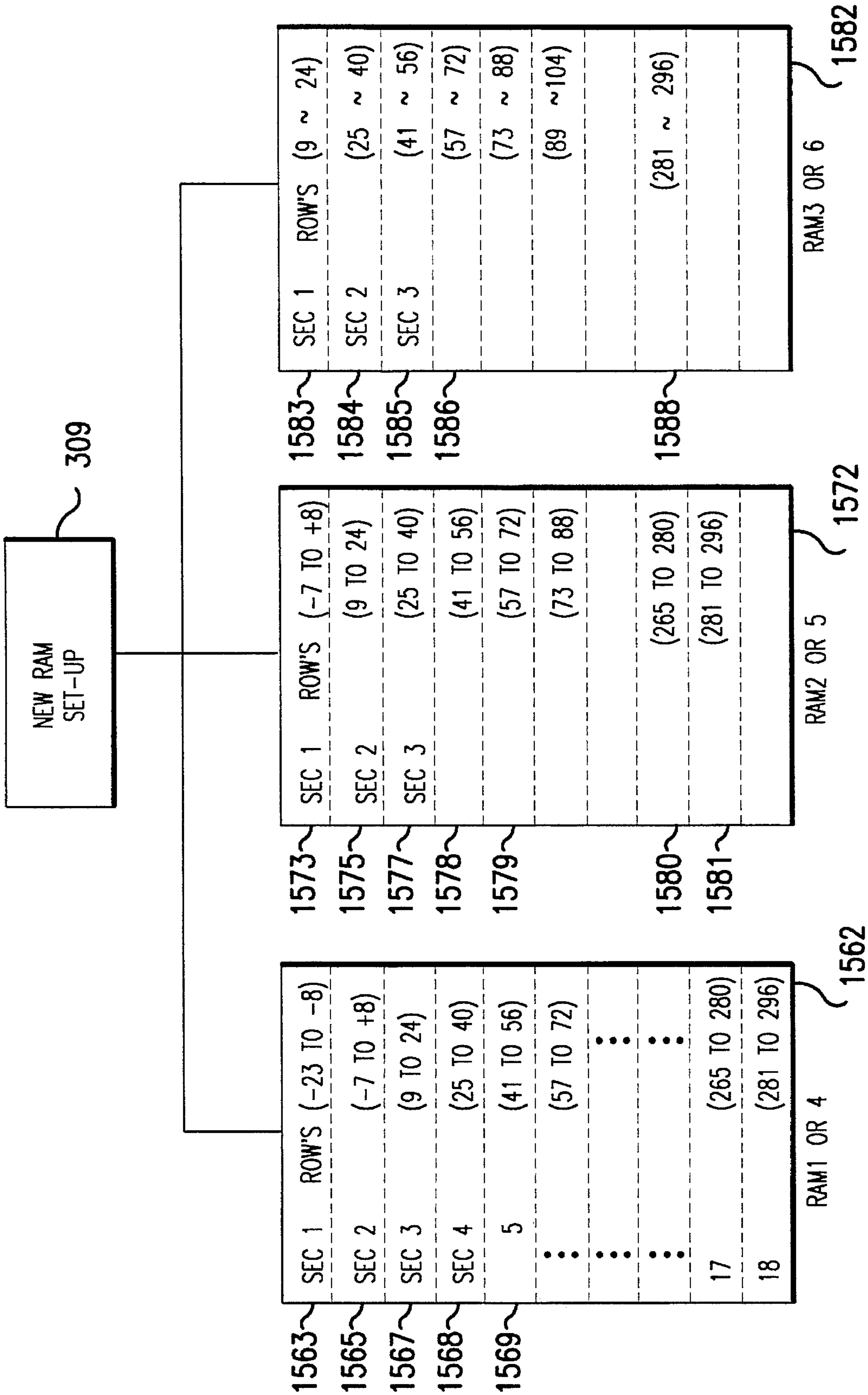
FIG. 35 illustrates how to design a frame memory map for the updated new image frame.
Figure 36:
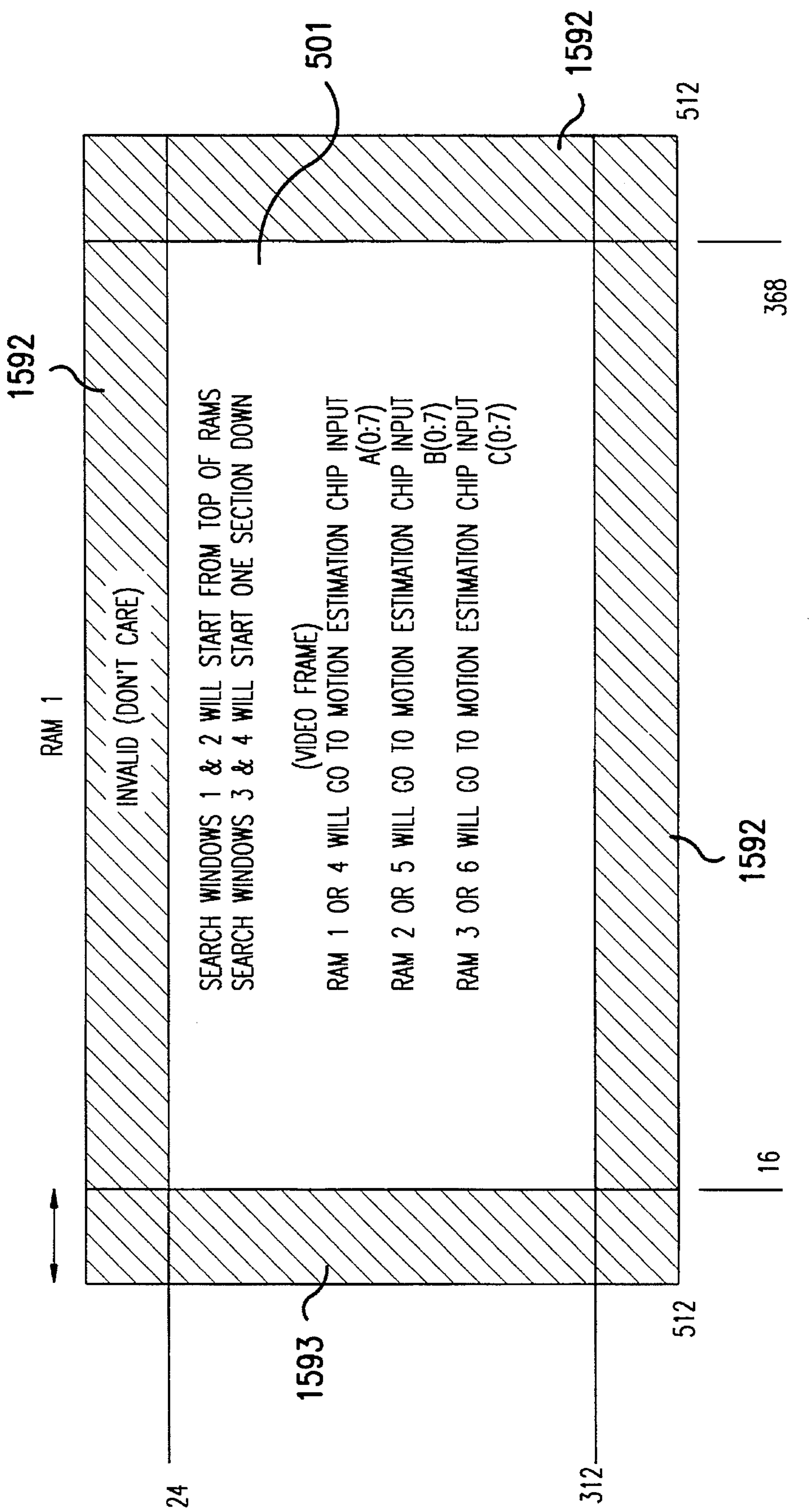
FIG. 36 illustrates how to partition the video display to create an appropriate video frame window. The associated search operation and the its interface with the frame memory are also demonstrated.
Figure 37:
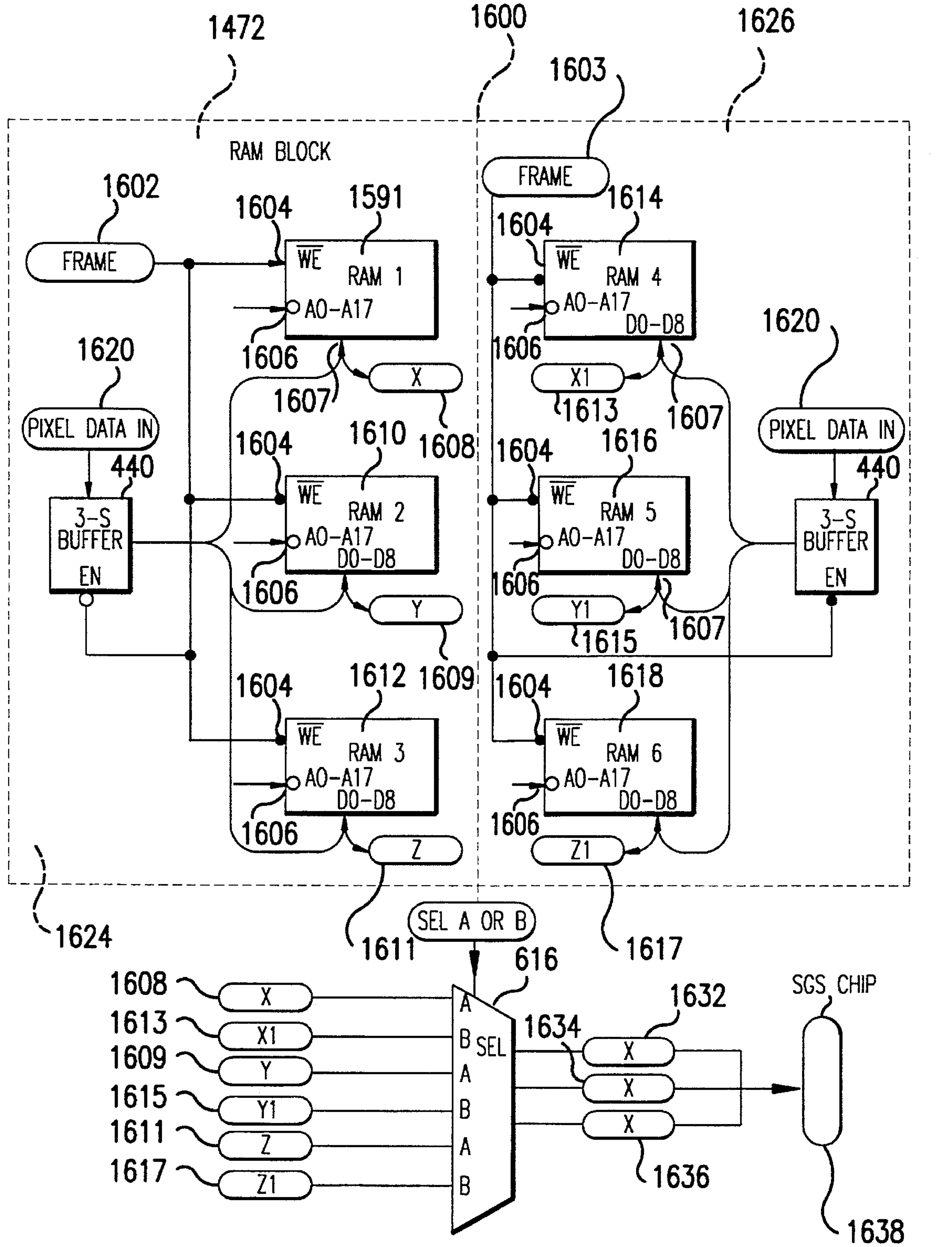
FIG. 37 illustrates the detailed circuit implementation of how to design a frame memory.
Figure 38:
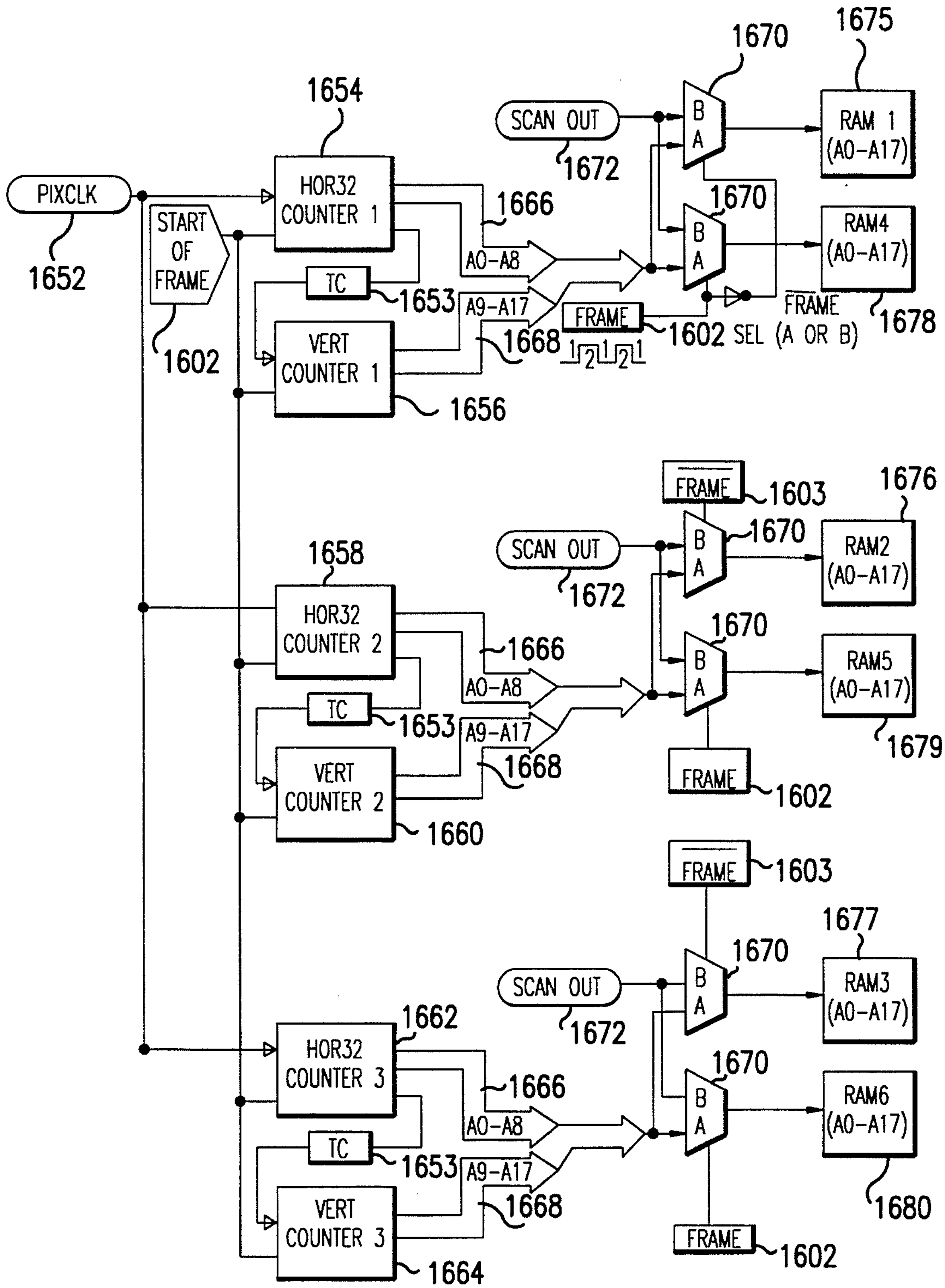
FIG. 38 illustrates how image frame input sequence is properly synchronized, converted, and stored at the frame memory.
Figure 39:
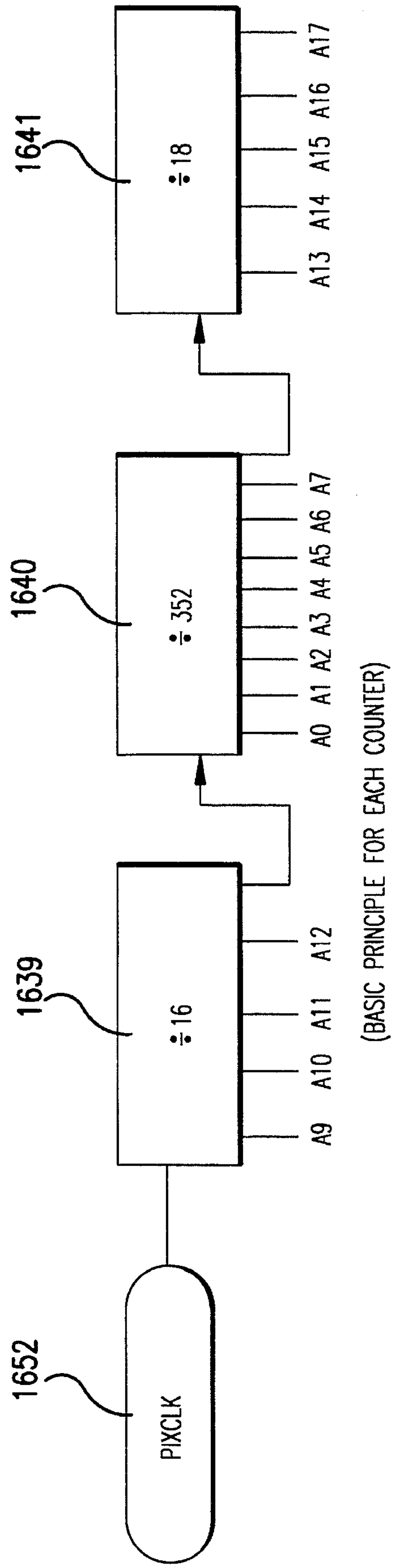
FIG. 39 illustrates how to design a counter logic circuit to monitor the image frame sequence transporting activities.
Figure 40:
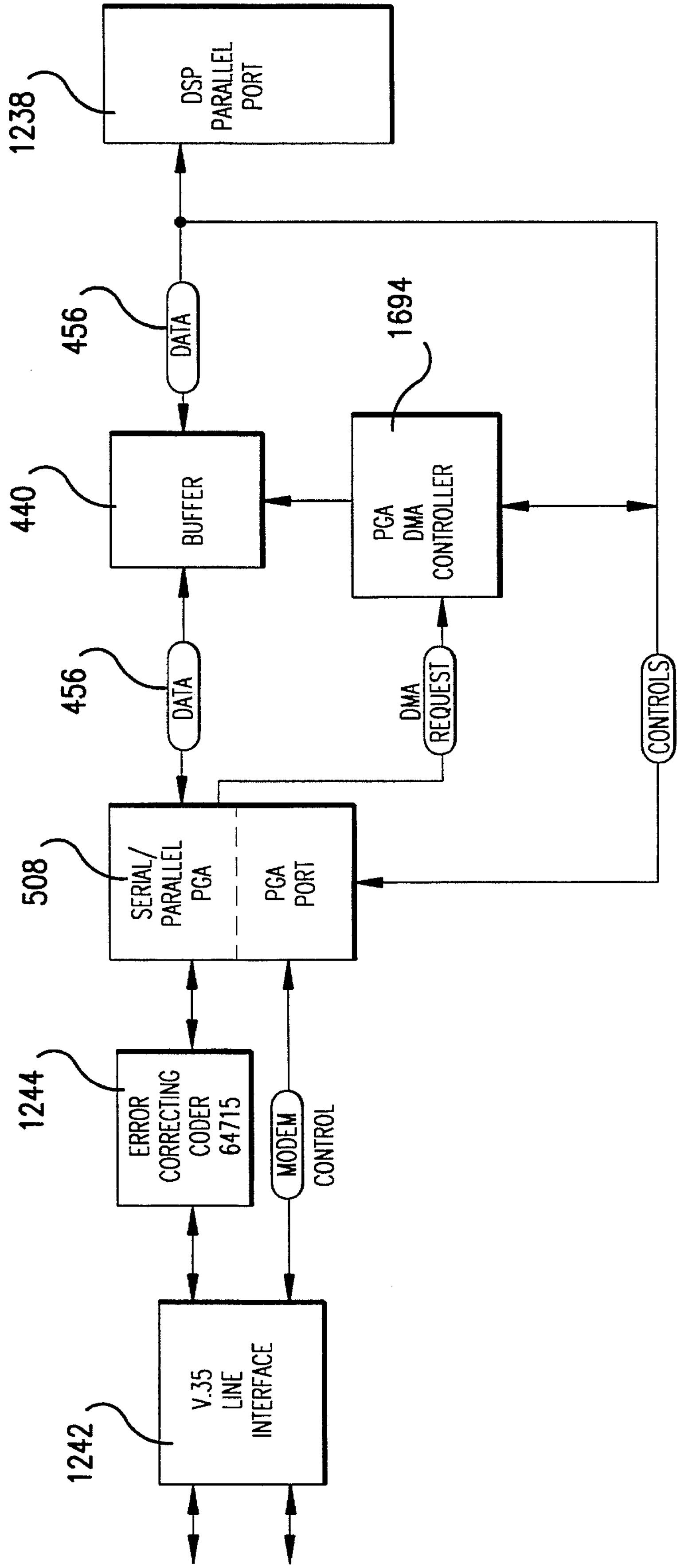
FIG. 40 illustrates how to design a line interface circuit.
Figure 41:
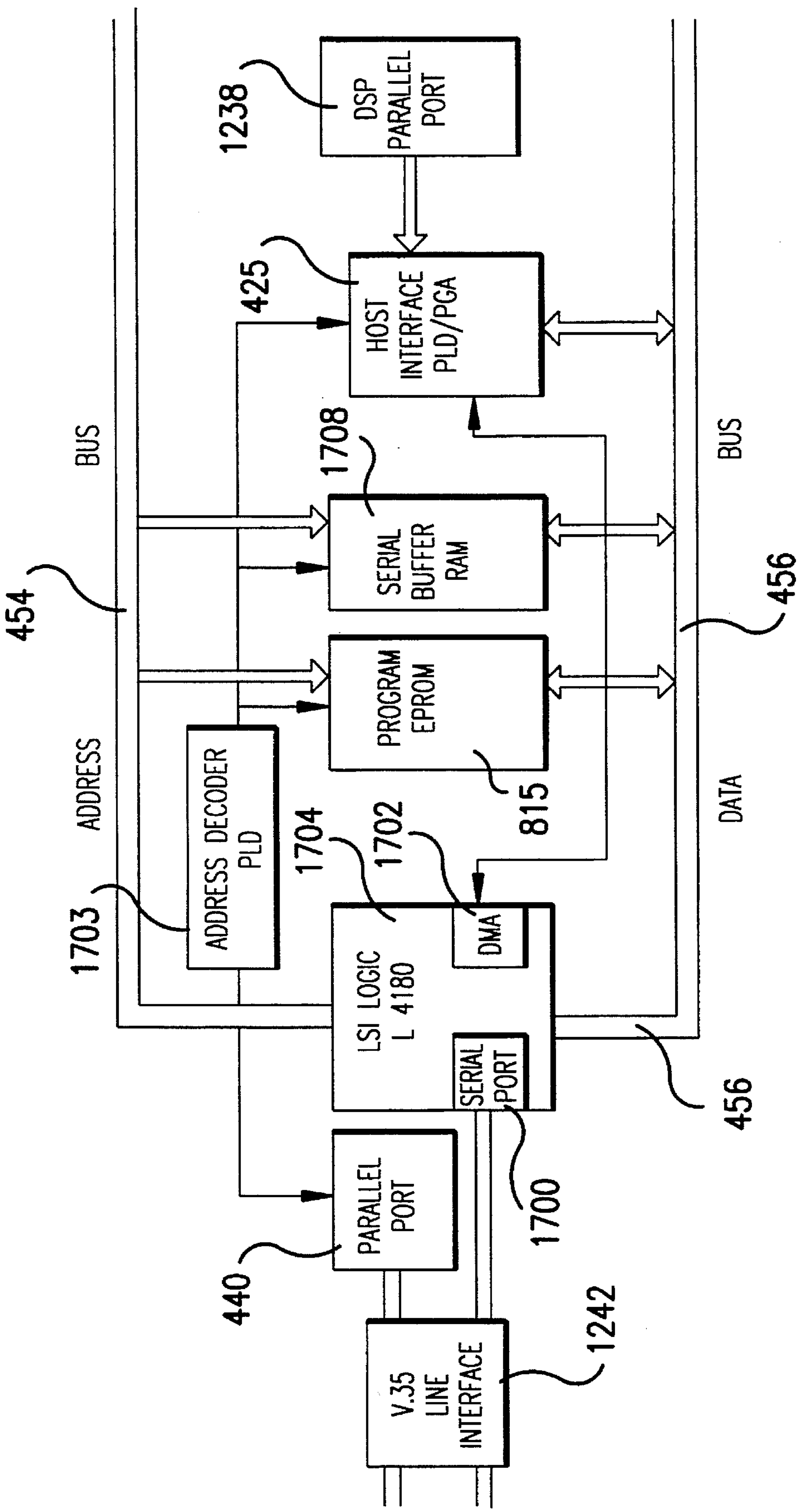
FIG. 41 illustrates how to design a V.35 based serial interface subsystem.
Figure 42A:
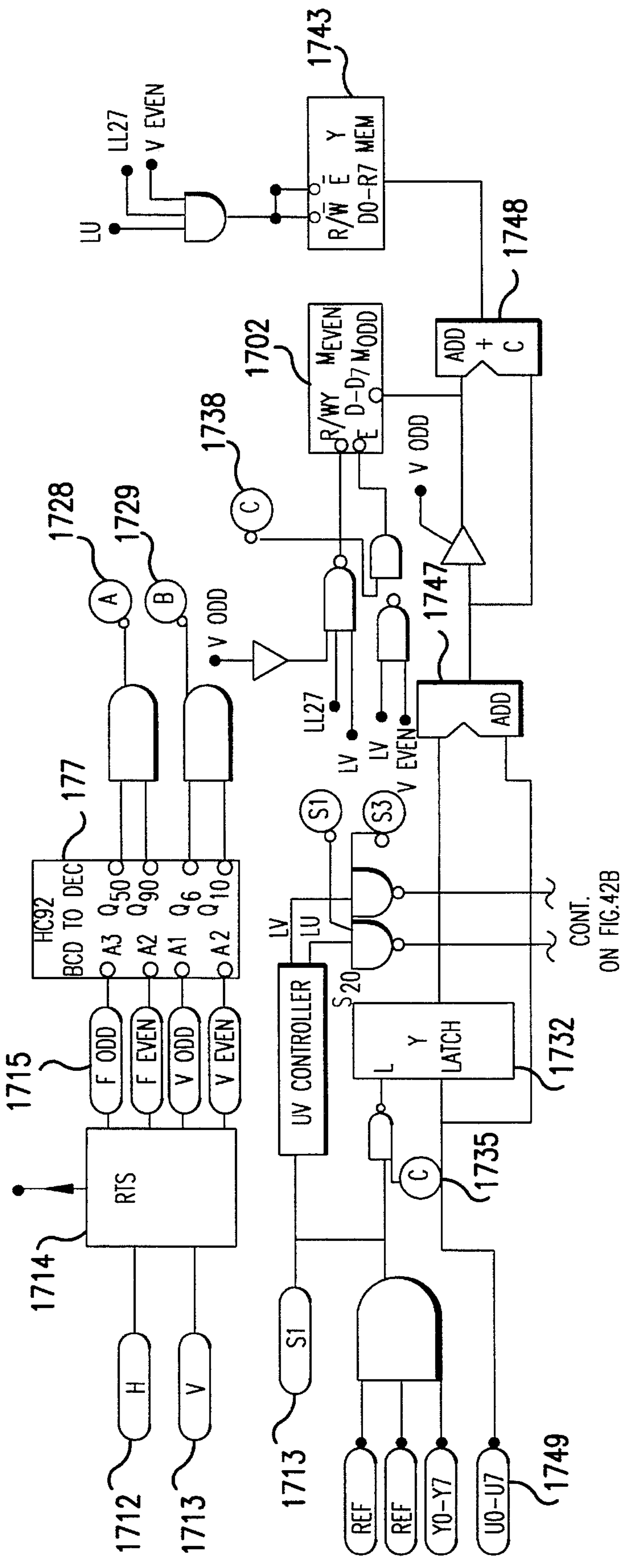
FIG. 42 illustrates detailed circuit design of a decoder line interface.
Figure 42B:
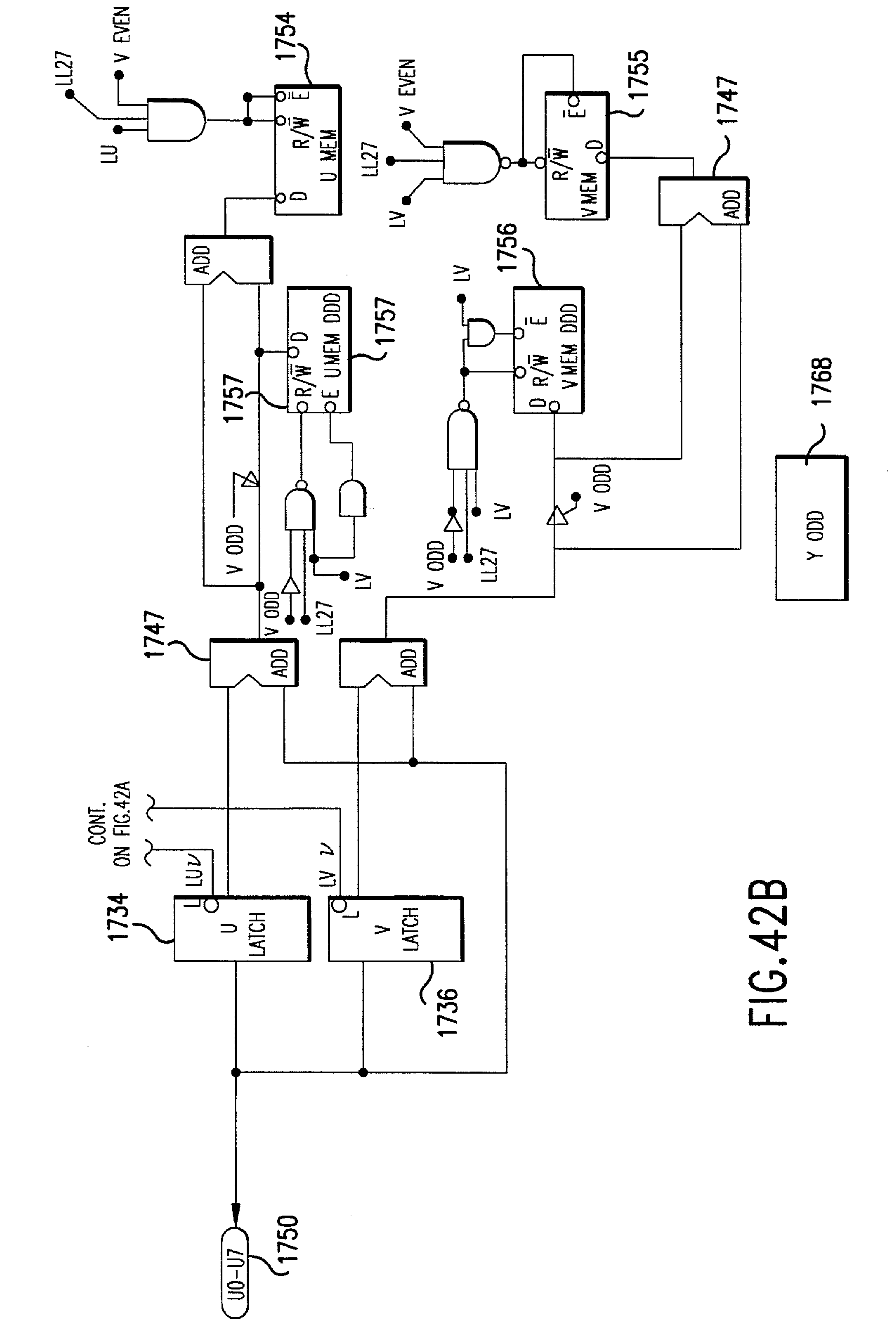
Figure 42C:
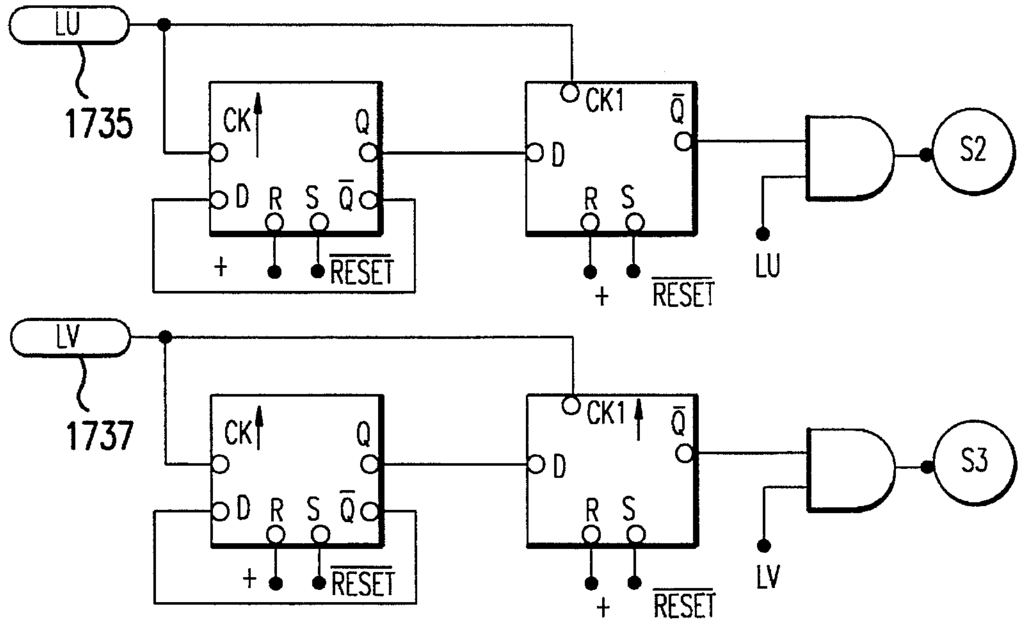
Figure 42D:
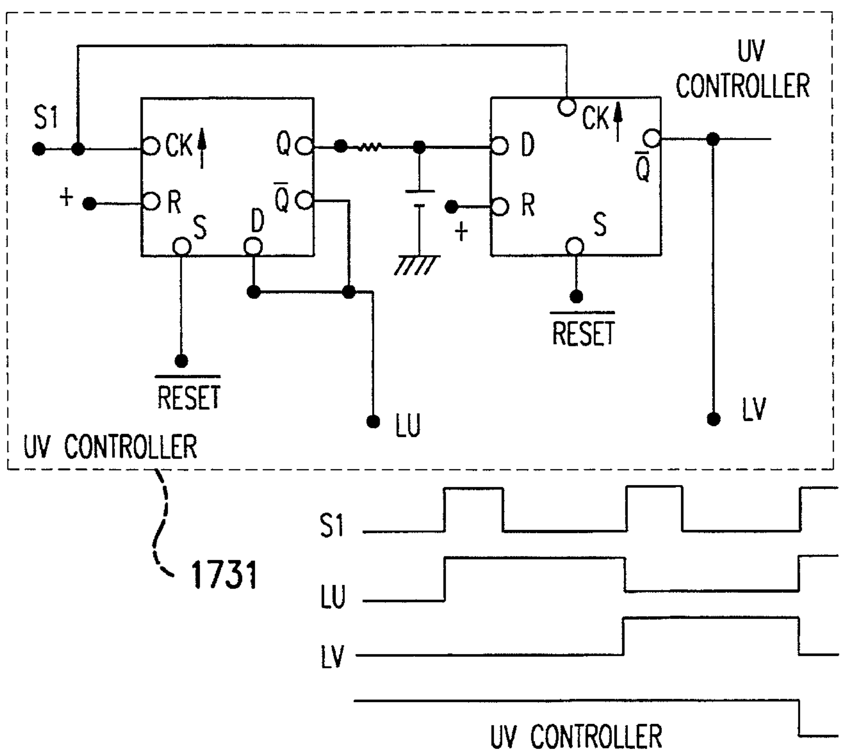
Figure 43:
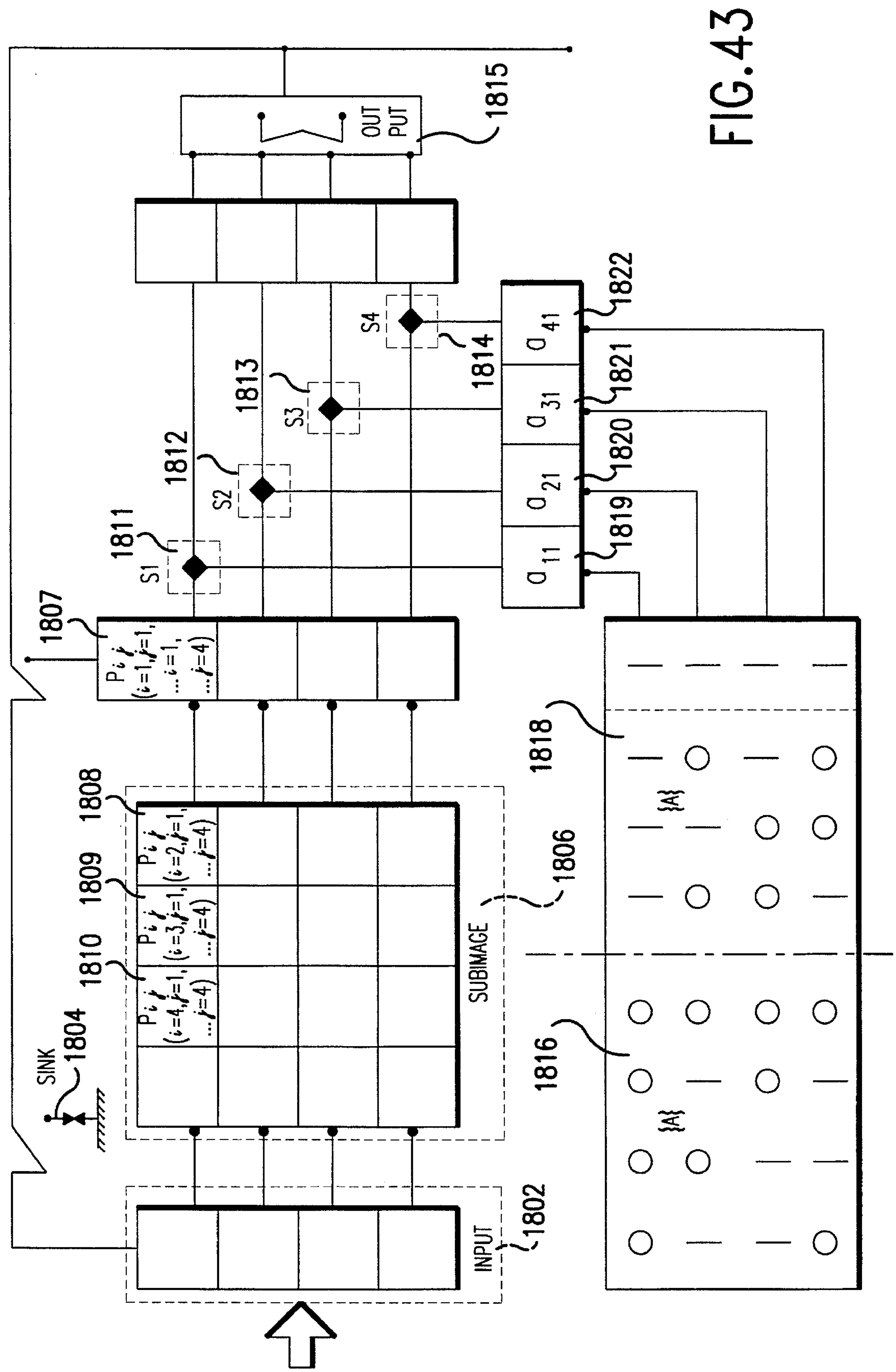
FIG. 43 illustrates a practical implementation of a 4×4 transform based processor subsystem. The partitioning of original raster image into a sequence of 4×4 subimages is also demonstrated.
Figure 44:
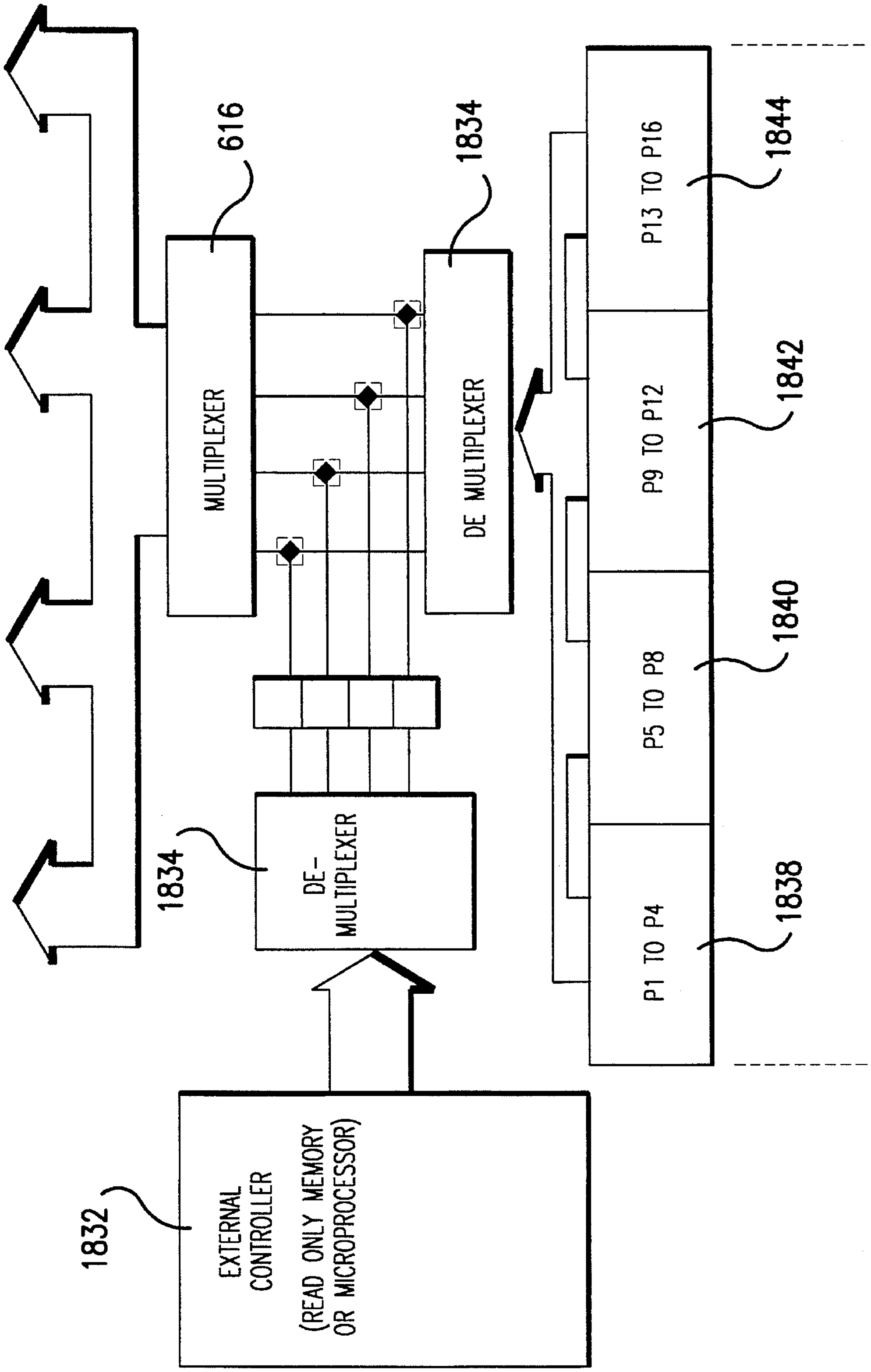
FIG. 44 illustrates a generalized processor structure to execute a plurality of 16×16 transform based operation employing the aforementioned 4×4 processor subsystem.

As shown in FIG. 29, we illustrate a simplified block diagram to demonstrate how to receive a video frame, perform the appropriate decoding operations, and store image at the frame memory. Typically, the processing of a H.261 184 or MPEG 188 based CIF/QCIF 149, 151 format, image frame are required to partition into macroblocks 404 of YUV 392 data. Namely, a Y macroblock 391 will comprise a 16×16 block of byte-wide Y pixel data. Similarly, each of the U macroblock 393 and V macroblock 393 will comprise a 8×8 block of byte-wide U and V pixel data. Coded incoming video bit stream is first received and convert from analog signal into a 8 bit wide digital data using line interface 190 circuit. The incoming digital bit stream is then buffered at a FIFO 344 device. The micro controller 1452 can perform the inverse VLC operation 372 to derive the quantized DCT coefficients, Inverse quantization 378 can be further performed to provide the frequency domain digital image represented as DCT coefficients. The Inverse VLC 372 and Inverse Quantization 378 program codes are stored at the program ROM 1462 (Read Only Memory) 815. The frequency domain data exchange were further facilitated by a local RAM 1461 as a temporary storage, accessible via a private 8 bit bus 1451.

The DCT coefficients are first buffered at the FIFO 344, a Inverse DCT operation 420 can then be performed. The output pixel domain data will then first store at the New Frame section 309 of the frame memory 312. During a interframe coding mode 660, the new frame represents the frame difference 362 between the current frame 309 and the previous 311 frame. Namely such frame difference 362 signal need to be added to the previous decoded image frame stored at the Old Frame section 311 of the frame memory 312.

The updated current frame 309 of pixel data is displayed in a digital YUV format 392 using display processor 310. It can also be converted to a NTSC 382 analog composite signal using a NTSC converter 1466.

5. DESIGN AND IMPLEMENTATION

PROGRAMMABLE CCD CELLULAR LOGIC PROCESSOR

As shown in FIG. 18, we illustrates the design example of a 3×3 programmable logic device which employes a cellular array logic architecture. This figure is used only to demonstrate the function and physical design of the device. The practical size N for a N×N array is depending upon the application requirements and the state-of-the-art of the implementation technologies.

Figure 19:
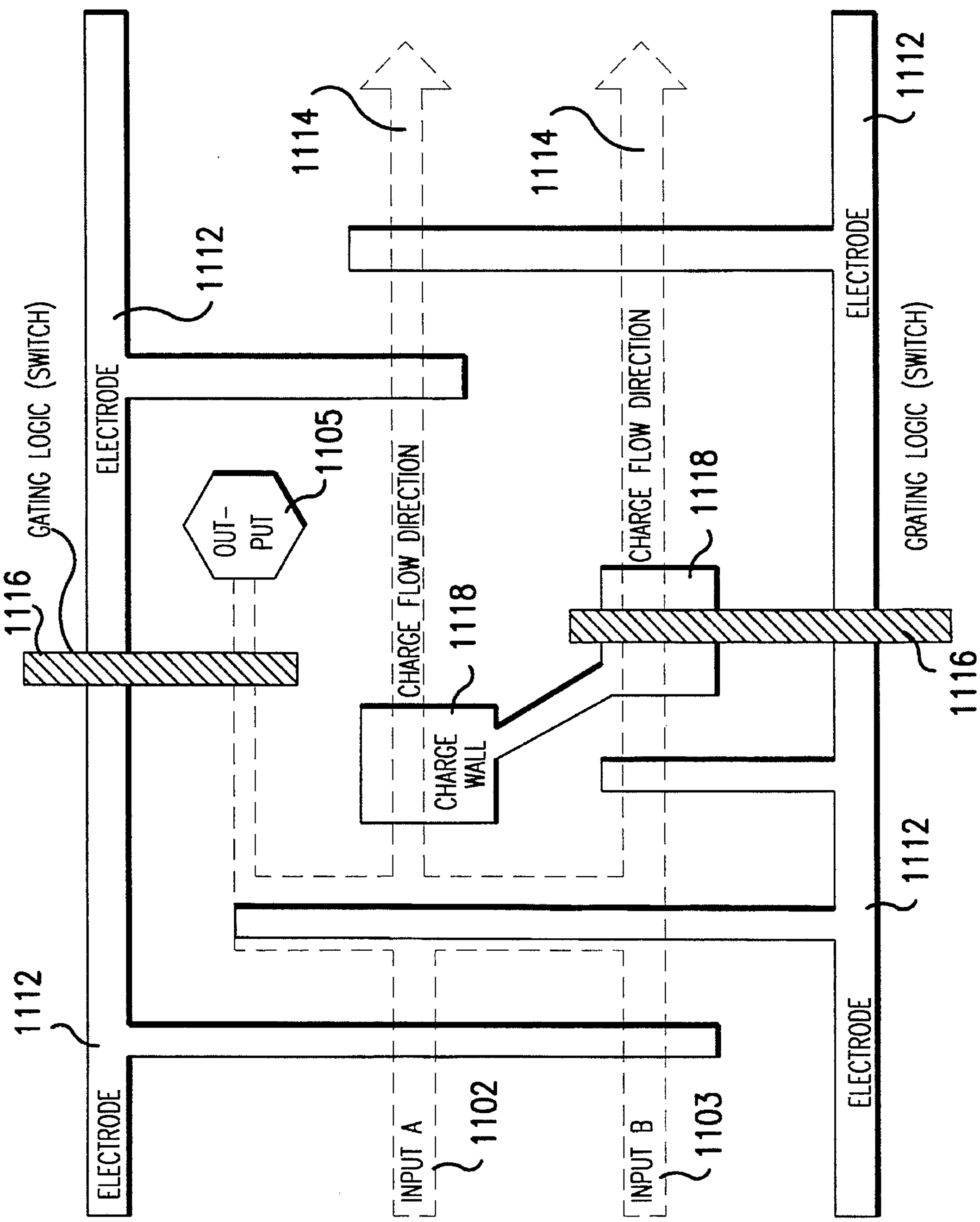
FIG. 19 illustrates how to use CCD image sensing technology to design a programmable logic processor.
Figure 20:
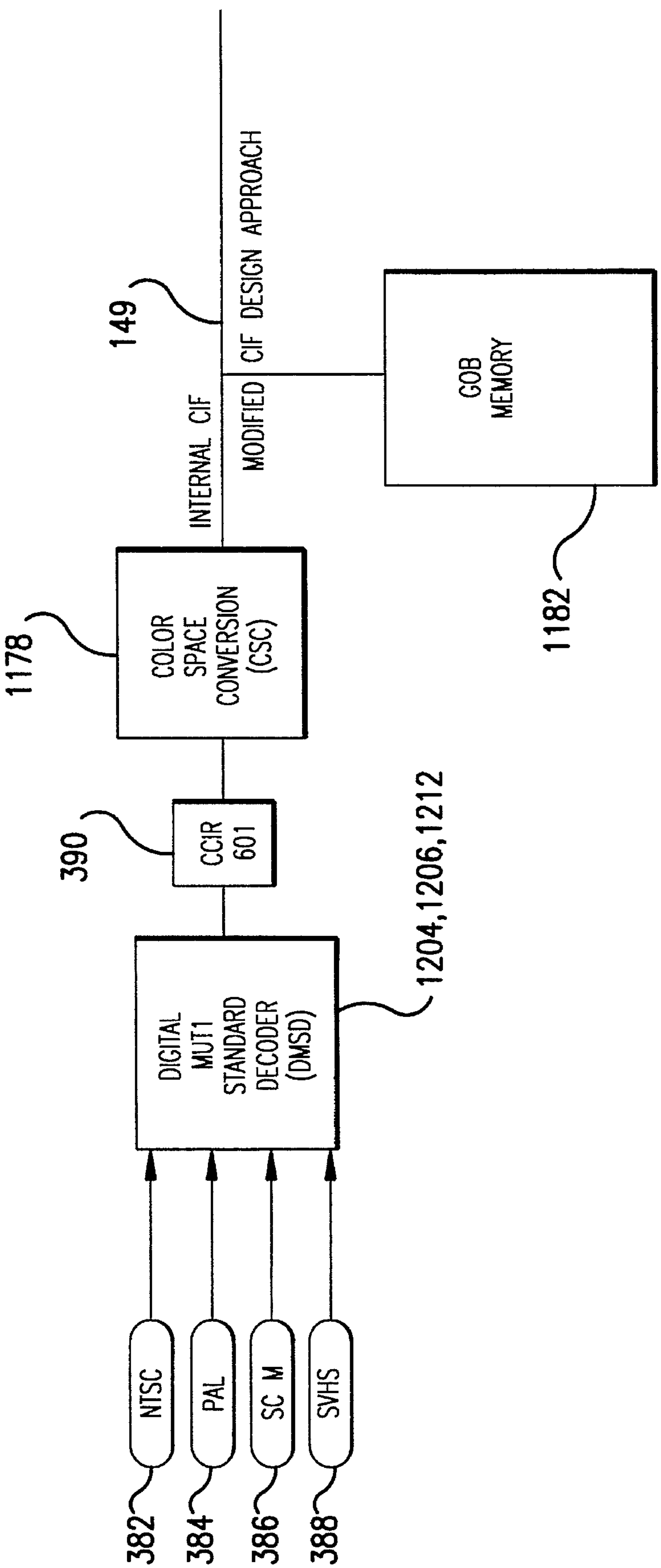
FIG. 20 illustrates how to implement a Capture Processor.

In FIG. 19, we further show the practical implementation of a cellular logic processor element (PE) 866 using CCD (charge couple device) technology. The objective is to provide an integrated image sensor array with the digital preprocessing capabilities so that image coding for the macroblocks (MB) 404 and pixel domain image coding functions can be performed. The other objective is to allow the implementation of on-chip parallel image sensor and parallel image processing circuits using the same or compatible technologies. Other alternatives such as CID (charge injection device, photo diodes, NMOS, or CMOS) should equally be considered. We selected this cellular array logic architecture because as a special class of non-Von-Nouman machines, they have been proven to be particularly useful in implementing fine grained, tightly coupled parallel processor systems. They employes SIMD (single instruction multiple data), or MIMD (multiple instruction multiple data) techniques to provide system throughput where traditional sequential computing can never approaches.

Many cellular array processors have been designed in the past. Most of them employes a processor array 884 which consists of matrix of PE's (processor elements) 866, and a switch array 886 which can provide programmable interconnect network among PE's 866. Some of the successful commercial implementations are like Butterfly Machine, Hypercube, PIPE, and Staran. These machines are general purpose supercomputers which can provide ultra high performance for wide range of scientific applications such as fluid dynamics, flight simulation, structure analysis, and medical diagnosis. Because of the complexity of these systems. They are extremely expansive.

The major distinction between our device and the existing parallel cellular array computers is that, our design is based on a much simpler architecture. Our design is also only dedicated to image processing and coding applications. Our major objective is to meet the real time performance requirement for MB 404 (macroblock) pixel domain processing function or motion processing.

Figure 18A:
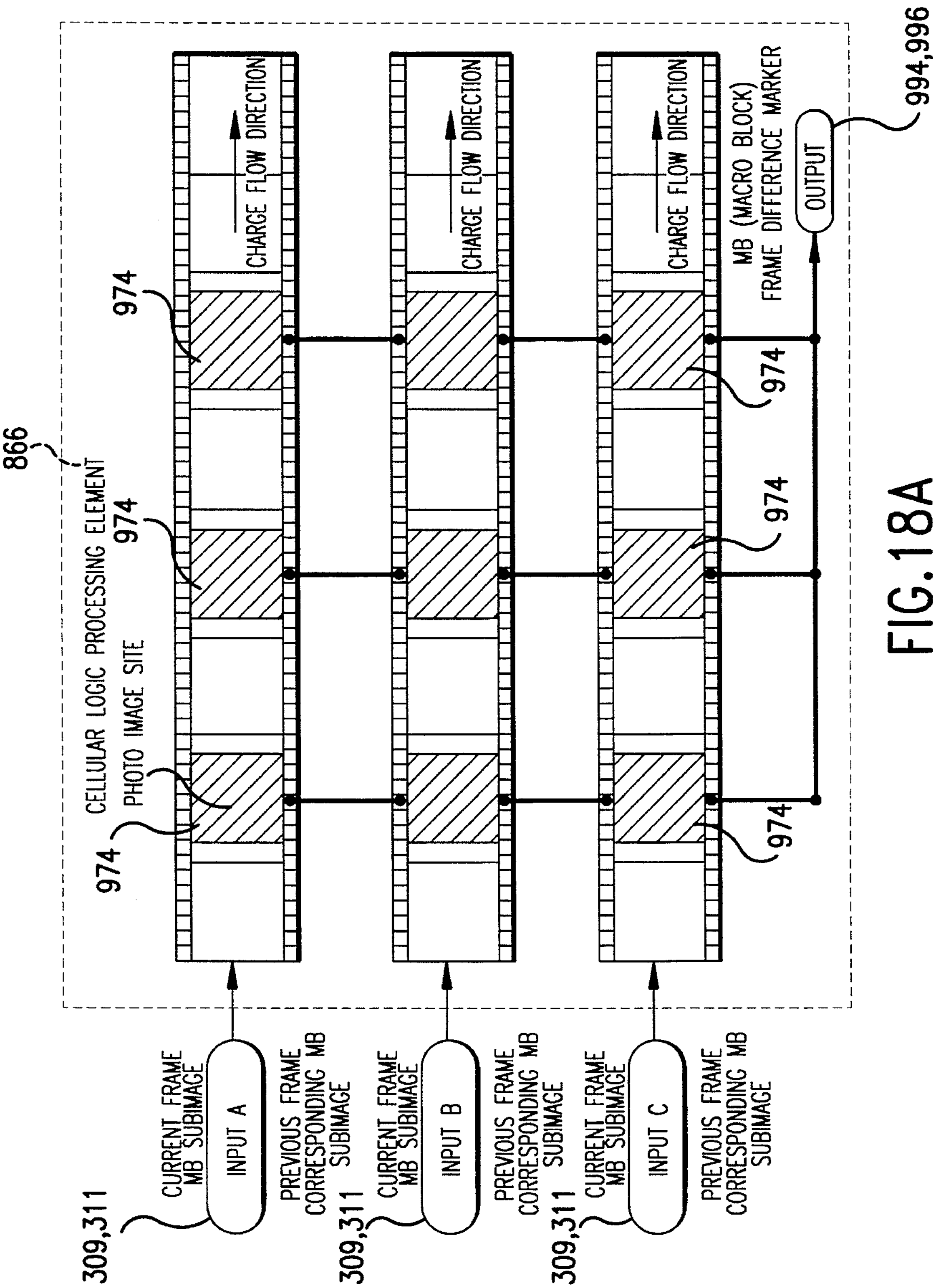
FIG. 18 illustrates a programmable cellular logic processor design for wide range of image coding and processing functions.

As shown in FIG. 18A, we demonstrate how frame differencing 362 function can be performed for each of the incoming subimage MB (macroblock) 404. For illustration, a 3×3 array is drawn instead of a 16×16 array to represent a macroblock 404. MB subimage from the current frame 309 is first shift into the PE 866 from the left side, the corresponding MB subimage of the previous frame 311 is then loaded into the PE 866, the comparison functions are performed between the two MB's to detect if there is any frame difference 362. Provided the difference is larger than the preset threshold value, the MB will be marked, and the difference between the two frames will be write to the frame memory 312. Otherwise, the current frame 309 MB value will be deleted, and the previous frame MB value 311 will be used for display updates.

Provided there are excessive amount of MB's identified with the frame difference 362, then a scene change 1002 must has occurred. The MB processor will then notify the HP 314 (host processor) and PP 306 (pixel processor), and switch the operation mode from interframe 660 coding to intraframe coding.

The significance here is obviously that while the incoming image is sensed from the camera 383, the specific MB's with the frame differencing 362 can be identified and stored. Consequently, in the interframe coding mode 660, only these MB's will require motion estimation and compensation 403, DCT transform coding 418, quantization 378, RLC (run length coding), VLC 372 (variable length coding). Finally, only these frame differencing MB's will be marked and stored at the FM 312 (frame memory) to represent image sequence of the current frame. Our approach also allows that, in case of scene changes 1002, enough MB's will be detected with frame differencing, the system can automatically switch to the intraframe coding mode 360.

Figure 18B:
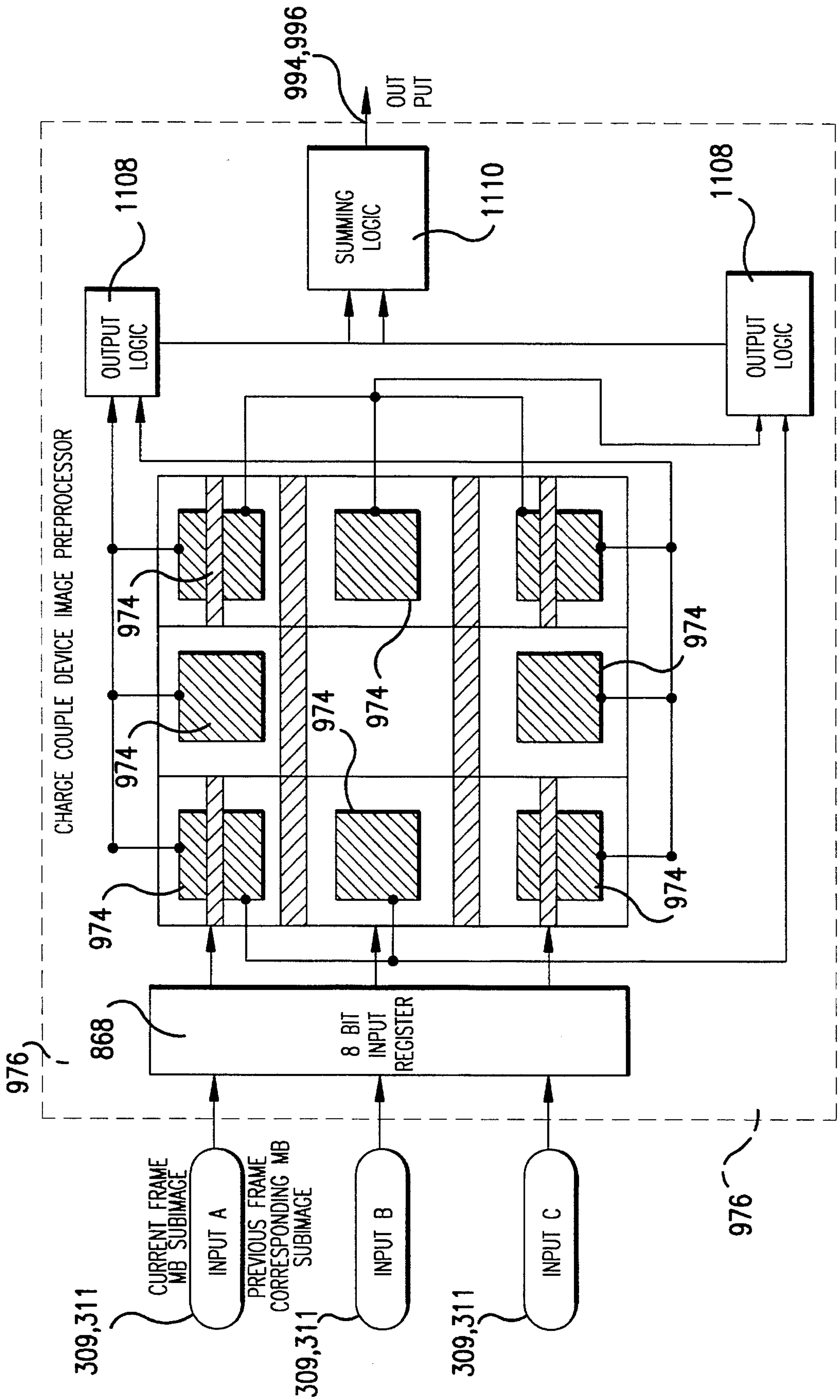

FIG. 18B also provide the implementation of some other pixel domain processing functions. e.g., low pass filtering, high pass filtering, hadmard transform, or quantization. The quantization 378 can be performed by presetting the threshold value, then shift in and quantize the corresponding transform domain coefficients. The threshold value can be re-programed to adjust the quantization level. Other pixel domain functions can be performed through preloading the proper coefficients into the PE 815 array, perform ALU 812 operations, e.g., multiplication with the corresponding image input pixels.

The overall advantages of our design is that as soon as input image is detected (sampled and threshold), several pixel domain preprocessing function such as frame differencing 362 and motion estimation 403 can be performed right away. The differencing MB's will then be send to TP 308 (transform processor) to perform DCT 418 operation, the output of the DCT coefficients MB's can further be reloaded into the PE array 815 to perform quantization 378. When bandwidth reduction 144 is required, initial threshold can combine with a coarser quantization level to reduce the image resolution. When system demands faster performance, multiple parallel PE array can be cascaded to perform MB concurrent operations such as frame differencing 362, motion processing 403, and quantization 378 simultaneously.

The natural advantage of CCD technology is that it is inherently suitable for image processing, delay line, multiplexing, and storage operations. CCD can also work either in the analog or digital domain. Therefore, depending on the application requirement, we can perform both analog processing, digital processing and memory functions using these PE arrays 815. A typical example will be that frame differencing 362 can be performed in analog form, Namely, the current frame 309 can directly overlay with the previous frame 311 when we delay and buffer the previous frame and use their pixel value as the threshold against the current frame 309. Other example is that transform operation 418, 420 can be performed in the analog domain using analog multiplecation of the charge value (current frame pixels) and the gate voltage (coefficients).

COMMUNICATION SYSTEM PIPELINE

As shown in FIG. 11, we illustrate in detail how front end communication subsystems interact with the HP 314 (Host Processor), SM 313 (System Memory), PP 306 (Pixel Processor), FM 312 (Frame Memory), and DP 310 (Display Processor). These interactions are performed through the SBus 330 (System Bus). Namely, the incoming video sequence 511 is first received at the FEM (Front End Demodulator) module 436, NCP 302 (Network Communication Processor) and XP 304 (Transmission Processor) will decode the control message and the header information 596 from the information packet. PP (Pixel Processor) and TP 308 (Transform Processor) will then start the decoding of these video sequence from frequency domain to pixel domain. The difference 362 are added to each old frame 311 to construct a new frame 309 and store at the FM 312 (Frame Memory). Finally the DP 310 will perform the appropriate interpolation 398 and display to output the video sequence at the selected frame rate 578. Similarly, in a reverse order, the outgoing video sequence can be prepared through coding of the frame difference 362 for each MB (macroblock), convert from pel to frequency domain using DCT (Discrete Cosine Transform), perform Zigzag scan conversion 374, quantization 378, VLC 372 (Variable Length Coding) and transmit out through the Frond End Modulators (FEM) 436.

Depend on the network and application requirements, the Front End Modem (FEM) modules 436 can be selected from the following: Typically, ADPCM 436 is chosen to code voice or voice band data at 32 Kbps (Kilo bits per second), V.29 478 is chosen to code binary text (FAX) at up to 9.6 Kbps, V.32 474 is chosen to code data at 9.6 Kpbs, S56 DSU 488 (Digital Service Unit) is chosen to code data at switched 56 Kbps PSDN (Public Switch Digital Network) networking environment, ISDN TA 492 (Terminal Adaptor) is suitable to code data in the 2B+D format, i.e., B channels for video, audio, or data, and D channel for data, or control message at 64 Kbps ISDN environment. T1 CSU 490 (Channel Service Unit) is suitable for coding video sequence at T1, i.e., 1.544 Mega bits per second or CEPT (2,048 Mbps) speed. The Ethernet Transceiver 494 can provide up to 10 Mbps throughput for transmitting the video sequence.

Once the incoming video sequence is received and stored at the BM (Buffer Memory), the control message and header 596 information will be stored at a FIFO 344 (First-In-First-Out) memory, and use it for further decoding by NCP 302 and XP 304. In this figure, we propose to employ a self-contained micro controller 324 to provide FF 444 (frame formatting), EP 448 (error processing), and PC 446 (protocol control) functions. 8 bit micro controllers such as 80C51 should be adequate to process byte wide header information for low bit rate applications up to 64 Kps range. For higher speed applications such as H1, T1 or Ethernet network applications, 16 bit or 32 bit high performance embedded micro controllers can be employed. The other advantage of integrating the FF 444, EC 448, and PC 446 functions into a single device is to eliminate the off-chip XBus interconnection in between these functional modules.

In the case of high speed communication, i.e., T1 (1.544 Mbps or higher), the communication pipeline need to be constructed. Consequently, pipeline registers and FIFO's 344 need to be inserted to assure proper operation of the pipeline.

HP 314 is the local controller host for the communication pipeline, bus master for the SBus 330 (system bus), and the remote controller for the video pipeline. Since PP 306 is the local controller for the video pipeline, and the bus master for the VBus 332 (video bus), we have developed a window scheme to memory map portion of the HP 314 local memory to the PP 306 program and data memory space. This way, HP 314 can monitor the progress, status and events occur at the video pipeline, and Vbus 332 without interfering the PP 306.

VIDEO CODEC AND DISPLAY

Figure 12A:
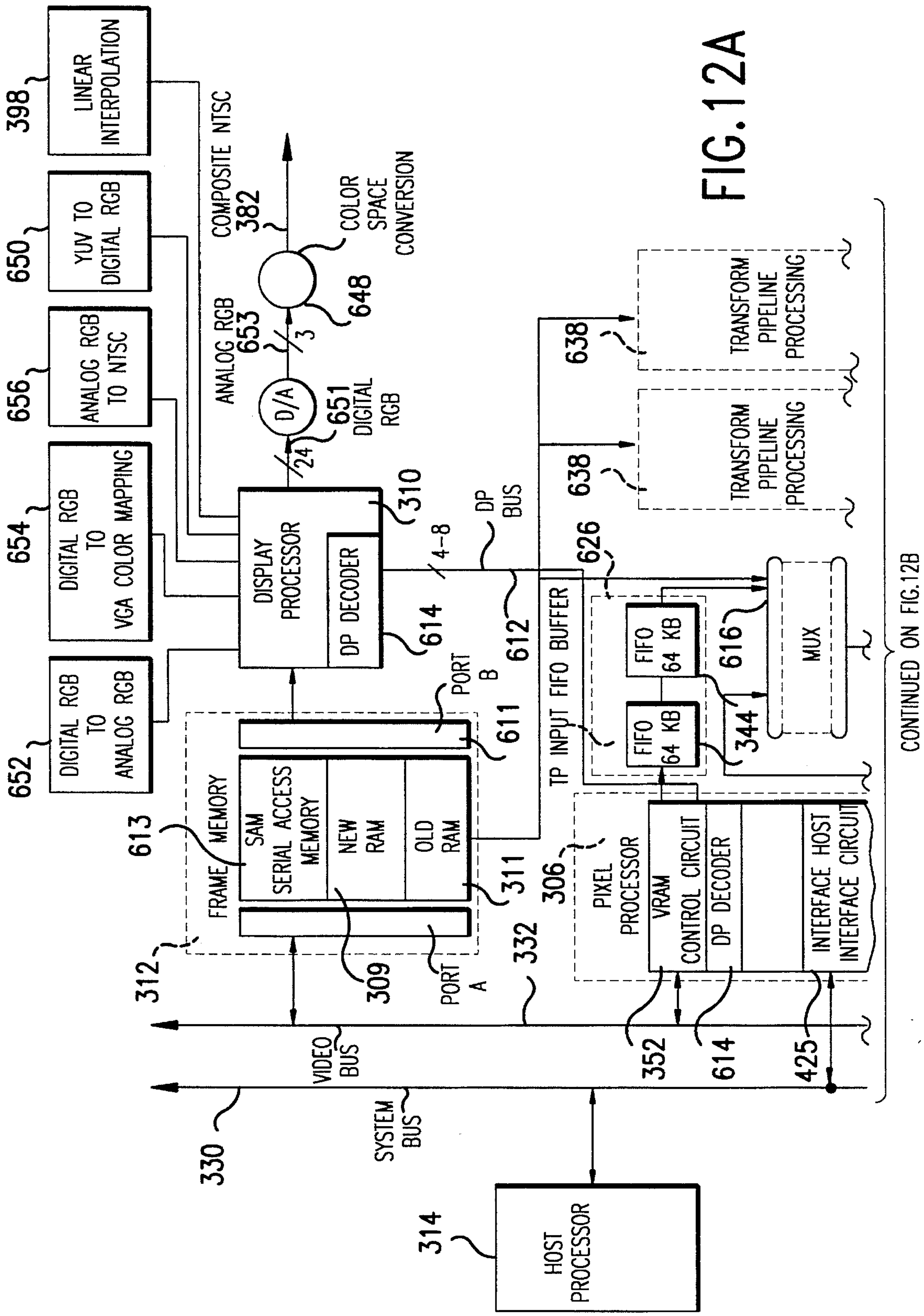
FIG. 12 illustrates the display format for compressed audio and video data types.
Figure 12B:
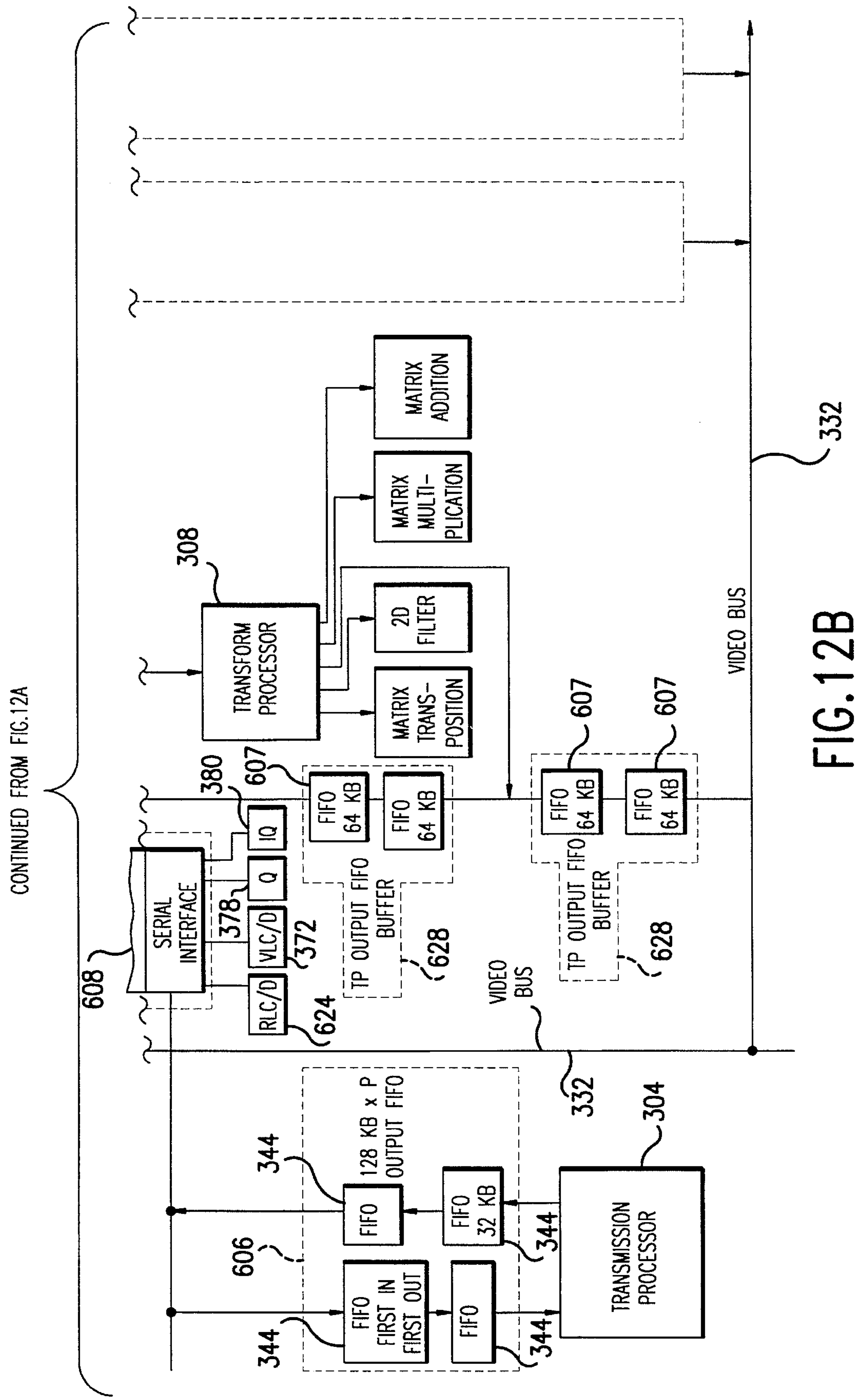

As shown in FIG. 12, we illustrate a block diagram of the design of a video codec and display (VCD) subsystem, it then illustrates how this subsystem can work with the other subsystems such as transmission processor (XP) 304, and host processor (HP) 314.

A VCD (Video Codec and Display) subsystem consists of the following major functional blocks: PP 306 (pixel processor), TP 308 (transform processor), FM (frame memory) 312, and DP 310 (Display Processor).

PP 306 is the local host controller for the VCD subsystem. PP 306 is also the bus master for the private VBus 332 (video bus). PP communicate to the system host controller HP 314 through SBus 330 (system bus) using its internal host interface (HIF) 425 circuits. PP 306 also interconnect to the XP 304 through a 128 kilo bytes (KB) FIFO 344 (first-in-first-out) memory buffer using its internal serial interface (SI) circuits. PP 306 interface and control the FM 312 through VBus 332, using its internal VRAM control 352 (VRAMC) circuits. PP interface with the motion processor (MP) 307 through Vbus 332, PP 306 interface with its coprocessor DP 310 through a private bus PDBus 612 using its internal DP decoder (DD) 614 circuits. PDBus 612 is a 4–8 bit wide control bus used only to exchange coded control and status information between PP 306 and DP 310. Finally, the PP 306 interface with its other coprocessor TP 308 through FIFO's 344 and input multiplexer (MUX) 616. PP-TP pair must closely work together to accomplish the time critical Discrete Cosine Transform (DCT) 418 operation. pipeline technique is employed to assure proper performance.

Besides interface with the rest of the VCD subsystem, PP 306 control the FM 312 and VBus 332, and interface with MP 307 and communication subsystem, PP 306 is also required to perform many time critical pixel domain video coder and decoder functions. Namely, these are variable length coder (VLC) 372 and decoder (VLD), run length coder (RLC) and decoder (RLD), quantization 378 (Q), dequantization (IQ), and zigzag to raster (ZTR) 374 or raster to zigzag (RTZ) scan conversion. These are mostly scalar operations. Special circuits can be designed into the PP 306 to meet the requirements.

Since most video coding algorithms employes frame differencing techniques to reduce bandwidth, only the frame difference signal 362 will require to be coded and decoded. FM 312 is designed to store the old and new frames 309 at two individual sections, The old frame 311 is stored as the reference model while the difference 362 between the new and old frames are being updated. The updated difference signal 362 is either coded for transmission, or be deocoded and add back with the old frame 311 to construct a new frame. It is critical that this updating process must be completed within 1/30 second to provide a 30 frame per second (fps) frame rate 200.

As an encoder, PP will retrieve from the FM 312 these frame difference signal 362 in macroblocks (MB) 404. TP 308 will perform DCT 418 function to translate each of the Y, U, and V block (8×8 pixels) from pixel to frequency domain. The PP will carry these DCT 418 coefficients for each Y, U, and V block and perform RTZ 374, Q 378, and VLC 372 functions before it forward the coded bit stream to the XP 304 for transmission.

As a decoder 122, PP 306 retrieve these frame difference bit stream 362 from the XP FIFO buffer 606, go through the VLD 372, IQ 378, and ZTR 374 decoding sequences. The 8×8 blocks of DCT coefficients will be sent to TP through it's input FIFO buffer. TP performs Inverse DCT (IDCT) operation to derive the pixel domain values for each Y, U, and V block. These pixel value will be stored at the TP output FIFO until the PP retrieve the old pixel block from FM. This difference signal will then be sent back to PP and add to the old Y, U, V frame in order to update the new Y, U, V frame.

TP 308 not only need to perform the required DCT 418 and IDCT 420 operations, TP 308 must also provide some other matrix operation as well. These include: matrix transposition, 2 dimension filter, matrix multiplication and matrix addition. Whenever motion compensation techniques are applied, the old frame must be filtered first before it can be added to the new frame difference. Besides, the IDCT 420 output must be transposed first before the final addition so that the row and column positions can be consistent.

The input and output double FIFO 344 buffers and the input multiplexer (MUX) are employed to allow the 4 stage pipeline required for the DCT 418 operation. The pipeline stages are input, DCT 418, add, and transposition.

When high speed MB 404 processing is required, Up to six transform pipeline processor (TPP) block can be cascaded in parallel to gain six fold performance. each TPP process six 8×8 block simultaneously for the 4Y, 1U, and 1V block within each MB.

Each new frame needs to be updated within 1/30 a second provided no interpolation 398 techniques are applied. DP 310 can have interpolation circuits built in to ease frame updating requirement 578. A 2:1 interpolation 398 will allow a slower update speed at 15 fps 582 instead of 30 fps 200.

Besides the frame updating 578 and interpolation 398, DP 310 can also provide one or more of the following color conversion functions 1178. Namely, these are: YUV to digital RGB 650, digital RGB to analog RGB 652, digital RGB tO VGA color mapping 654, and analog RGB to NTSC 656.

PIXEL AND HOST PROCESSING

Figure 13A:
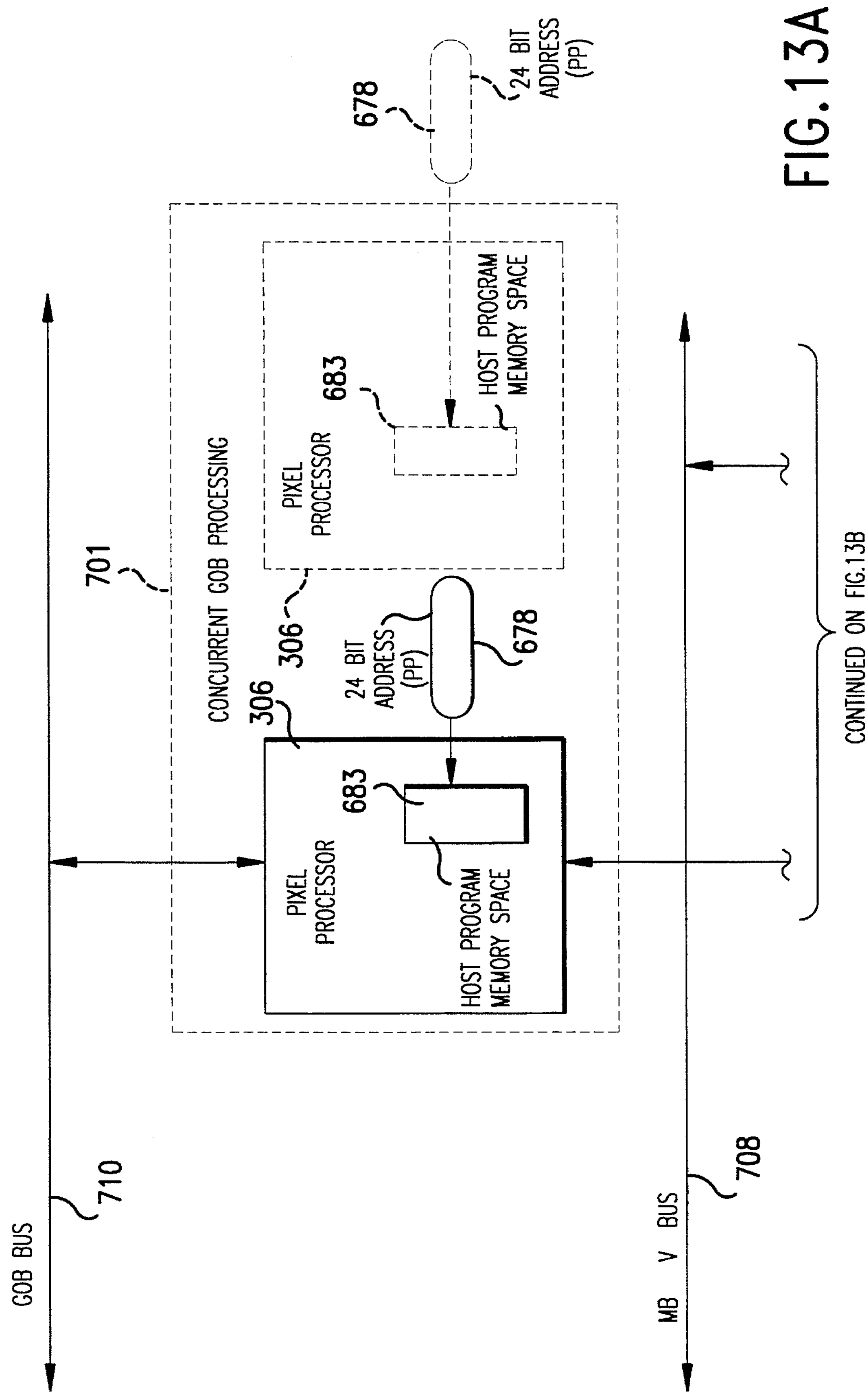
FIG. 13 illustrates the design of Pixel Processor and Host Processor.
Figure 13B:
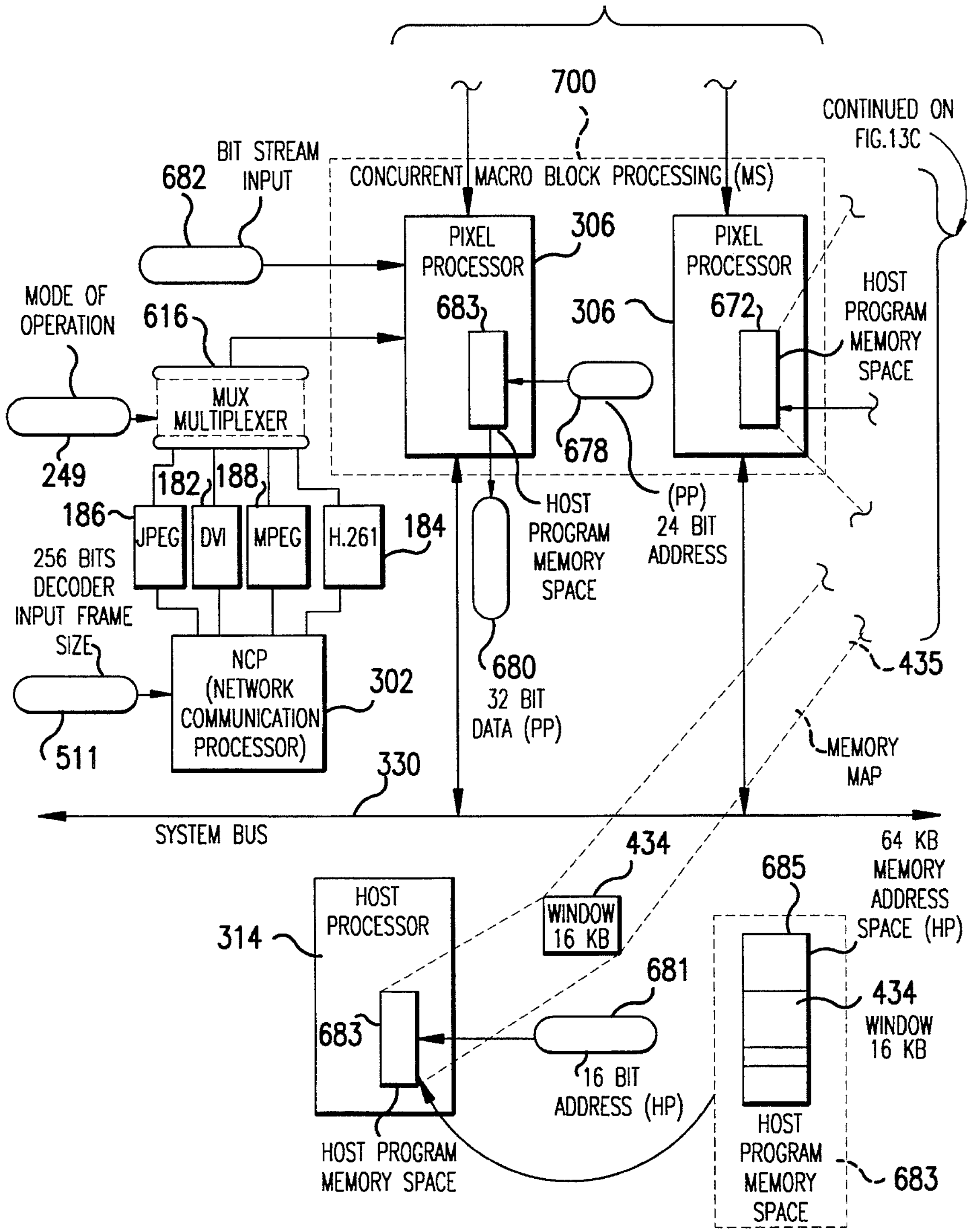
Figure 13C:
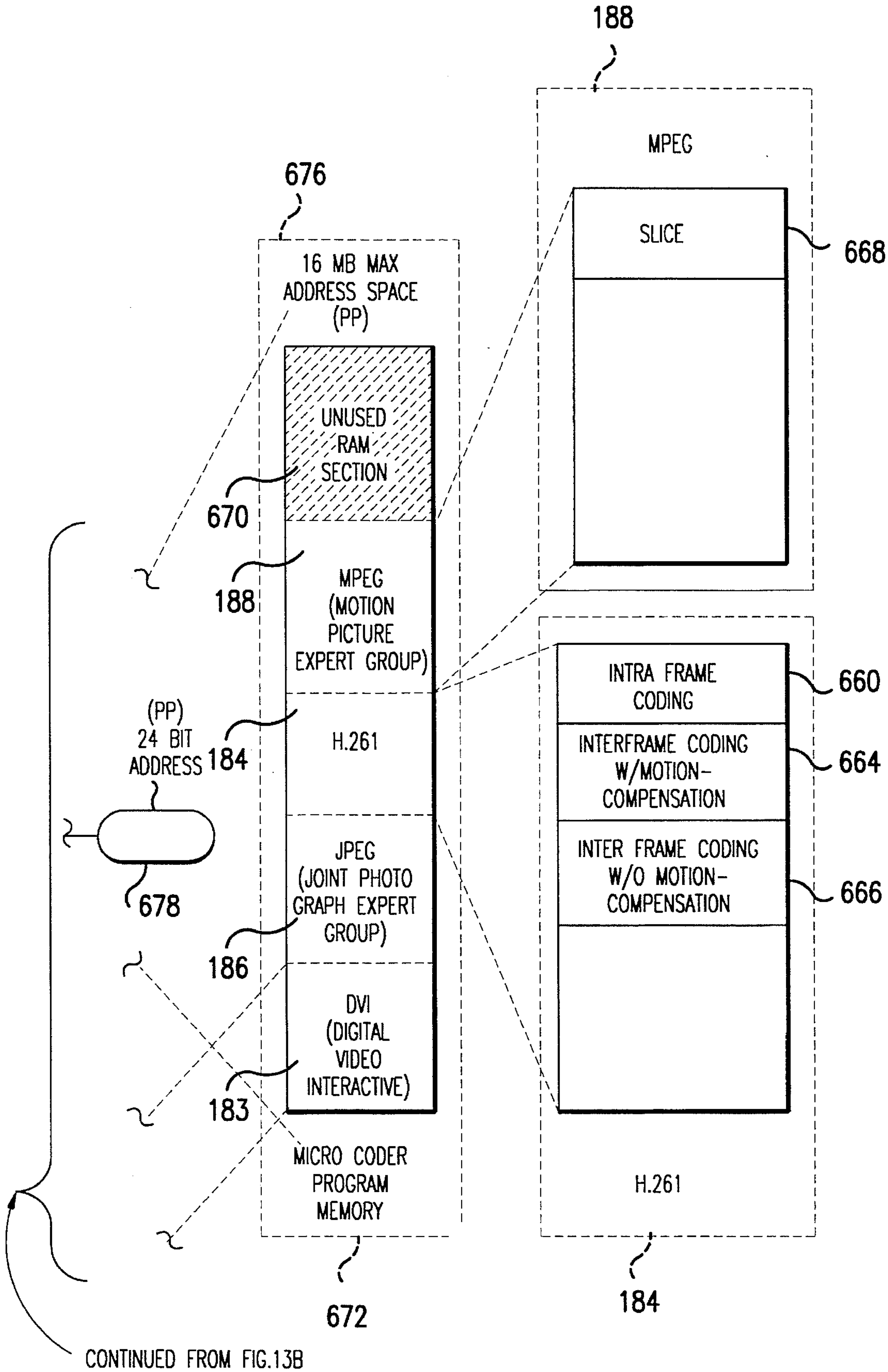
Figure 14:
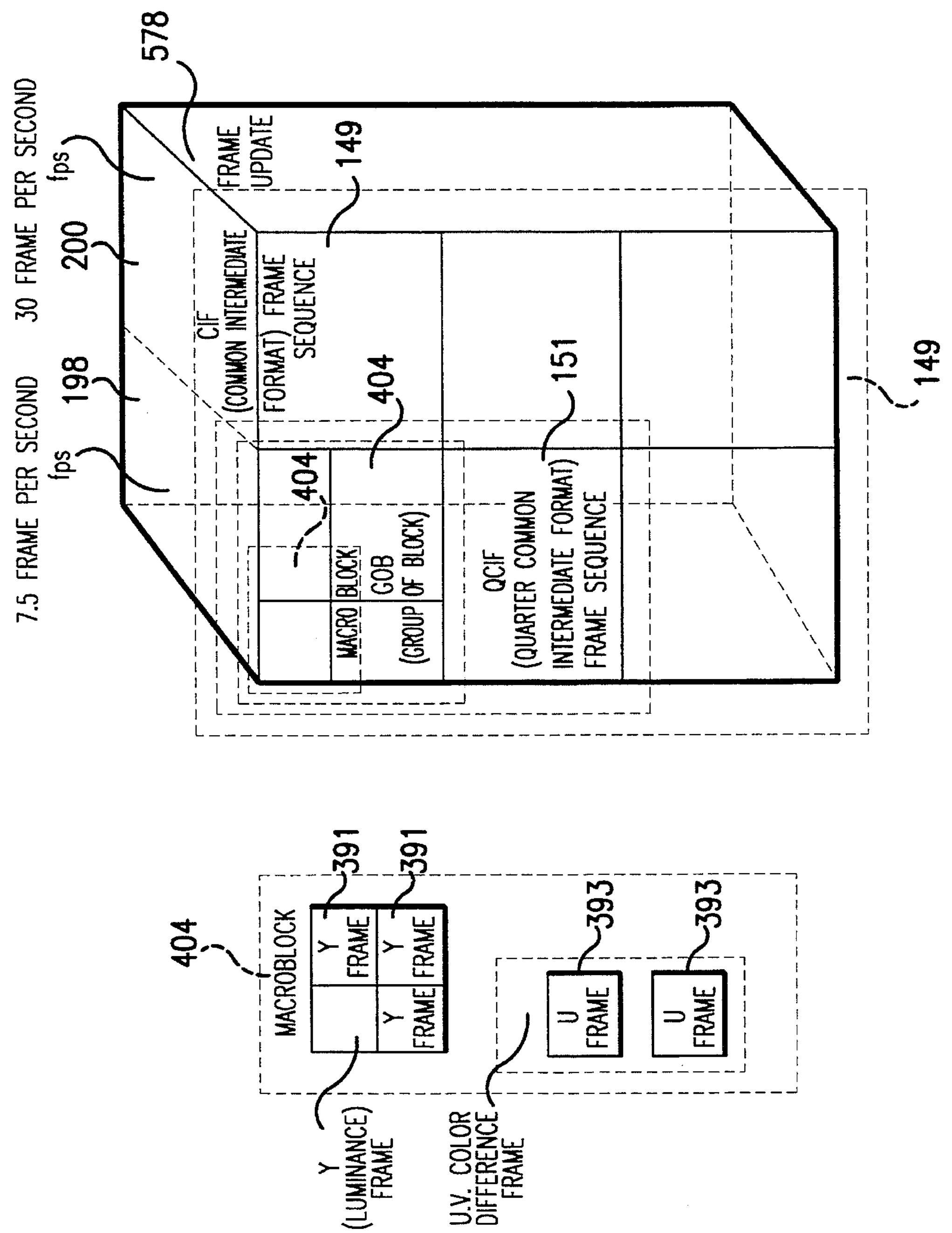
FIG. 14 illustrates the real time performance requirement and frame configurations for the CIF/QCIF format based CCITT H.261 international video coding standard.

As shown in FIG. 13, we illustrate the two major host system microprocessor, the Pixel Processor (PP) 306 and Host Processor 314 (HP). PP 306 is the local host controller for the VCD (video codec and display) subsystem, and HP 314 is the global host for our overall system and a local host for the NCT (network communication and transmission) 302, 304 subsystem. Meanwhile, PP 306 serves the bus master for the Video Bus (VBus) 332, and HP 314 is the bus master for the system bus 330 (SBus). Both VBus 332 and SBus 330 are system wide parallel interconnection. VBus 332 is specifically designed to facilitate the video information transfer among subsystem components. PP 306 is designed to meet the flexible performance for various types of popular transform domain coding algorithms such as MPEG 188, H.261 184, or JPEG 186. Meanwhile, PP 306 can also perform other pixel domain based proprietary methods as well. While most of the pixel domain algorithms are either inter or intra-frame coding, the CCITT and ISO standard algorithms (MPEG 188, JPEG 186, and H.261 184) are transform domain coding methods employing fast DCT 418 implementation, and interframe differencing techniques. Meanwhile, MPEG 188, and H.261 184 also apply motion compensation techniques.

With all these flexibility in mind, PP 306 has rested with a special purpose microprogrammable architecture. That is, the processor element has the ability to address a very large microprogrammable memory space. Equipped with a 24 bit address line, PP 306 is now able to access 16 Mega Bytes (MB) of program memory. The program memory 672 can further be partitioned into separate segments while each segment can be designated for a specific coding algorithm. Since PP 306 is microprogrammable, it becomes relatively easy to update the changes while MPEG 188, H.261 184, and JPEG 186 standards are still evolving. The horizontal microcode structure further allows the parallel execution of operations which often times find desirable to improve the system performance.

PP is also designed with the parallel processing in mind. The microprogrammable architecture design allows multiple PP's 306 to loosely couple over a MB or GOB VBus 708, 710, and to provide concurrent program execution for a extremely high throughput system. The significance is that a dual processor system will allow each PP 306 processor element dedicating to a coder or decoder function. On the other hand, a find grained tightly coupled six PP 306 processor system will allow concurrent execution of a macroblock, while a thirty-three processor can execute a entire GOB (group of blocks) in parallel.

HP 314 plays a very critical mole as well. The design considerations for the HP 314 are that: it must be able to provide a system independent interface to the external host; it must be able to execute the popular DOS or UNIX programs such as word processing or spreadsheet programs; finally it must be able to mass production at a reasonable low cost.

The choice of HP 314 is either a 80286 or 80386 types of general purpose microprocessor. These microprocessors provides a convenient bus interface to the AT bus, which should have the sufficient bandwidth to be used as the SBus 330 (system bus). these microprocessors also provide the total compatibility with a wide variety of the DOS based software application programs available on the market today. Furthermore, the companion SCSI 424 (small computer system interface) controller device are readily available to provide a high speed interface to the external host PC 106 or workstations. Through SCSI 424 high speed interface, our system can request for remote program execution by the external host. Our system can also access the remote file server, i.e., CD-ROM for accessing video image information. Finally, now that the typical communication between the internal host HP 314 and the external host are exchanging simple control status or control messages 426, such information can be easily translated into other system specific commands for Unix, Mac, or other proprietary operation systems. Finally, the SCSI 424 interface allows a high speed link to interface with the switch to provide network wide video conferencing, distribution, or other store and forward application services.

We have developed a window method 434, 435 to allow HP 314 directly access to any portion of the PP 306 memory space in order to access, exchange, or monitor information. This technique can also apply to the information exchange among coprocessors at a general purpose multiprocessor or parallel processor systems. In our design, a window 434 area of the HP 314 memory space, e.g., 64 KB (kilo bytes) has been reserved and memory mapped 435 into a 64 KB area within the address space of PP 306. The PP 306 can then download the data from any of its memory space to this window area 434 so that HP 314 can have direct access. This have many applications such as real time monitoring, program or data exchange, or co-executing programs among HP 314, PP 306, or any of their coprocessors.

NETWORK COMMUNICATION AND TRANSMISSION

Figure 9:
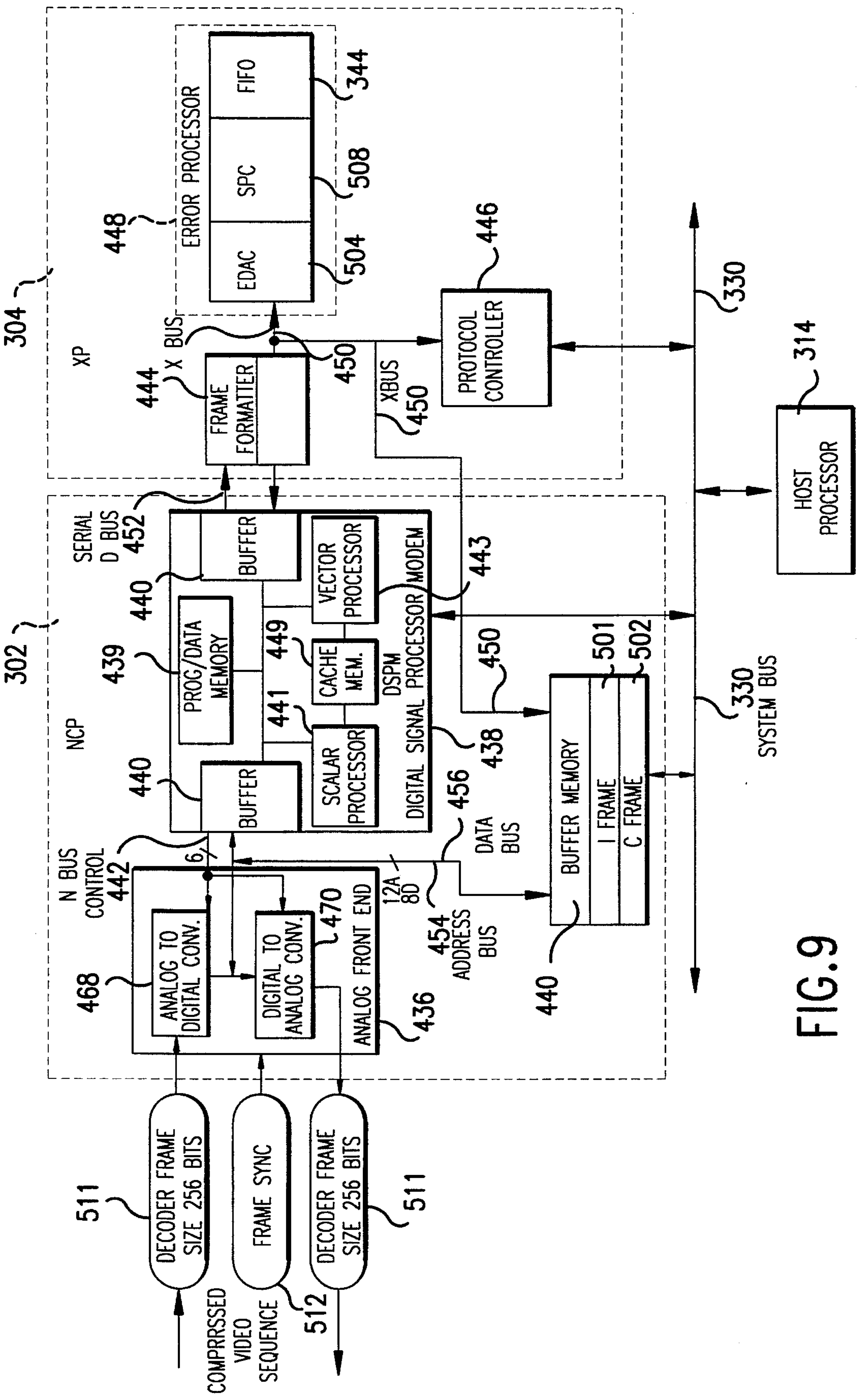
FIG. 9 illustrates detailed block diagram of how to design the Network Communication Processor and Transmission Processor.

As shown in FIG. 9, we first illustrate how to design a Network Communication Processor (NCP) 302, we then illustrate how to design a Transmission Processor (XP) 304. The NCP 302 consists of Analog Front End (AFE) 436, Digital Signal Processor Modem (DM) 438, and a Buffer Memory (BM) 440. These NCP 302 components, are interconnected through a private NCP Bus (NBus) 442, The XP 304 consists of a Frame Formatter (FF) 444, a Protocol Controller (PC) 446, and Error Processor (EP) 448. The XP 304 components and the BM 440 (Buffer Memory) are interconnected through another private X Bus (XBus) 450. The DBus 452 facilitates NCP 302 and XP 304 communication through directly connecting the DM 438 and FF 444 subsystems. These Private NBus 442, DBus 452, and XBus 450 are designed to facilitate effective data addressing and transfer in between the subsystem blocks. Furthermore, the BM 440 (Buffer Memory), DM 438 (DSP Modem), and PC 446 (Protocol Controller) are interconnected to the HP 314 (Host Processor) through SBus 330 (System Bus). The specific requirement of the bus design, which may includes address 454, data 456, and control 442 sections, is depend upon the data throughput, word size, and bus contention considerations. The NCP 302 implements the DTE 130 function and the HP 314, XP 304 performs the DCE 132 function. The DCE 132 and DTE 130 pairing can properly interface a local CPE 134 (Customer Premise Equipment) system with the remote telecommunication network 118 and to perform conference control 157, store and forward 278, or bandwidth management 144.

Within the NCP 302 subsystem, DM 438 is the local host controller 466, AFE 436 consists of ADC (Analog-to-Digital Converter) 468 and DAC (Digital-to-Analog Converter) 470 circuits. The ADC 468 samples and holds 472 the analog input signal and convert it to digital bit stream. The DAC convert the digital output bit streams and convert into analog output signal. AFE is the front end interface to the telephone network 118 from our system. The output digital bit stream from the ADC 468 is then transfer to the BM 440 for temporary storage. The DM 438 will access these information through BM 440 to perform line coding functions, such as V.32 474 for a 9600 baud data modem 476, and a V.29 478 for a 9600 baud fax modem 480. Insides the DM 438 is a programmable DSP 326 (Digital Signal Processor). We specifically choose the DSP 326 programmable approach instead of a dedicated one, This provides a easy implementation of line coding 482 and control 484 functions for many of the available AFE 436 approaches today. For example, the AFE 436 can be a V.32 data 474, V.29 fax 478, ADPCM Voice 486, Switch 56 Digital Service Unit (DSU) 488, T1 Channel Service Unit (CSU) 490, ISDN Terminal Adaptor (TA) 492, or Ethernet Interface Controller 494. We can easily program the DM 438 to perform specific line control 484 and coding 482 through download specific version of the system program, and properly exchange the correct AFE 436 modules.

Within the XP 304 subsystem, the FF 444 (Frame Formatter) first receives the incoming information frame (IFrame) 511 header message 596 from the DM 438, and identify the proper receiving video coding algorithm types, which can be either CCITT H.261 184, JPEG 186, MPEG 188, ADPCM 486, G3/G4 fax 480, or custom proprietary 182 algorithms. PC 446 then takes over, and start the appropriate protocol decoding procedures. Once the Control Frame (CFrame) 502 and IFrame 501 header information 596 are fully decoded. The IFrame 501 is send to the EP 448 for error checking and correction (EDAC) 504 of the double single-bit errors, the corrected bit streams are then converted from serial to parallel form using SPC (Serial to Parallel Conversion) 508, and store at a 128 Kbits FIFO 344 (First-In-First-Out) buffer for further processing. The FIFO 344 is designed into four 32K bits section. Each section allow to store a 32 Kbits bit stream 510 which is the maximum allowance of a compressed CIF 144 frame. Therefore a 128K bits FIFO 344 allows double buffering and simultaneous transmitting and receiving of the incoming and outgoing video frames.

In order to accommodate the various network environment, NCP 302 is designed to operated at the following specific speed: 9.6 Kbps (Kilo bits per second), 19.2 Kbps, 56 Kbps, 64 Kbps, 128 Kbps, 384 Kbps, 1.544 Mbps (mega bits per second), and 2.048 Mbps. HP 314 will offer three options as the standard modes of operation. In mode 1, single QCIF 151 sequence will be offered at 64 Kbps or under. In mode 2, single CIF 149 or four QCIF 151 sequences will be offered at 384 Kbps and higher. In mode 3, two QCIF 151 sequences will be offered simultaneously at 128 Kbps. When line condition degrades, AFE 436 will receives a change on incoming Frame Sync (FS) 512 signal, AFE 436 will then notify DM 438 and HP 314. HP 314 will then switch from standard operation 250 to the exception operation 252 mode. HP 314 has three options to lower the bit rate in order to accommodate. Option will be to notify the PP 306 and select a coarser quantization level 378. Option will be to drop the frame update rate, and increase the interpolation rate 398. Option 3 will be to drop from CIF to QCIF.

When EP 448 detects more than two single bit errors 506 for the incoming Iframe (256 bits long) 511, EP 448 will notify PP 306 and HP 314. HP 314 has two options to handle this case. Either PP 306 can request for a retransmission or HP 314 can delete the complete GOB (Group of Block) 1182 and wait until the next GOB 309 arrives. Meanwhile, HP 314 will send the old GOB 311 from the FM 312 and use it to update the display.

ANALOG VIDEO PROCESSOR

As shown in FIG. 18, we illustrate how to design a analog video processor (AVP). AVP is the frond end interface of our system to the analog world. AVP is designed to provide a flexible interface so that our invention can accept most of the popular analog standards. Namely, the NTSC 382 standard for broadcasting television programs in the U.S. the PAL 384 standard for broadcasting television programs in Europe, the super VHS (SHVS) 388 provides access to most of the VCR 110 on the market today. Then SCAM 386 is also one of the popular video inputs. Our invention will provides a multi-standard decoder to convert any of these analog signal into a CCIR601 390 digital signal. The CCIR601 390 consists of a 4:2:2 format of luminance (Y) 391 and chrominance (U, V) 393 signal. Each of the Y, U, V, signals are 8 bits deep. The CCIR601 390 frame has a 720h×480v resolution. Therefore, the Y frame 391 is 720h×480v×8 bits, the U, and V frames 393 are 360h×480v×8 bits each. The Color Space Conversion 1178 (CSC) will provides the downsampling of the chrominance components (U, V) from a CCIR601 390 format into a internal CIF format, as we stated earlier, the internal CIF 149 format can be a standard or modified CIF 149, or MPEG 188 format.

In order to facilitate the pixel domain processing and motion processing 403, A buffer memory is designed to retain three up to four horizontal columns of MB's (macroblocks) 404.

RAPID PROTOTYPING

Figure 21:
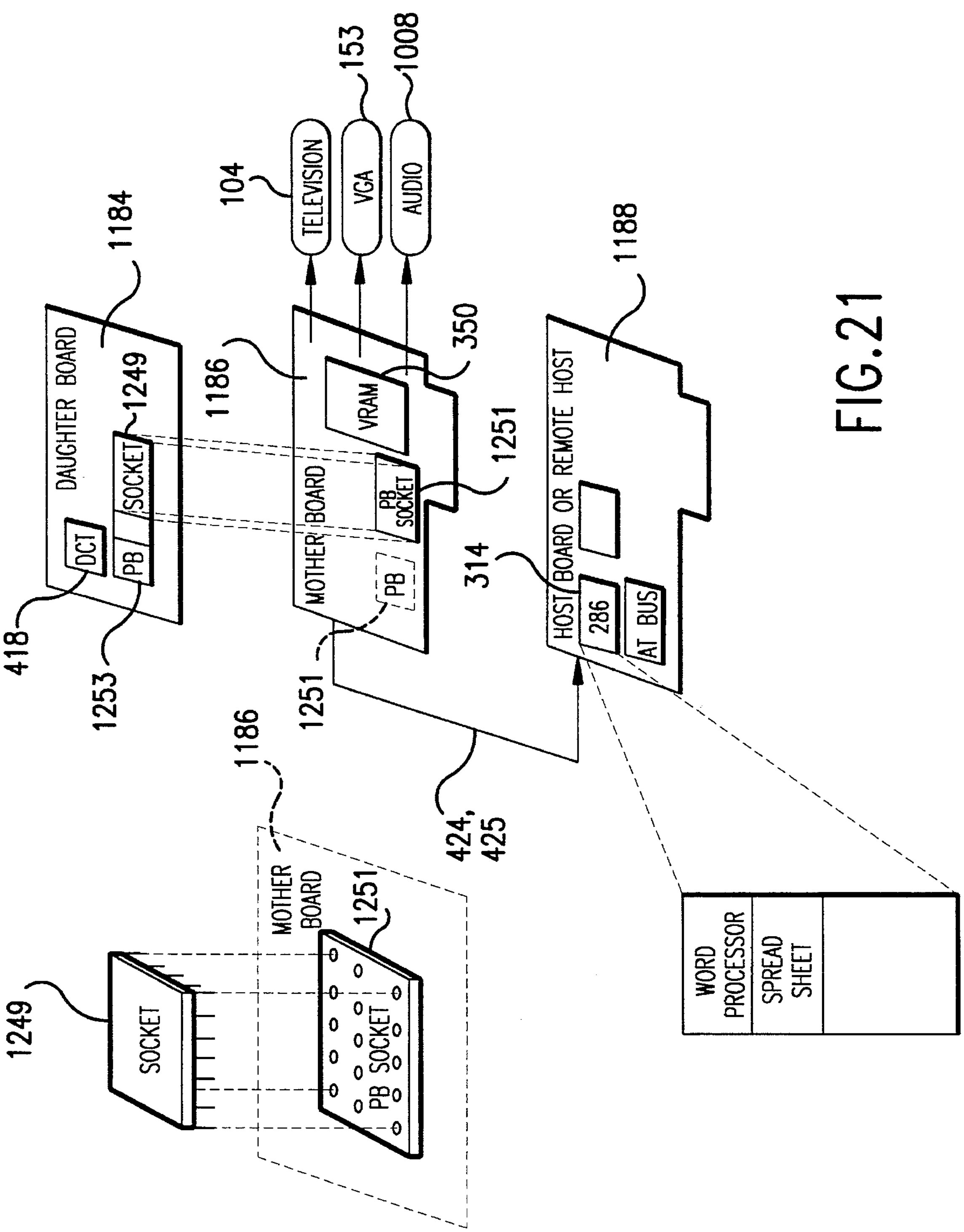
FIG. 21 illustrates a specific quick implementation employing INTEL DVI ActionMedia board and chips.

As shown in FIG. 21, we illustrate a fast implementation of prototyping our invention employes the following commercially available boards and chip components.

1. Intel 750 ActionMedia Board (1) 1186
2. Intel 82750 PB chip (2) 1253
3. Intel 82750 DB chip (1)
4. Intel 80286 microprocessor (1) 1194
5. PC-AT 286 chip set. (1)
6. Futjisu SCSI controller (1)
7. Thompson Semi.' DCT chip (3)
8. LSI Logic's Motion Estimation chip (1)
9. LSI Logic's Error Correction chip (1)

10. Signetics Digital Multi Standard Decoder chip (1)
11. AT&T DSP16A V.32 Modem chip set (1)

This specific implementation employes the Intel Actionmedia board 1186 as the video codec engine. the Intel Actionmedia board 1186 is designed originally to perform the real time decoding function for Intel's proprietary digital video interactive (DVI) compression 182 algorithms. The board consists of a 82750PA pixel processor 1253, a 82750DA display processor, 5 ASIC's, 4 MB's VRAM and output display circuits. The Intel Actionmedia board can not perform H.261 184 or MPEG 188 algorithms at this time, Intel press release announce those capabilities will become available in 1992. Although the actual Intel's implementation of H.261 184 and MPEG 188 coding algorithms is unknown at this time. We have developed a fast implementation of H.261 184 codec and MPEG 188 using Intel Actionmedia board product. This implementation, because of the ease of design complexity, should be completed within three months.

Our implementation call for a add-on solution for the Intel Actionmedia display board to provide a fast implementation of the H.261 184 and MPEG 188 algorithms. Our design principle is to design and attach a daughter card consists of 82750 PB, Thompson's IDCT 420, and the associated FIFO's 344 DPRAM's to the 80750PA socket 1251 on the Actionmedia board. This way, we can employes the existing frame memory 312, 80750DA display processor, VGA color mapping circuits 422, output interpolation 398 capability (built-in at 80750DA) and the available NTSC color conversion 1178 circuits. the ASIC's conveniently provide the host interface 425, VRAM controller 352, and SCSI 424 control functions. While the DVI decompression algorithm 182 is implemented in 80750PA chip, it is conceivable that since the 80750PA is microprogrammable, and the unused microprogram address space is still quite large, (20M words). Therefore it is conceivable to implement the H.261 codec 184 and MPEG 188 decoding algorithms in this program space, and use the 80750PA as the pixel domain processor to handle hoffman run level coding (RLC), variable length coding (VLC) 372, quantization 378, and zigzag 374 scan. Since it is unclear whether 80750PA can efficiently perform the DCT 418 operation, a Thompson Semi's DCT chip and its associated FIFO's, DPRAM's, state machine PLD's are added on the daughter board to perform the required DCT pipeline operation. Since the 80750PB is twice as fast as its older version 80750PA, the B version of 80750 pixel processor 80750PB) is used to replace the unpluged 80750PA. The 82750PB can perform variable length decoding 372, zigzag-to-raster 374 address translation, and de-quantization 378 functions. The LSI L64715 error correction chip is designed also on the daughter card with a AT&T DSP16A V.32 modem (9600 baud), serial to parallel conversion 508 circuits and 64K×9 FIFOs 344, and a port interface FPGA (field programmable gate array) device. The DSP16A is dedicated for the V.32 modem function 474. However it is possible to design a context switch and interface bus so that the DSP16A can assist the 82750PB to perform other functions as well. The daughter board is designed to be able to mount directly on the 80750PA socket on Actionmedia board, and through the readily available 80750PA pin connectors, the daughter board is able to access all the needed circuits on the Actionmedia board such as frame memory, display processor, host interface, and output circuits. The side benefit of using this ad-hoc Actionmedia board approach is that now we can speedily design the single video decoder which can decompress not only proprietary DVI algorithm 182, but it is also able to decode CCITT H.261 184 and MPEG 188 algorithms. Actionmedia board also provides a convenient interface to CD-ROM, AT bus host, and allow output display using any of the NTSC 382, PAL 384, digital RGB 389, or VGA 153 formats.

The video coder 120, along with the host microprocessor will be designed on a separate PC card. The two cards will be edge connected using commercial available AT edge connector.

For low speed applications (i.e., 9.6 Kbs), we envision the decoder 122 ad-hoc board can also be time shared for the encoding function because the processing load for the decoder is much lighter, and 82750PB is equipped to perform encoding 120 functions as well. For medium speed applications (i.e., 64–128 Kbs), a separate ad-hoc Actionmedia board may be required to perform the encoder 120 function. Otherwise, the required encoder circuits such as the 82750PB, Thompson's DCT 418, LSI Logic's Quantization chip 378, and frame memory 312 (both old and new frame) must be designed with the host microprocessor 314 circuits on the host board. The host should also be able to decode remote control signal 110 using host software. When high performance decoding is required, a 8 bit micro controller 324, i.s., 80C51 can be used as the dedicated decoder.

The same board set can then be enclosed in a different chassis to address different markets. A consumer version product will employ a sleek black box similar to a CD player 96, or VCR. 100 The business version will employ a standard, may be slightly small PC 106 chassis. In the back panel, the connectors to the external host, television, VCR 100, CD-ROM and telephone 102 are provided. Finally, a commercial universal remote control device 110 can be used to facilitate screen programming 156 or manual selection.

ENCODER CIRCUIT IMPLEMENTATION

Figure 23A:
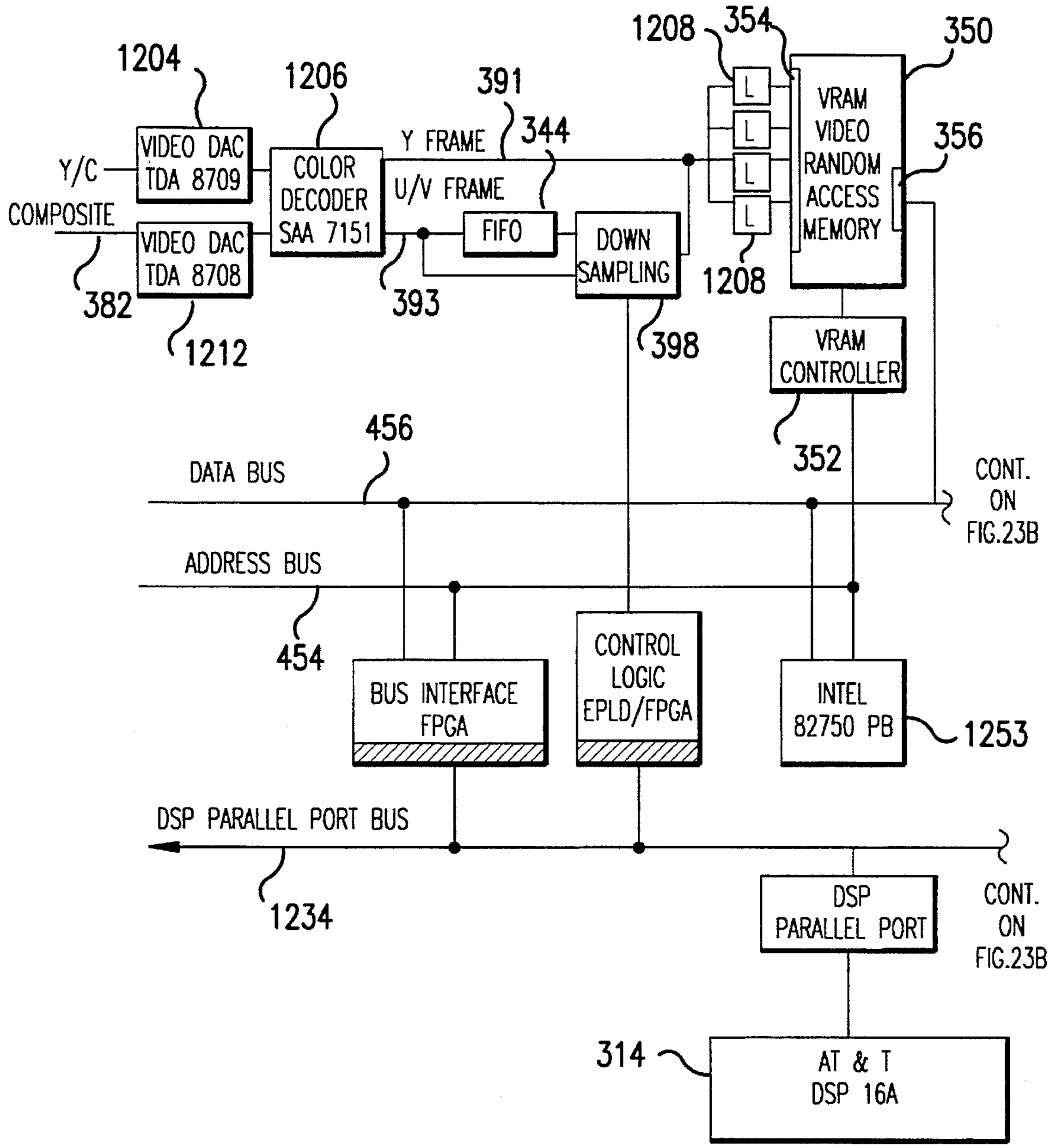
FIG. 23 illustrates a product specific circuit implementation of a video decoder.
Figure 23B:
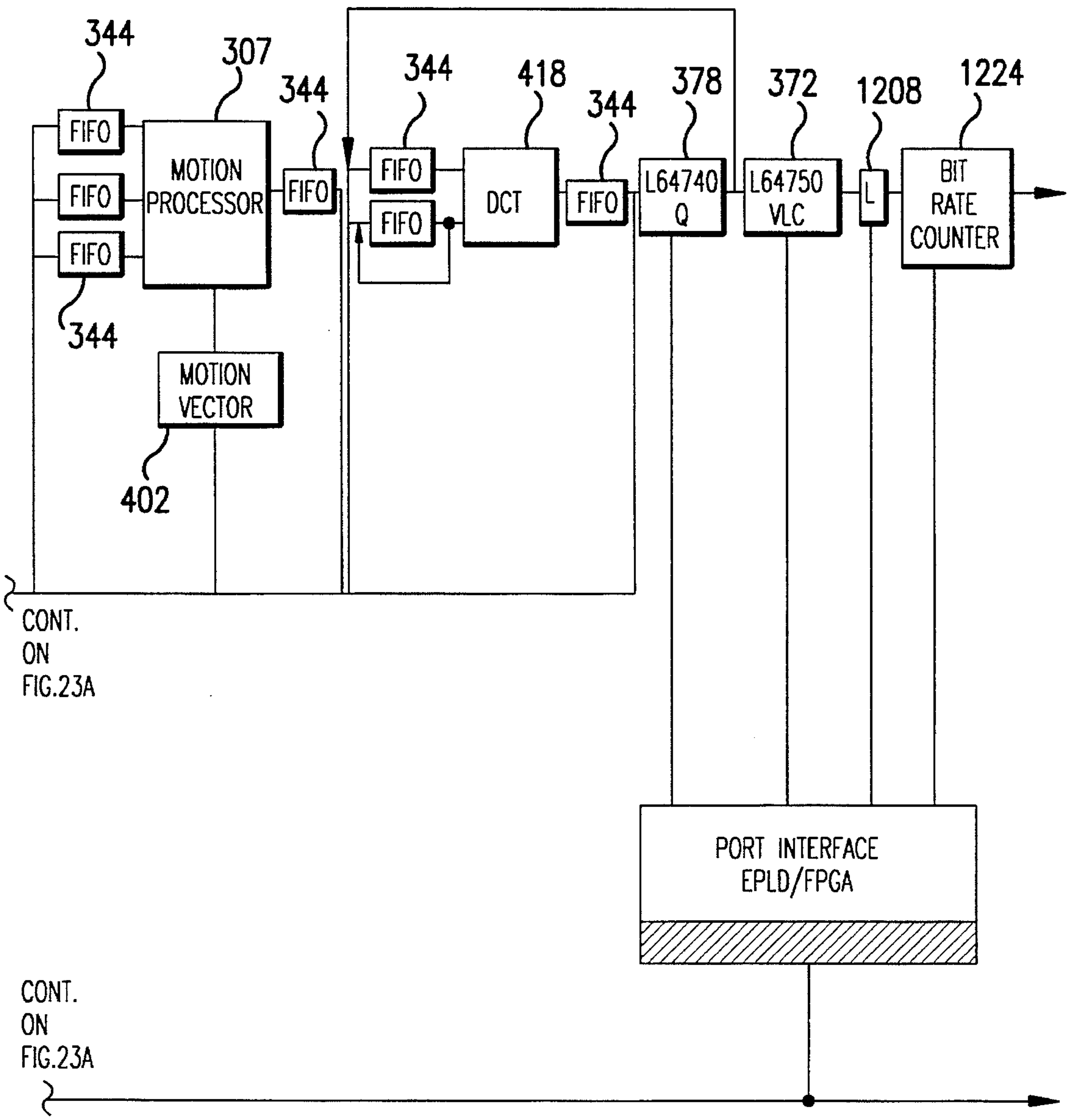
Figure 24:
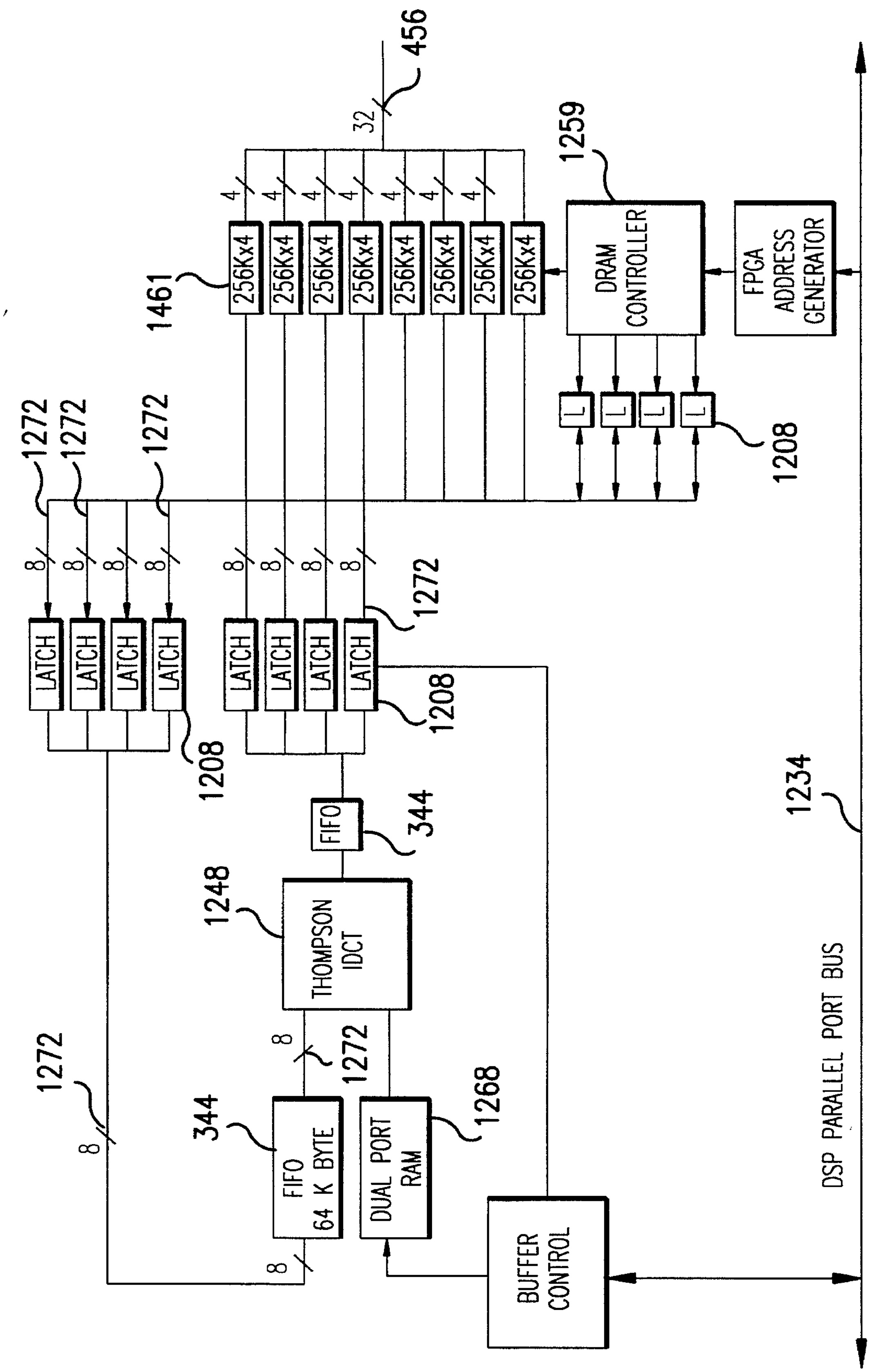
FIG. 24 illustrates a initial circuit implementation of the transform processor and frame memory design employing INTEL 82750 PB component.
Figure 25:
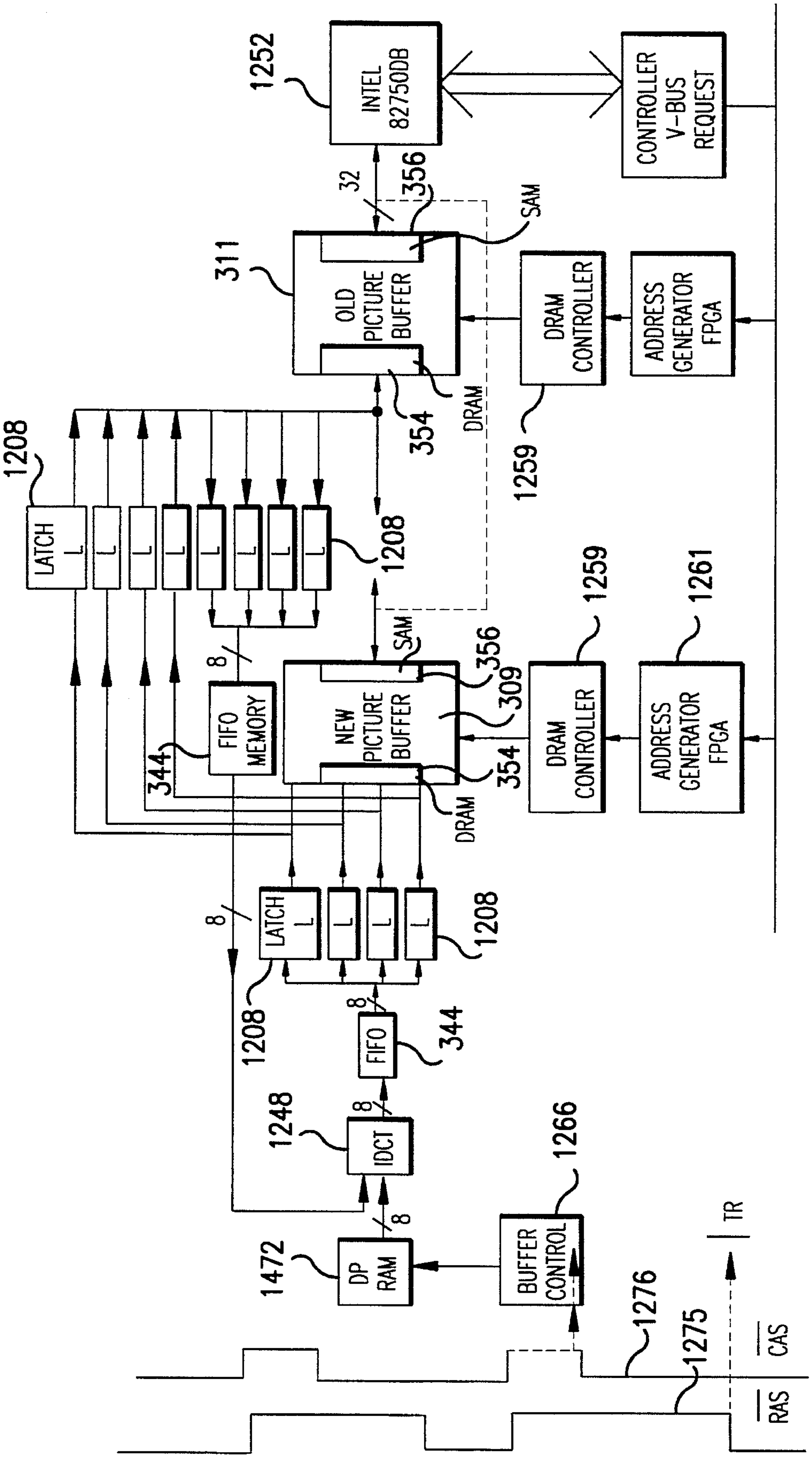
FIG. 25 illustrates a initial circuit implementation of a video decoder and display subsystem.
Figure 26A:
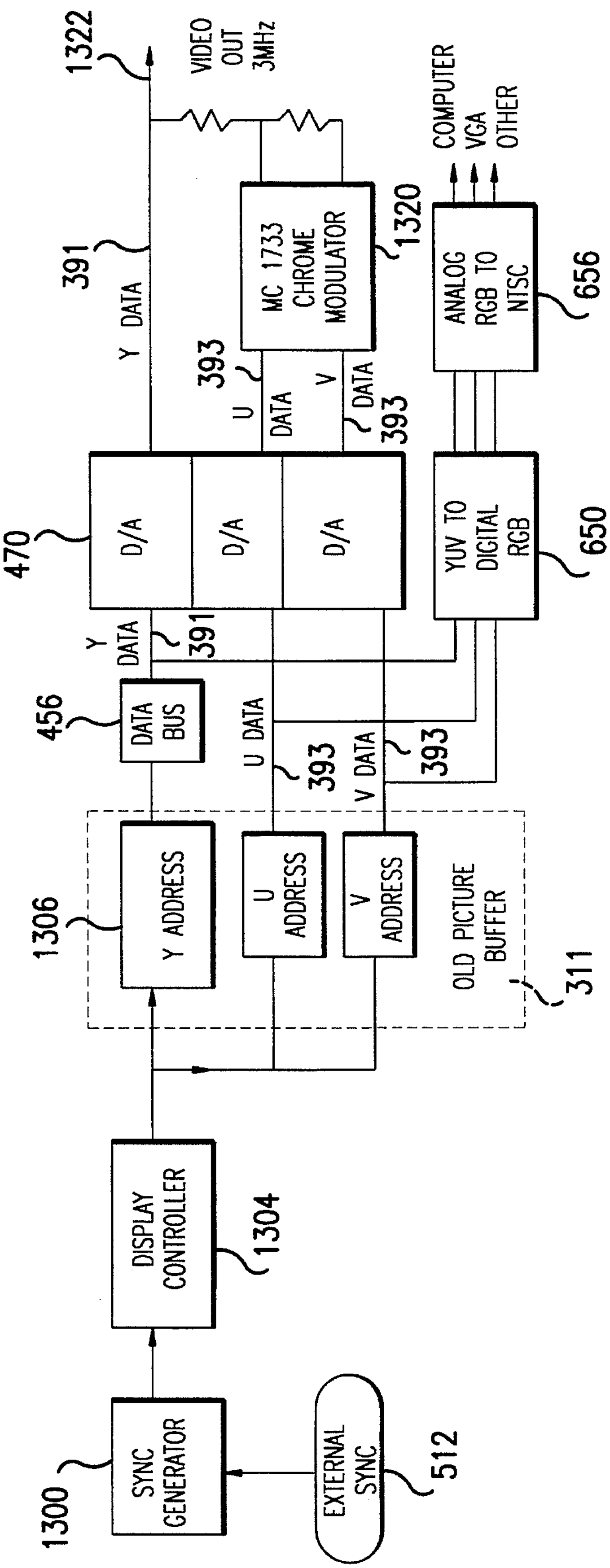
FIG. 26 illustrates the initial implementation of a color space conversation, video interpolation, and display adaptor circuit for the aforementioned display subsystem.
Figure 26B:
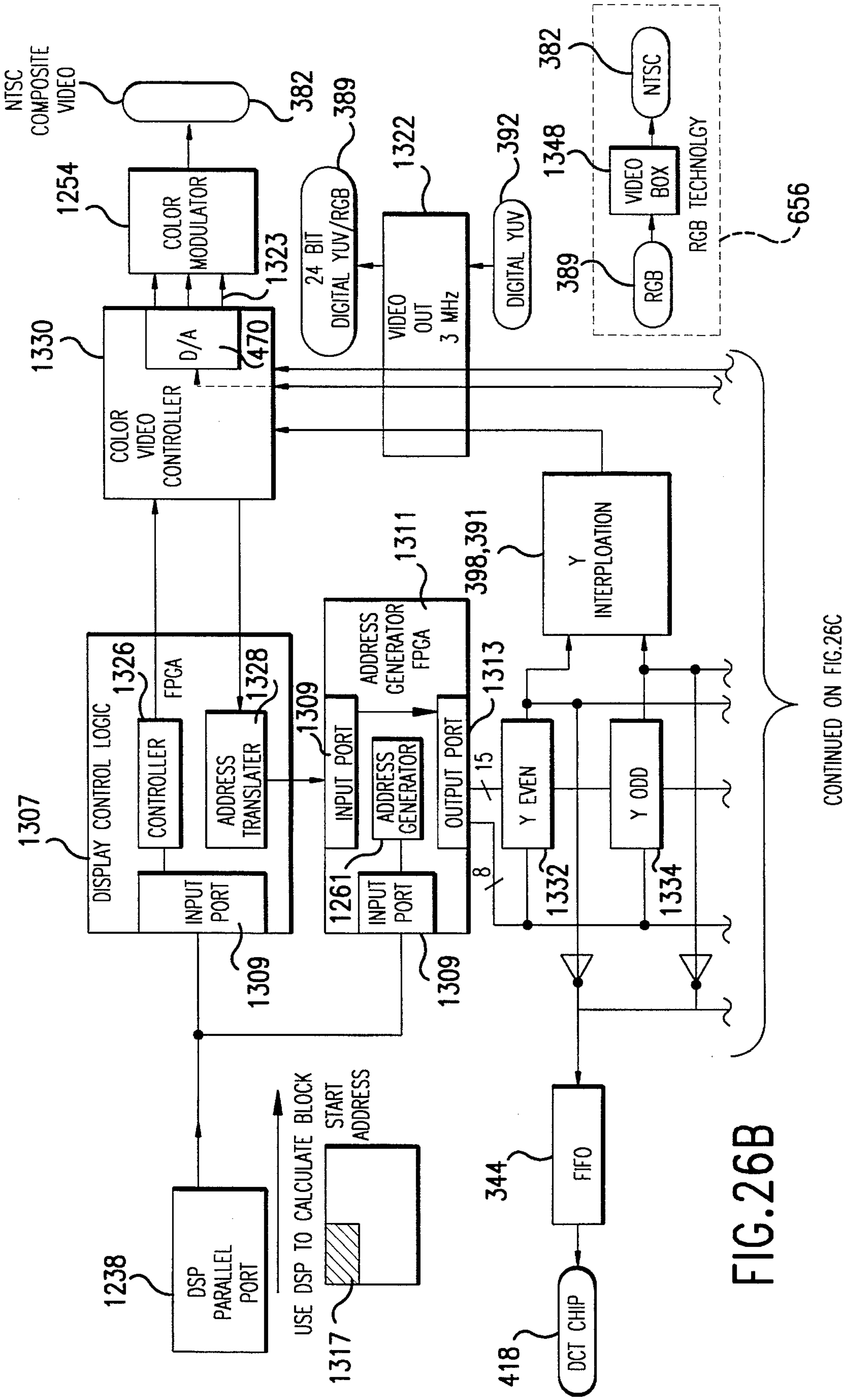
Figure 26C:
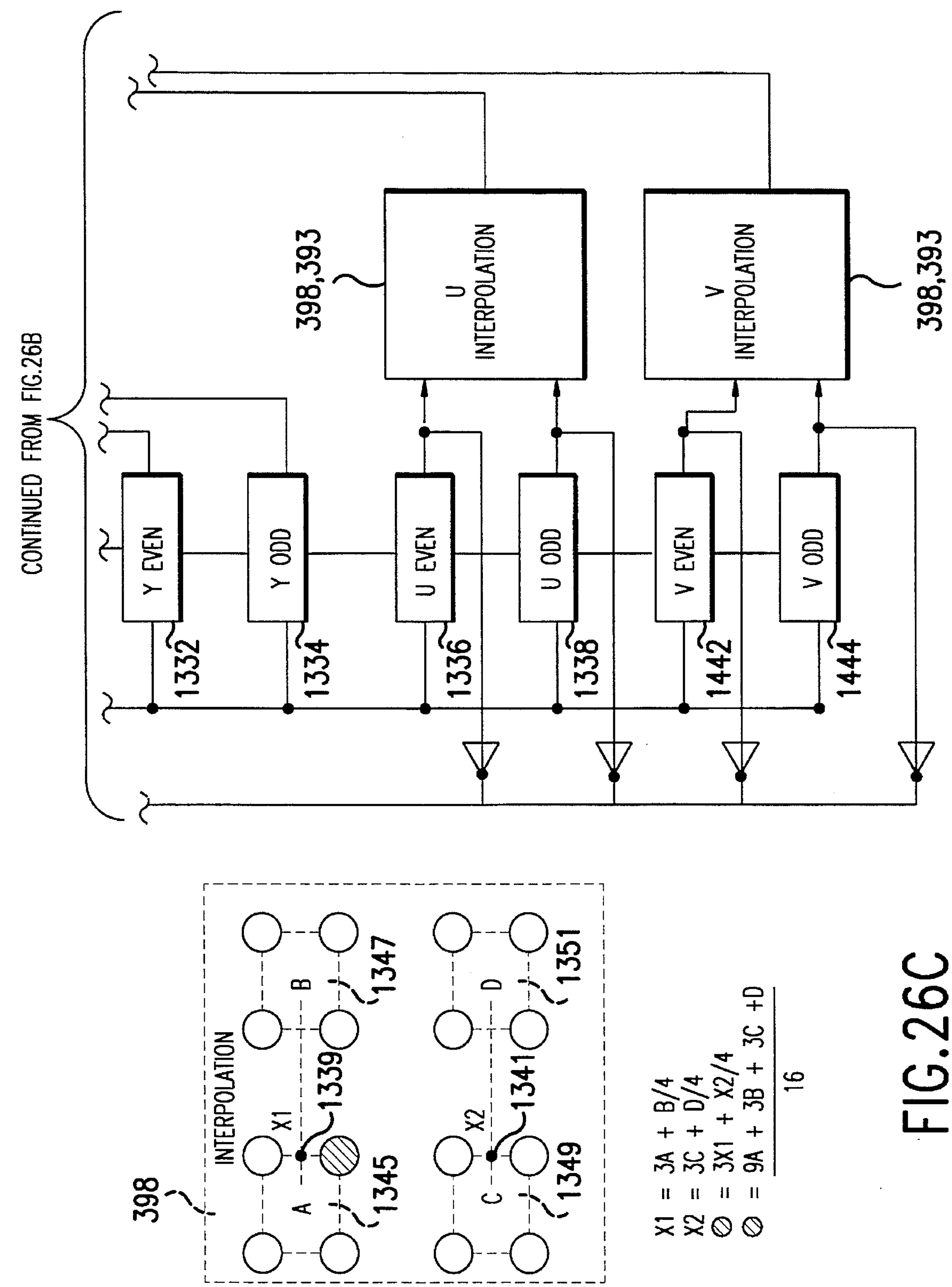

As shown in FIG. 23, we illustrate a specific circuit design of a H.261 184 video encoder, the video coder function 120 is implemented using the following commercially available chip components:

1. Signetics SAA7151 1206, TDA8709 1204, TDA8708 1212 multi standard decoder,
2. Intel 82750PB pixel processor 1253
3. Unspecified DRAM controller
4. LSI Logic's Motion Processor 307
5. Thompson Semi's DCT 418
6. LSI Logic's L64740 Quantizer (optional)
7. LSI Logic's L64750 Variable Length Coder (optional)
8. Unspecified VRAM frame memory.
9. Unspecified FIFO's and latches
10. Cirrus Logic fast Dual Ported SRAMs
11. Unspecified FPGA's and EPLD's for state machine, bus interface, address decoding and other glue logic functions.

We employs the Signetics multi standard decoder 1204, 1212, 1206 chip set as the front end interface to analog video worlds. The chip set readily decode any incoming analog video standards such as NTSC 382, PAL 384, SVHS 388 into the CCIR601 390 digital Y, U, V 392 formats.

The TDA 8709 1204 device will decode the Y/C signals, while the TDA 8708 1212 will decode the NTSC 382 composite, the SAA 7151 1206 will provide a CCIR digital luminance (Y) 391 and color difference (U,V) 393 serial bit stream as the output. Since the u, v 393 signals need to be downsampled from 4:2:2 into the 4:1:1 format for the CIF 149 format, FIFOs 344 and logic circuits need to be added. The output CIF 149 format is then four-way latched into the VRAM new frame buffer 309. The Y, and U, V blocks for each macroblock are separately stored at the New RAM section 309 of the frame memory. The VRAM 350 is further partitioned into two sections to store the old reference frame 311, and a newly updated frame 309. When motion compensation option is selected, the LSI Logic motion processor device is employed to identify and assign a motion vector 402 between the old reference 311 macroblock (MB) and the updated macroblock (MB). The motion vector 402 is sent to the VLC 372 device and convert into variable length codes. The Intel 82750PB will perform the frame differencing operation by for each MB 404, and forward the frame differencing MB's (including 4Y, 1U, and 1V blocks) to the Thompson DCT device. Thompson DCT device will not only perform the DCT operation 418 for the frame difference 362 of each macroblock 404, the device will also perform transpose, loop filter, operation for the output, the DCT operation will convert the Y, U, V 392 from pixel domain to frequency domain DCT coefficients. When motion compensation mode 664 is on, the previous frame 311 need to be loop filtered, transpose back to the original orientation before they can be stored back to the frame memory. The DCT 418 device will convert the Y, U, V coefficients 392 from raster scan format into a zig-zag format 374, and these DCT coefficients for the Y, U, V 392 macroblocks 404 are then quantized 378 using the LSI L64740 device, the output of the quantizer 378 will be coded into run and level first using Hoffman coding, the final output will be coded into variable length word 372 using LSI L64750 device. A bit rate counter 1224 is used to monitor the channel bit rate and assure output bit streams remain less than 4KBs (kilo Bytes per second).

The 82750PB 1253 is the host for the entire coder system. When performance allowed, 82750PB 1253 can be used to replace the L64750, and L64740 to perform variable length coding and quantization functions.

DECODER CIRCUIT IMPLEMENTATION

Figure 22A:
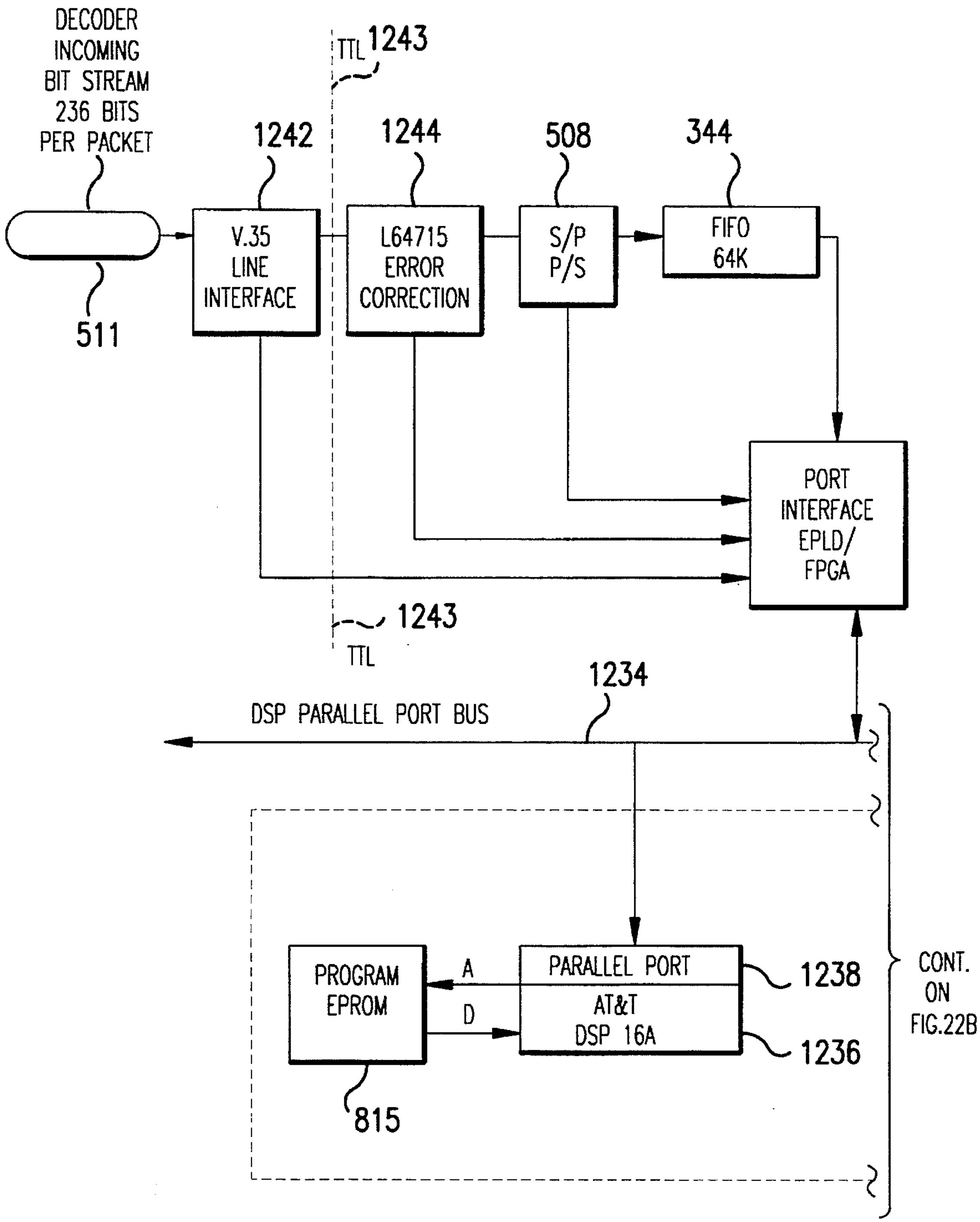
FIG. 22 illustrates a product specific circuit implementation of an video encoder.
Figure 22B:
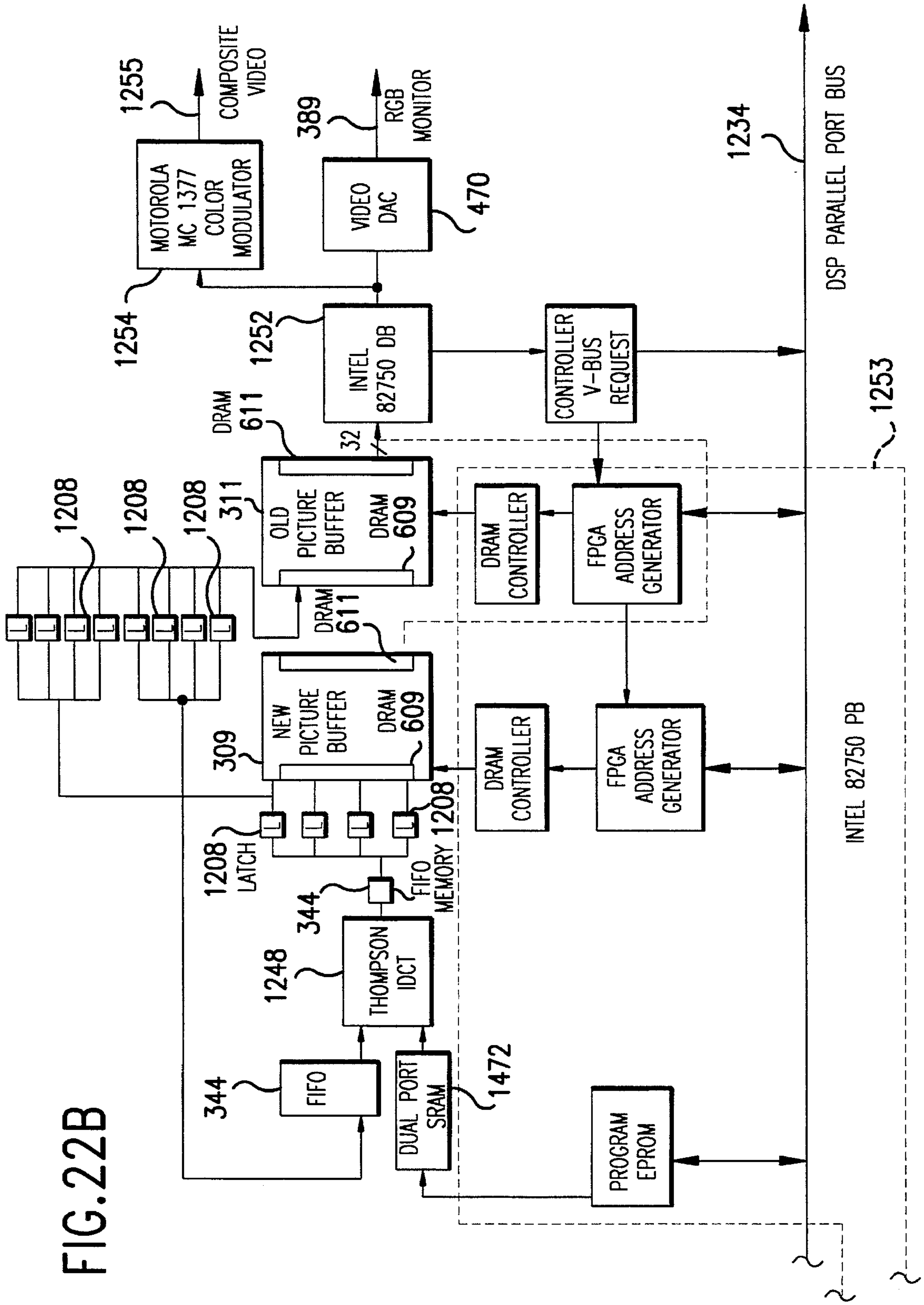

As shown in FIG. 22, we illustrate a second version of CCITT H.261 184 decoder 122 design. The decoder 122 consists of the following commercial available chip components:

1. AT&T DSP16A V.32 modem 1236, 474.
2. unspecified V.35 line interface (optional)
3. LSI Logic L64715 error correction chip 1244
4. AT&T DSP16A with program EPROM (optional)
5. unspecified 128×8 Dual ported SRAM
6. unspecified 128×8 FIFO's
7. Thompson IDCT chip 1248.
8. unspecified VRAM frame buffer
9. unspecified DRAM controller (optional)
10. Intel 82750 PB 1253
11. Intel 82750 DB 1252
12. Motorola MC1377 color modulator 1254
13. unspecified FPGA's and EPLD's for state machine, bus interface, address decoder, and glue logic.

Our decoder 122 accepts decoded inputs (256 bits per packet) from the communication interface. A standard DSP16A 1236 will be provided as the V.32 modem 474 for 9.6 Kps network applications. additional modems can be added to interface with other networks. The incoming compressed bit stream 511 will go through the LSI L64715 device 1244 to correct all the double bit errors. A EPLD is designed to implement the required control logic functions. The host processor for the decoder, which can be either a Intel 82750PB 1253 or a AT&T DSP16A 1236, will then forward the corrected compressed sequence 511 to the VRAM frame memory 312. When IDCT 420 is ready, the host will send the compressed macroblocks to the Thompson IDCT processor 1248, convert back to the picture domain, and added to the previous macroblock 311 to derive updated macroblock 309, 311. The old MB, in case motion compensation 403 mode is used, must be inverse loop-filtered first before addition, and output of the DCT operation 418 need to be transpose first before it can be store back to the frame memory. Since the compressed video 511 only represent the frame differencing 362 macroblocks, the unchanged macroblocks need also to be updated by copying the pixel value from the frame memory 312 for display. The output will go through the Intel 82750DB 1252 for display processing. The output of Intel 82750DB 1252 can be either VGA 153 or digital RGB 389 signal. the RGB signal can further convert to analog RGB through a video DAC 470 (digital to analog converter) or use a Motorola MC1377 color modulator device 1254 to convert into NTSC 382 composite.

We claim:

1. A controller for operating a plurality of video and audio information production devices, based upon video and audio information supplied to, or received from a telecommunications network provided with a plurality of network equipment, comprising:

an input/output device for receiving and transmitting video and audio information to and from the telecommunications network on a real time basis, said input/output device continuously monitoring run-time status and condition changes of said telecommunications network and dynamically controlling and adjusting on a real time basis corresponding network bandwidth utilization by said video and audio information prior to immediately transmitting all of said video and audio information to said telecommunications network;

processor means connected to said input/output device for processing video and audio information supplied to, or received from said input/output device, said processor means including means for recognizing and processing a plurality of mutually incompatible video and audio coding algorithms for information received from, or supplied to said telecommunications network;

reconfiguration means connected to said processor means for standardizing and reconfiguring the video and audio information according to a selective internal file format which is universally compatible with any coding algorithms received from, or supplied to the telecommunication network, said reconfiguration means further performing scalable internal data reformatting among incompatibly received or transmitted video and audio information; and interface devices for direct communication between said controller and the video and audio information production devices, said interface devices receiving information transmitted by the video and audio information production devices and transmitting information from said controller to the video and audio information production devices, including the encoded video and audio information which are universally compatible with the video coding algorithms produced by said reconfiguration means.

2. The controller in accordance with claim 1, further including a source controller for choosing the bandwidth of the video information supplied to the telecommunications network and the audio quality of the audio information supplied to the telecommunications network.

3. The controller in accordance with claim 2, wherein said source controller automatically chooses the bandwidth of the video information and the quality of the audio information supplied to the telecommunications network based upon the status and/or condition of the telecommunications network.

4. The controller in accordance with claim 2, further including a video display, microphone and at least one speaker associated with one of said video and audio information production devices whereby a video conference can be held.

5. The controller in accordance with claim 1, further including a memory device for storing video and audio information received from or supplied to the telecommunications network and the information production devices according to said internal file format.

6. The controller in accordance with claim 1, wherein said processor further includes a decoder and an encoder.

7. The controller in accordance with claim 1, further including, a means for producing a graphics overlay, a means for producing a text overlay, a means for producing a motion object overlay, a means for producing a still background underlay and a means for producing an audio overlay, said various overlays and underlay being transmitted to various video and audio information production devices through said processor means and said interface devices.

8. The controller in accordance with claim 1, further including a motion compensation and frame differentiator connected to said processor.

9. The controller in accordance with claim 1, wherein said processor means includes a means for simulating and annealing randomly distributed audio and video information to improve the transmission quality of the telecommunication network.

10. A multimedia communications system, comprising:

a plurality of independent video and audio information production devices;

a telecommunications network provided with a plurality of network equipment;

a selective one or plurality of controllers connected between said telecommunications network and said video and audio production devices, each of said controllers provided with control means for operating a single or plurality of selective video and audio information production devices, based upon video and audio information supplied to, or received from said telecommunications network, comprising:

an input/output device for connecting to one or more of said network equipment receiving and transmitting video and audio information to and from said telecommunications network on real time basis, and input/output device continuously monitoring run-time status and condition changes of said telecommunications network and dynamically controlling and adjusting on a real time basis corresponding network bandwidth utilization by said video and audio information prior to immediately transmitting all of said video and audio information to said telecommunications network;

processor means connected to said input/output device for processing video and audio information supplied to or received from said input/output device, said processor means including means for recognizing and processing a plurality of mutually incompatible video and audio coding algorithms for information received from or supplied to said telecommunications network;

reconfiguration means connected to said processor means for standardizing and reconfiguring the video and audio information according to a selective internal file format which is universally compatible with any coding algorithms received from or supplied to said telecommunications network, said reconfiguration means further performing scalable internal data reformatting among incompatibly received or transmitted video and audio information; and interface devices for direct communication between said controller and the video and audio information production devices, said interface devices receiving information transmitted by the video and audio information production devices and transmitting information said controller to the video and audio information production devices, including the encoded video and audio information which are universally compatible with video coding algorithms produced by said reconfiguration means.

11. The system in accordance with claim 10, further including a source controller for choosing the bandwidth of the video information supplied to the telecommunications network and the audio quality of the audio information supplied to the telecommunications network.

12. The system in accordance with claim 11, wherein said source controller automatically chooses the bandwidth of the video information and the quality of the audio information supplied to the telecommunications network based upon the status and/or condition of the telecommunications network.

13. The system in accordance with claim 11, further including a video display, microphone and at least one speaker associated with one of said video and audio information production devices allowing a video conference to be held.

14. The system in accordance with claim 10, further including a memory device for storing video and audio information received from or supplied to the telecommunications network and the information production devices according to said internal file format.

15. The system in accordance with claim 10, wherein said processor further includes a decoder and an encoder.

16. The system in accordance with claim 10, further including a means for producing a graphics overlay, a means for producing a text overlay, a means for producing a motion object overlay, a means for producing a still background underlay and a means for producing an audio overlay, said various overlays and underlay being transmitted to various video and audio information production devices through said processor means and said interface devices.

17. The system in accordance with claim 10, further including a motion compensation and frame differentiator connected to said processor.

18. The system in accordance with claim 10, wherein said processor means includes a means for simulating and annealing randomly distributed audio and video information to improve the transmission quality of said transmission network of said telecommunications network.

* * * * *

UNITED STATES PATENT AND TRADEMARK OFFICE
CERTIFICATE OF CORRECTION

PATENT NO. : 5,611,038
DATED : March 11, 1997
INVENTOR(S) : Venson M. Shaw

It is certified that error appears in the above-identified patent and that said Letters Patent is hereby corrected as shown below:

Column 8,
Line 32, delete "import and".

Column 10,
Line 66, replace "rate" with -- rates --.

Column 12,
Line 61, replace " Digital Terminal Equipment" with -- Digital Circuit Equipment --.
Line 62, replace "(DTE) 130" with -- (DCE) 132 --.
Line 63, replace "Digital Circuit Equipment" with -- Digital Terminal Equipment --.
Line 64, replace "(DCE) 132" with -- (DTE) 130 --.
Line 64, replace "The DCE's 132 are" with -- The DTEs 130 are --.
Line 67, replace "The DCE host 132" with -- The DTE host 130 --.

Column 13,
Line 1, replace "DTE's 130" with -- DCEs 132 --.
Line 1, replace "decoder (D)" with -- Encoder (E) --.
Line 2, replace "the DTE" with -- the DCE --.
Line 3, replace "130" with -- 132 --.
Line 4, replace "the DTE 130 must notify the DCE 132" with -- the DCE 132 must notify the DTE 130 --.
Line 13, replace "the DCE" with -- the DTE --.
Line 14, replace "host 132" with -- host 130 --.
Line 44, replace "material" with -- materials --.
Line 61, replace "have" with -- has --.

Column 16,
Line 17, replace "2 vertical <v>" with -- 3 vertical <v> --.
Line 24, replace "5:1" with -- 2:1 --.

Column 17,
Line 3, replace "apply" with -- applied --.

UNITED STATES PATENT AND TRADEMARK OFFICE
CERTIFICATE OF CORRECTION

PATENT NO. : 5,611,038
DATED : March 11, 1997
INVENTOR(S) : Venson M. Shaw

It is certified that error appears in the above-identified patent and that said Letters Patent is hereby corrected as shown below:

Column 18,
Line 29, replace "1.2 ms" with -- 120 ms --.

Column 22,
Line 67, replace "Telephone companies (TELCO's)" with -- Telecommunications Networks --.

Figure 11A:
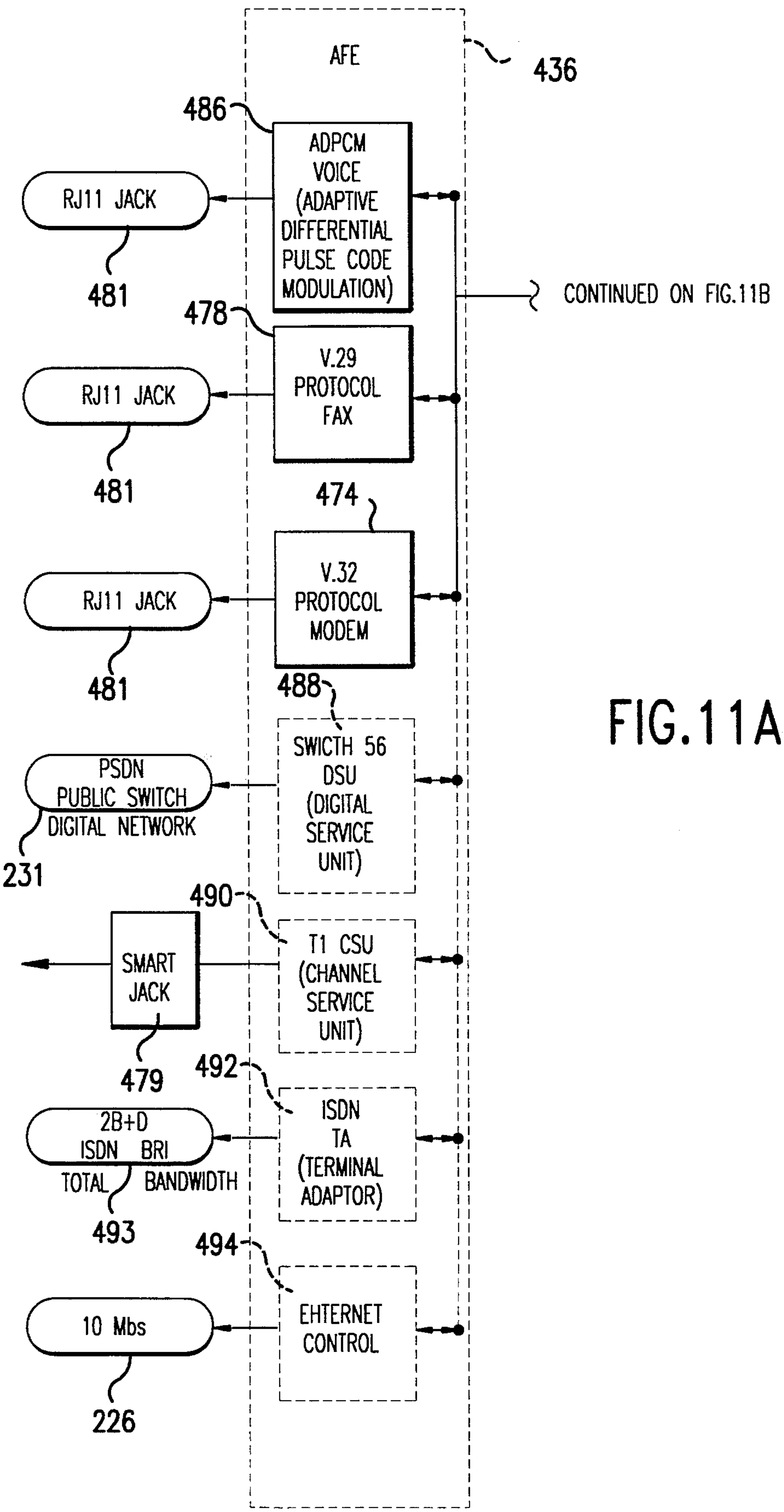
FIG. 11 illustrates the design of a system processor.
Figure 11B:
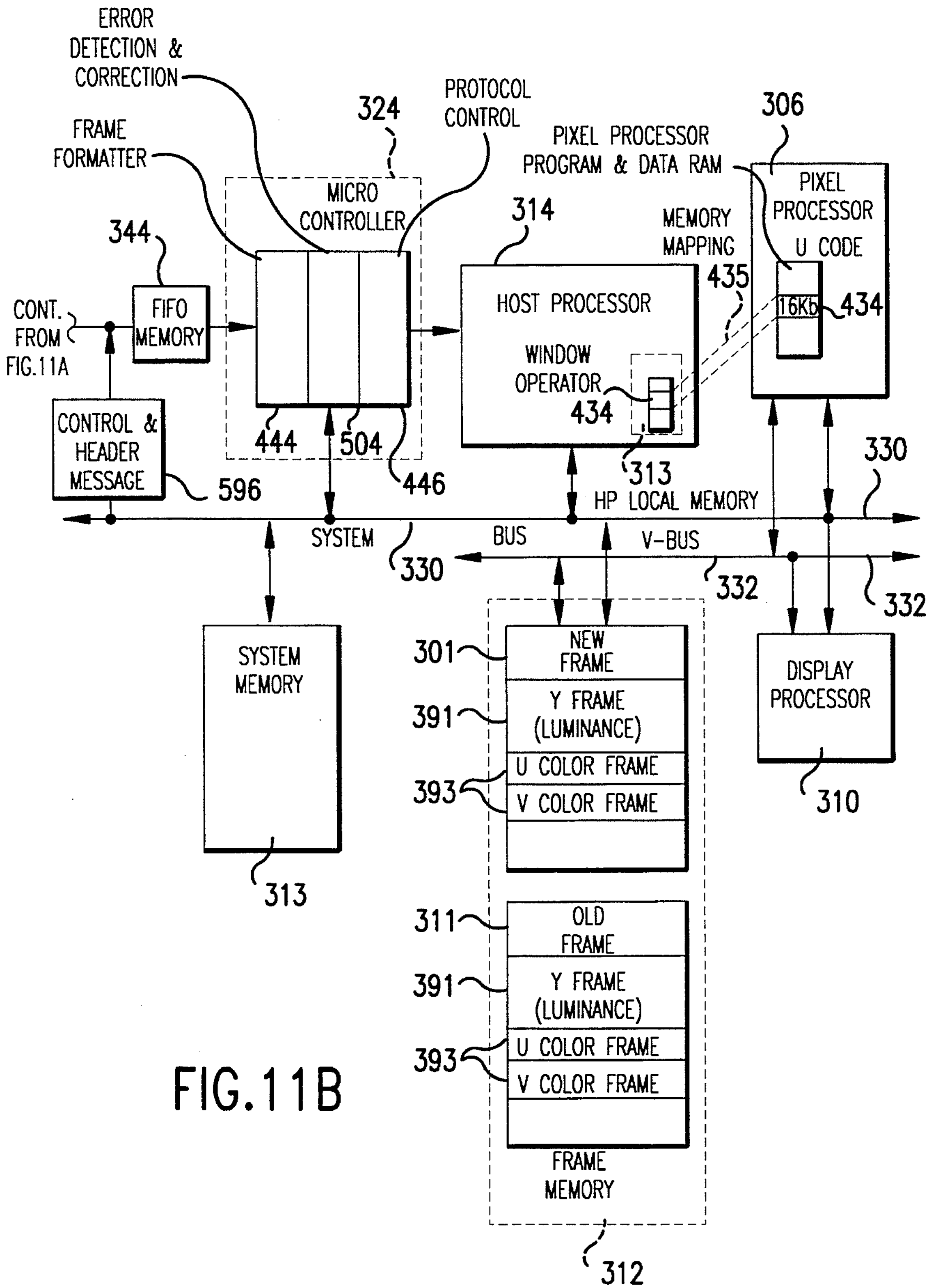

Column 26,
Line 45, replace "FIG. 11" with -- FIG. 11A AND FIG. 11B --.

Column 27,
Line 27, replace "64 Kps" with -- 64 Kbs --.

Column 28,
Line 1, replace "interface" with -- interfaces --, and replace "control" with -- controls --.
Line 3, replace "interface" with -- interfaces --.
Line 38, replace "signal" with -- signals --.

Column 29,
Line 63, replace "a" with -- an --.

Column 30,
Line 4, replace "mole" with -- role --.
Line 11, replace "a" with -- an --.

Column 31,
Line 24, replace "these" with -- this --.
Line 30, replace "a easy" with -- an easy --.

Column 32,
Line 10, replace "Option" with -- Option 1 --.
Line 11, replace "Option" with -- Option 2 --.

UNITED STATES PATENT AND TRADEMARK OFFICE
CERTIFICATE OF CORRECTION

PATENT NO. : 5,611,038
DATED : March 11, 1997
INVENTOR(S) : Venson M. Shaw

It is certified that error appears in the above-identified patent and that said Letters Patent is hereby corrected as shown below:

Column 33,
Line 39, replace "level" with -- length --.
Line 43, replace "DPRAM'S" with -- VRAMs --.

Signed and Sealed this

Thirtieth Day of April, 2002

*Attest:*

JAMES E. ROGAN
*Attesting Officer* *Director of the United States Patent and Trademark Office*